US012686137B2

(12) United States Patent
Valdivia Y Alvarado et al.

(10) Patent No.: US 12,686,137 B2
(45) Date of Patent: Jul. 21, 2026

(54) GRIPPING APPARATUS, METHOD OF FORMING THE GRIPPING APPARATUS AND METHOD OF OPERATING THEREOF

(71) Applicant: Singapore University Of Technology And Design, Singapore (SG)

(72) Inventors: Pablo Valdivia Y Alvarado, Singapore (SG); Snehal Jain, Singapore (SG); Vignesh Subramaniam, Singapore (SG)

(73) Assignee: Singapore University Of Technology And Design, Singapore (SG)

( * ) Notice: Subject to any disclaimer, the term of this patent is extended or adjusted under 35 U.S.C. 154(b) by 1000 days.

(21) Appl. No.: 17/802,547

(22) PCT Filed: Feb. 26, 2021

(86) PCT No.: PCT/SG2021/050096
§ 371 (c)(1),
(2) Date: Aug. 26, 2022

(87) PCT Pub. No.: WO2021/173083
PCT Pub. Date: Sep. 2, 2021

(65) Prior Publication Data
US 2023/0106364 A1 Apr. 6, 2023

(30) Foreign Application Priority Data
Feb. 26, 2020 (SG) .......................... 10 202001712Q

(51) Int. Cl.
B25J 15/12 (2006.01)
B25J 15/00 (2006.01)
(Continued)

(52) U.S. Cl.
CPC ....... B25J 15/0009 (2013.01); B25J 15/0023 (2013.01); B25J 15/10 (2013.01); B25J 15/12 (2013.01); B25J 19/007 (2013.01)

(58) Field of Classification Search
CPC ........ B25J 15/0023; B25J 15/12; B25J 15/10; B25J 15/0009; B25J 19/007; B25J 15/0616; B25J 15/08; B25J 9/142
(Continued)

(56) References Cited

U.S. PATENT DOCUMENTS 9,993,921 B2 6/2018 Lessing et al.
11,426,880 B2 * 8/2022 Lin ........................... B25J 15/10
(Continued)

FOREIGN PATENT DOCUMENTS

CN 108908379 A 11/2018
CN 109108957 A 1/2019
(Continued)

OTHER PUBLICATIONS

Finger Structure, Gripping Device, Robot Hand, and Industrial Robot; WO 2018230729 A1; Inventor Hatano Itaru; Application No. JP 2018023022 W (Year: 2018).*
(Continued)

*Primary Examiner* — Mahdi H Nejad

(57) ABSTRACT

A gripping apparatus includes a palm member; a plurality of finger members configured to couple to the palm member, each of the plurality of finger members comprising a plurality of phalange members arranged in series along a longitudinal axis of the finger member, each phalange member being formed of an elastomer; a multilayer finger membrane configured to encapsulate the plurality of phalange members, the multilayer finger membrane being formed of multiple material layers, including a strain limiting layer configured to limit the multilayer finger mem- (Continued)

brane from stretching; and a coupling end portion configured to couple to the palm member and includes an opening configured for fluid communication with a vacuum system, wherein each of the plurality of finger members is configured to bend based on vacuum pressure actuation generated by the vacuum system via the opening of the coupling end portion of the finger member.

16 Claims, 51 Drawing Sheets

(51) Int. Cl.
    *B25J 15/10*           (2006.01)
    *B25J 19/00*           (2006.01)

(58) Field of Classification Search
    USPC .............................................. 294/119.3, 208
    See application file for complete search history.

(56) References Cited

U.S. PATENT DOCUMENTS

| | | | | |
|---|---|---|---|---|
| 2016/0075036 | A1* | 3/2016 | Lessing | B25J 15/12 |
| | | | | 294/119.3 |
| 2019/0022875 | A1 | 1/2019 | Galloway et al. | |
| 2019/0039838 | A1 | 2/2019 | Curhan et al. | |
| 2019/0047156 | A1* | 2/2019 | Curhan | B25J 15/12 |
| 2019/0084762 | A1 | 3/2019 | Fujihara et al. | |
| 2019/0168382 | A1* | 6/2019 | Lessing | B25J 9/142 |
| 2019/0217481 | A1 | 7/2019 | Lessing et al. | |
| 2020/0156266 | A1* | 5/2020 | Curhan | B25J 15/0658 |
| 2020/0346792 | A1* | 11/2020 | Curhan | B25J 15/10 |
| 2021/0394360 | A1* | 12/2021 | Hwang | B25J 9/1612 |
| 2022/0024051 | A1* | 1/2022 | Varley | B25J 19/0083 |
| 2022/0134579 | A1* | 5/2022 | Cao | B25J 13/087 |
| | | | | 294/86.4 |
| 2023/0405842 | A1* | 12/2023 | Khin | B25J 15/12 |
| 2025/0312928 | A1* | 10/2025 | Valdivia Y Alvarado | |
| | | | Gutierrez | B25J 15/0023 |

FOREIGN PATENT DOCUMENTS

| | | |
|---|---|---|
| CN | 208375318 U | 1/2019 |
| CN | 109866243 A | 6/2019 |
| JP | 2004358634 A | 12/2004 |
| JP | 2019051575 A | 4/2019 |
| JP | 2019119018 A | 7/2019 |
| WO | 2018187704 A1 | 10/2018 |
| WO | 2018230729 A1 | 12/2018 |

OTHER PUBLICATIONS

Written Opinion of the International Searching Authority issued for the corresponding PCT patent application No. PCT/SG2021/050096, dated May 28, 2021, 6 pages (For informational purposes only).

Fraś J., et al., "Soft flexible gripper design, characterization and application", Control and Information Technology, SCIT Dec. 2016, DOI:10.1007/978-3-319-48923-0_40.

Y. Hao et al., "Universal soft pneumatic robotic gripper with variable effective length", 35th Chinese Control Conference (CCC), Jul. 27-29, 2016, pp. 6109-6114.

Mohammad Nasser Saadatzi et al., "Precision Grasp Control with a Pneumatic Gripper and a Novel Fingertip Force Sensor", 2018 IEEE 14th International Conference on Automation Science and Engineering (CASE), Aug. 20-24, 2018, pp. 1454-1459.

Paul Glick et al., "A Soft Robotic Gripper With Gecko-Inspired Adhesive", IEEE Robotics and Automation Letters, vol. 3, No. 2, Apr. 2018, pp. 903-910.

Li, Shuguang et al., "A Vacuum-driven Origami "Magic-ball" Soft Gripper", 2019 IEEE International Conference on Robotics and Automation (ICRA), May 20-24, 2019, pp. 7401-7408.

Rahim Mutlu et al., "A 3D Printed Monolithic Soft Gripper with Adjustable Stiffness", IECON, 2017 43rd Annual Conference of the IEEE Industrial Electronics Society, 2017, pp. 6235-6240.

Abhishek Bamotra et al., "Fabrication and Characterization of Novel Soft Compliant Robotic End-Effectors with Negative Pressure and Mechanical Advantages", 2018 3rd International Conference on Advanced Robotics and Mechatronics (ICARM), 2018, pp. 369-374.

Tomokazu Takahashi et al., "Octopus Bioinspired Vacuum Gripperwith Micro Bumps", 2016 11th IEEE Annual International Conference on Nano/Micro Engineered and Molecular Systems (NEMS), Apr. 2016, pp. 508-511.

Guoliang Zhong et al., "A soft pneumatic dexterous gripper with convertible grasping modes", International Journal of Mechanical Sciences, vols. 153-154, 2019, pp. 445-456, ISSN 0020-7403.

Yingtian Li et al, "A novel versatile robotic palm inspired by human hand", Engineering Research Express 1(2019)015008, IOP Publishing, 13 pages.

Jisen Li, "Soft-Origami Based Actuator and Sensor", A Thesis Submitted for The Degree of Doctor of Philosophy, National University of Singapore, 2018, 24 pages.

Vignesh Subramaniam et. al, "Design and Characterization of a hybrid soft gripper with active palm pose control" The International Journal of Robotics Research (IJRR), 2020, vol. 39(14), 1668-1685.

Snehal Jain et al. "Dexterous Hybrid Soft Gripper for Complex Industrial Manipulation Tasks", Singapore University of Technology and Design, 1 page.

A. Agarwal A et al., "Effects of Material Properties on Soft Gripper Grasping Forces", 2018 IEEE International Conference on Soft Robotics (RoboSoft), Apr. 24-28, 2018, pp. 437-442.

Amend, John R. et al., "A Positive Pressure Universal Gripper Based on the Jamming of Granular Material", IEEE Transactions on Robotics 28, No. 2, Apr. 2012, pp. 341-350, DOI:10.1109/TRO. 2011.2171093.

Eric Brown et al., "Universal robotic gripper based on the jamming of granular material", Proceedings of the National Academy of Sciences 107(44), Nov. 2, 2010, pp. 18809-18814.

Deimel, Raphael et al., "A Compliant Hand Based on a Novel Pneumatic Actuator", 2013 IEEE International Conference on Robotics and Automation (ICRA), May 6-10, 2013, pp. 2047-2053.

Feix, Thomas et al., "The GRASP Taxonomy of Human Grasp Types", IEEE Transactions on Human-Machine Systems 46, No. 1,Feb. 2016, pp. 66-77.

Bianca S. Homberg et al., "Haptic Identification of Objects using a Modular Soft Robotic Gripper", 2015 IEEE International Conference on Intelligent Robots and Systems (IROS), Sep. 28-Oct. 2, 2015, pp. 1698-1705 https://doi.org/10.1109/IROS.2015.7353596.

Brandon E. Jackson et al., "3D for the people: multi-camera motion capture in the field with consumer-grade cameras and open source software", Biology Open (2016) 5, The Company of Biologists Ltd, 1334-1342, doi:10.1242/bio.018713.

Li Shuguang et al., "Fluid-driven origami-inspired artificial muscles", Proceedings of the National Academy of Sciences vol. 114, No. 50, pp. 13132-13137, www.pnas.org/cgi/doi/10.1073/pnas.1713450114.

Manolis I. A. Lourakis et al., "SBA: A Software Package for Generic Sparse Bundle Adjustment", ACM Transactions on Mathematical Software, vol. 3, No. 1, Article 2, Mar. 2009, 30 pages, DOI 10.1145/1486525.1486527 http://doi.acm.org/10.1145/1486525. 1486527.

Manti, Mariangela et al., "A Bioinspired Soft Robotic Gripper for Adaptable and Effective Grasping", Soft Robotics, vol. 2, No. 3, 2015, 10 pages, DOI: 10.1089/soro.2015.0009.

Ramses V. Martinez et al., "Robotic Tentacles with Three-Dimensional Mobility Based on Flexible Elastomers", Advanced Materials 25(2), pp. 205-212, https://onlinelibrary.wiley.com/doi/10.1002/adma.201203002.

Geneviève Miron et al., "Sleeved Bending Actuators for Soft Grippers: A Durable Solution for High Force-to-Weight Applications", Actuators 7, 40, 2018, 16 pages, DOI:10.3390/act7030040.

(56) References Cited

OTHER PUBLICATIONS

Mosadegh, Bobak et al., "Pneumatic Networks for Soft Robotics that Actuate Rapidly", Advanced Functional Materials 24(15), 2014, pp. 2163-2170, https://onlinelibrary.wiley.com/doi/10.1002/adfm. 201303288.

Toshihiro Nishimura et al., "Variable-Grasping-Mode Underactuated Soft Gripper With Environmental Contact-Based Operation", IEEE Robotics and Automation Letters, vol. 2, No. 2, Apr. 2017, pp. 11634-1171.

Lael U. Odhner et al. "A compliant, underactuated hand for robust manipulation", The International Journal of Robotics Research (JJRR), vol. 33(5), 2014, pp. 736-752, DOI: 10.1177/0278364913514466.

SMC-Pneumatics, Vt307, 3-port solenoid poppet valves for vacuum, https://www.smcpneumatics.com/VT307-5DZ1-01F.html.

Smooth-On, Platinum cure silicone rubbers, https://www.smooth-on.com/category/platinum-silicone/.

Wang, Zhongkui et al., "Fabrication and Performance Comparison of Different Soft Pneumatic Actuators for Lunch Box Packaging", 2017 IEEE International Conference on Real-time Computing and Robotics (RCAR), Jul. 14-18, 2017, pp. 22-27.

Wei, Ying et al., "A Novel, Variable Stiffness Robotic Gripper Based on Integrated Soft Actuating and Particle Jamming", Soft Robotics vol. 3, No. 3, pp. 134-143, DOI:10.1089/soro.2016.0027.

Hong Kai Yap et al., "High-Force Soft Printable Pneumatics for Soft Robotic Applications", Soft Robotics vol. 3, No. 3, pp. 144-158, DOI: 10.1089/soro.2016.0030.

Li et al., YouTube Video, "Origami robot gripper", URL: https://www.youtube.com/watch?v=byqGFH6AZuk.

John Amend et. al, "Soft Robotics Commercialization: Jamming Grippers from Research to Product", Soft Robotics VO. 3, No. 4, 2016, pp. 213-222, DOI: 10.1089/soro.2016.0021.

Kensuke Harada et al., "Proposal of a shape adaptive gripper for robotic assembly tasks", Advanced Robotics vol. 30, Nos. 17-18, pp. 1186-1198, http://dx.doi.org/10.1080/01691864.2016.1209431.

Jaeger H et al., YouTube Video, "Universal robotic gripper based on the jamming of granular material", URL: https://www.youtube.com/watch?v=bFW7VQpY-Ik.

J. H. Low et al., "A Bidirectional Soft Pneumatic Fabric-based Actuator for Grasping Applications", 2017 IEEE/RSJ International Conference on Intelligent Robots and Systems (IROS), Sep. 24-28, 2017, pp. 1180-1186.

Jun Shintake et al., "Soft Pneumatic Gelatin Actuator for Edible Robotics", 12017 IEEE/RSJ International Conference on Intelligent Robots and Systems (IROS), Sep. 24-28, 2017, pp. 6221-6226.

J.H. Low et al., "A Compliant Modular Robotic Hand with Fabric Force Sensor for Multiple Versatile Grasping Modes", 6th IEEE RAS/EMBS International Conference on Biomedical Robotics and Biomechatronics (BioRob) Jun. 26-29, 2016, pp. 1230-1235.

Mochammad Ariyanto et al., "Three-Fingered Soft Robotic Gripper Based on Pneumatic Network Actuator", 6th International Conference on Information Technology, Computer and Electrical Engineering (ICITACEE), Sep. 26-27, 2019, pp. 1-5.

* cited by examiner (a)

(b)          (c)          (d)

(e)          (f)          (g)

300

302 providing a palm member

304 providing a plurality of finger members configured to couple to the palm member, each of the plurality of finger members comprising a plurality of phalange members arranged in series along a longitudinal axis of the finger member, each phalange member being formed of an elastomer; a multilayer finger membrane configured to encapsulate the plurality of phalange members, the multilayer finger membrane being formed of multiple material layers, comprising a strain limiting layer configured to limit the multilayer finger membrane from stretching; and a coupling end portion configured to couple to the palm member and comprises an opening configured for fluid communication with a vacuum system, wherein each of the plurality of finger members is configured to bend based on vacuum pressure actuation generated by the vacuum system via the opening of the coupling end portion of the finger member

402 applying a vacuum pressure to the plurality of finger members so as to create a bending motion of the plurality of finger members

TOP VIEW

SECTION A-A

BOTTOM VIEW

TOP VIEW

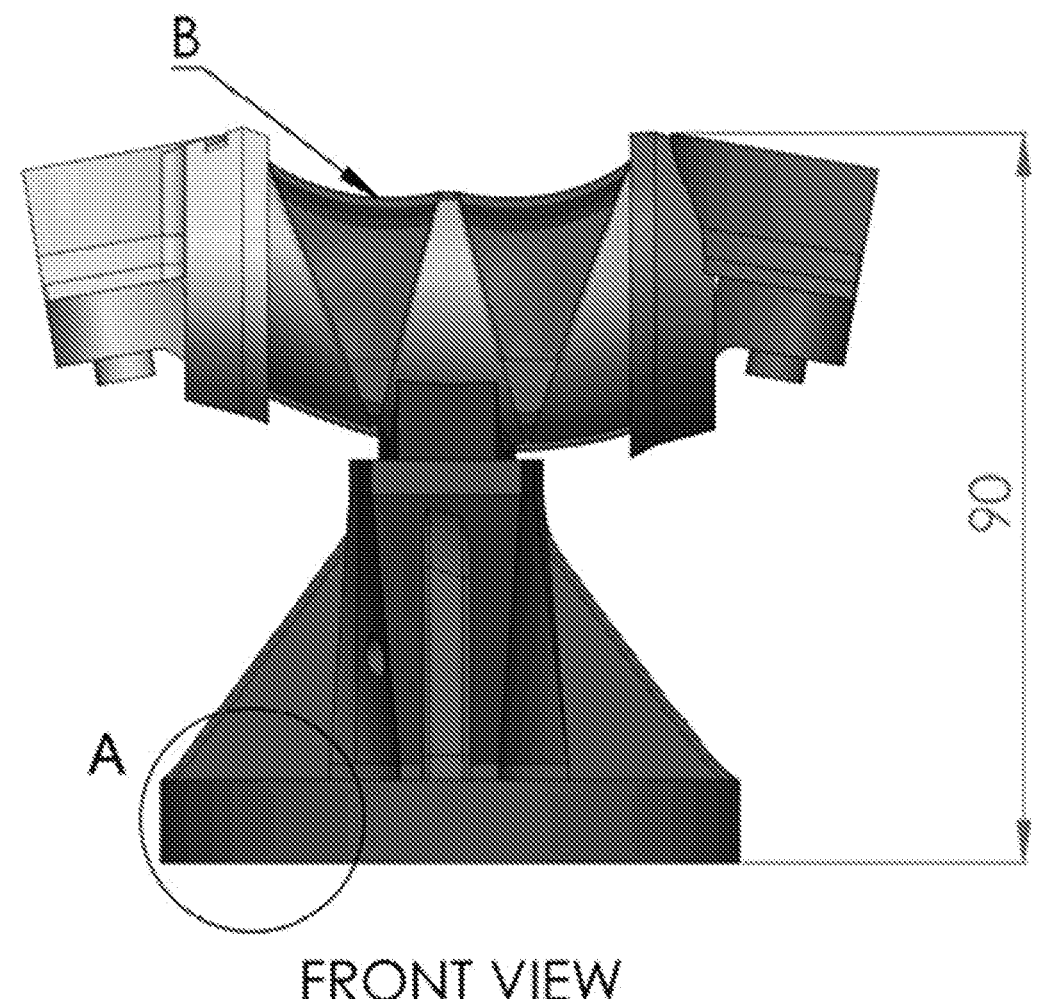
FRONT VIEW
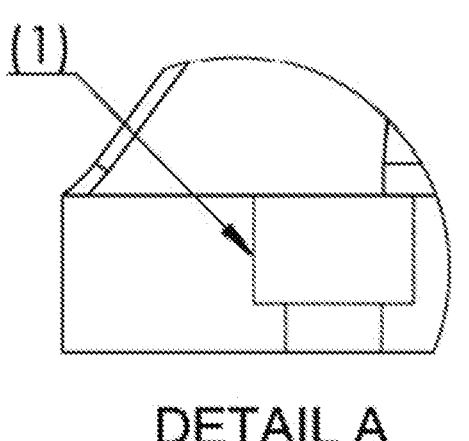
DETAIL A
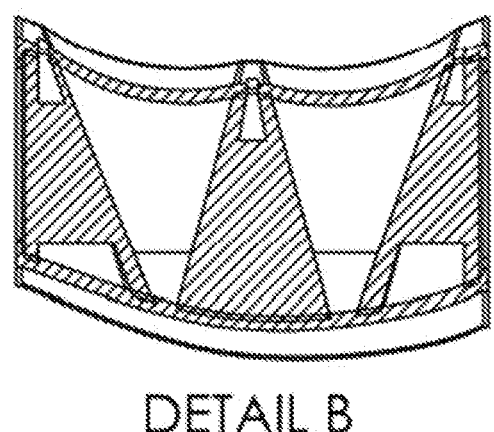
DETAIL B
FIG. 7D

1110

1110

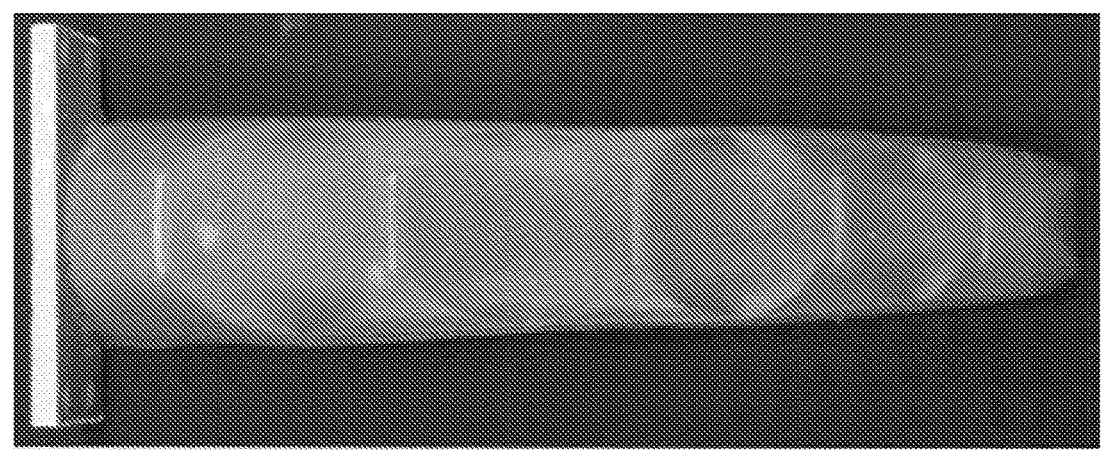
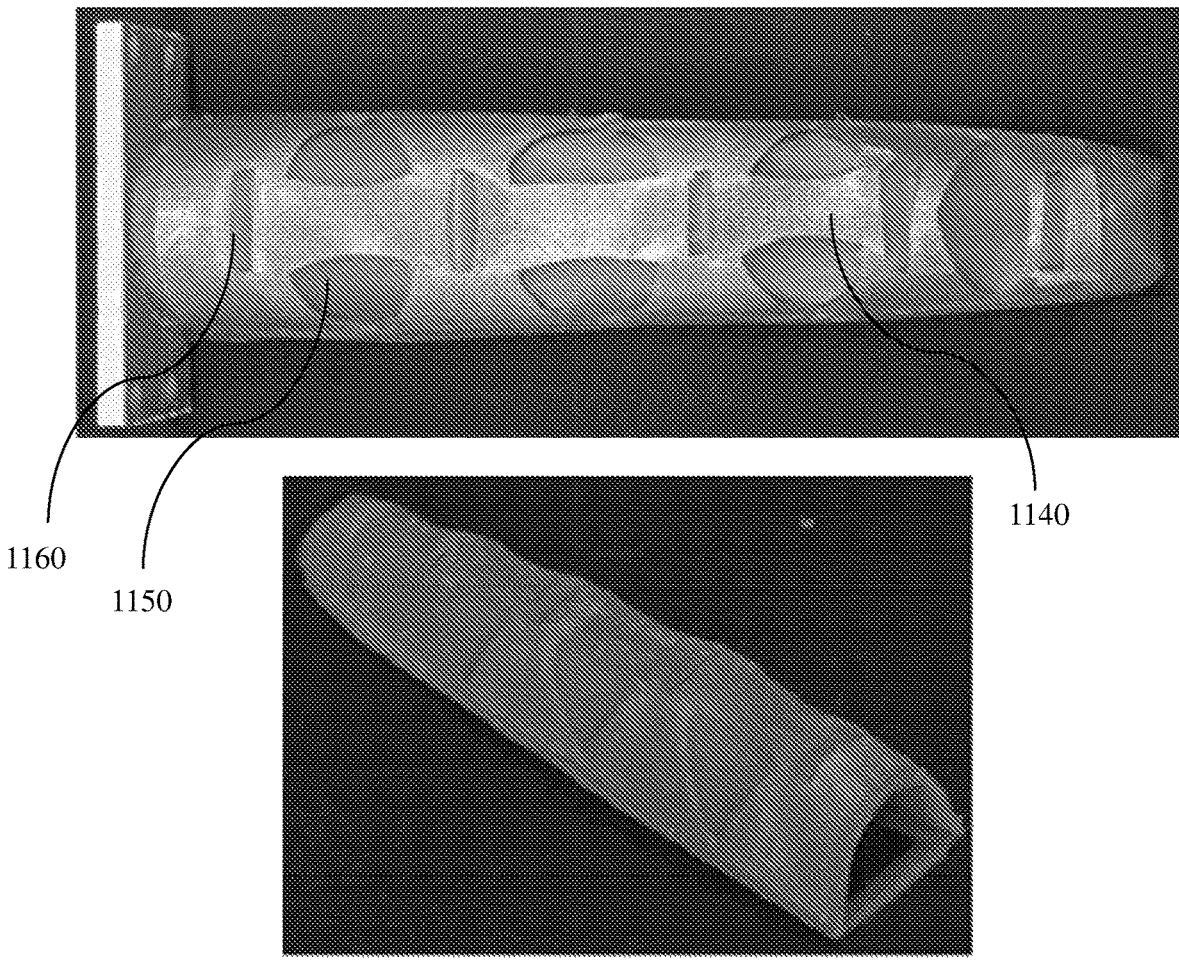
1160
1150
1140
FIG. 11D

1310

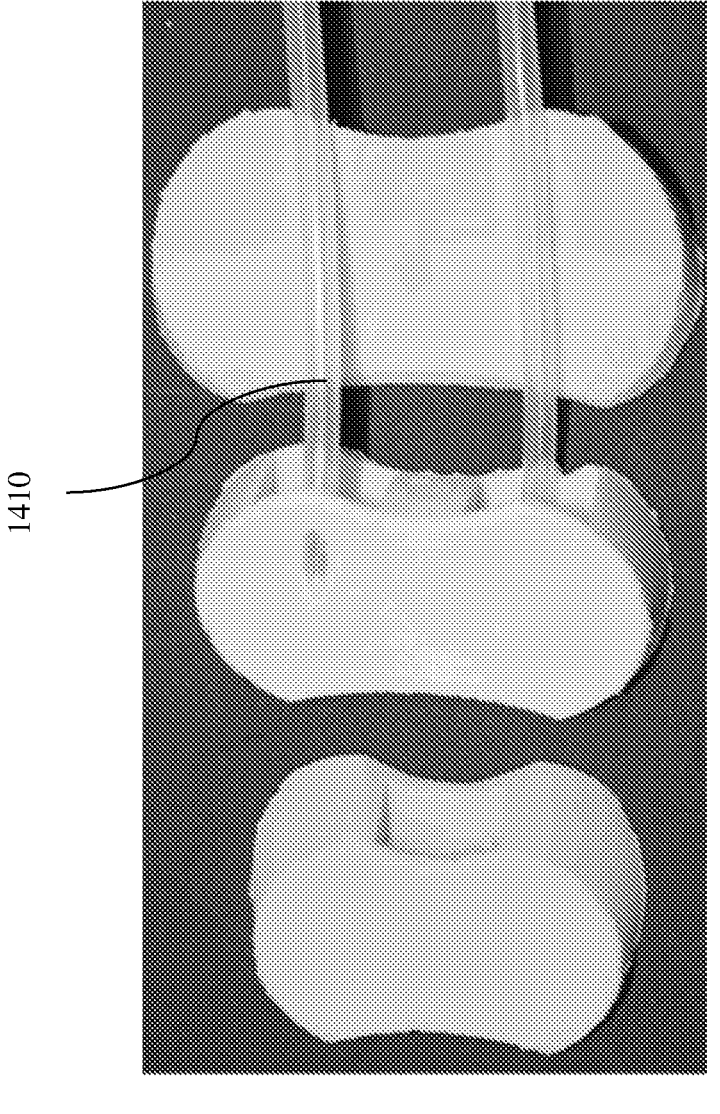
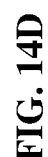
1410
FIG. 14D
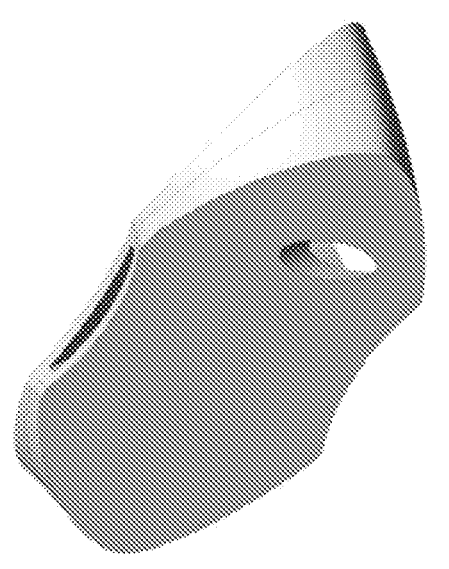
FIG. 14C

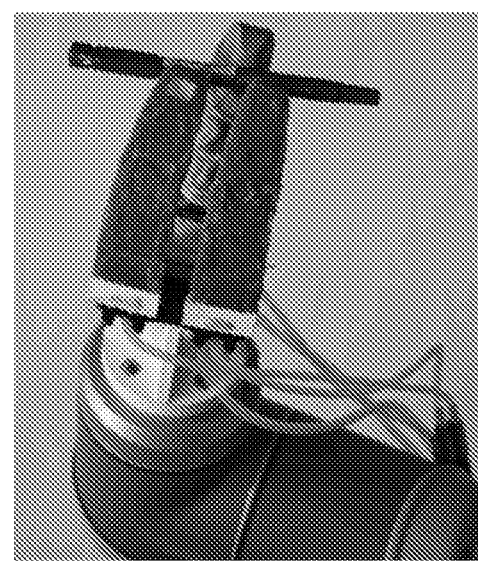
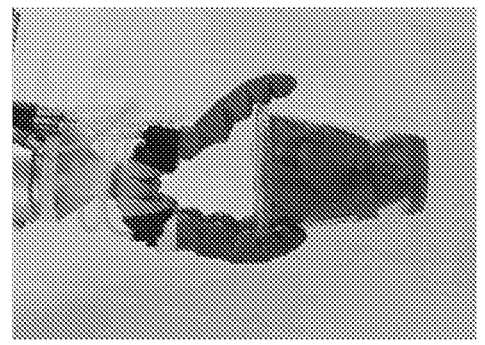
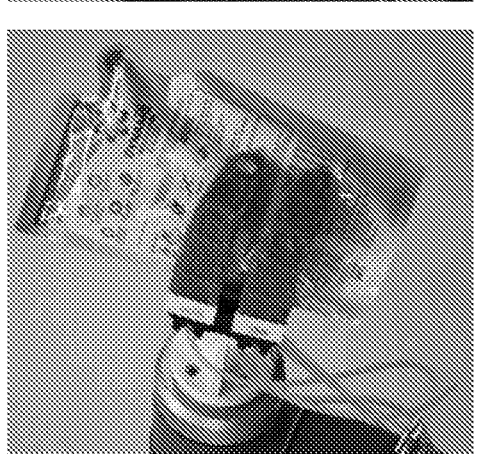
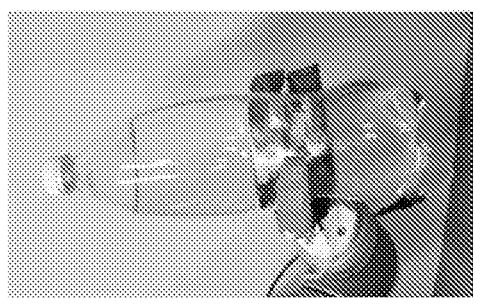
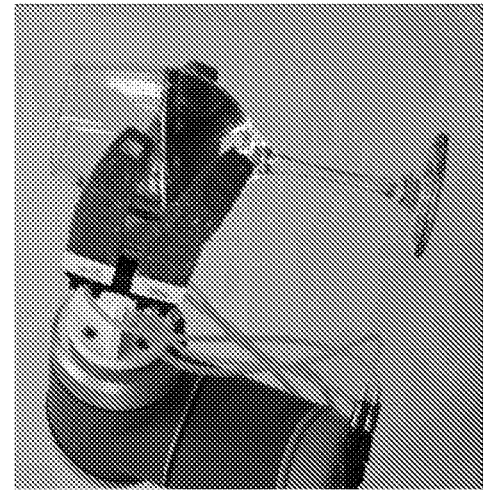
FIG. 21A

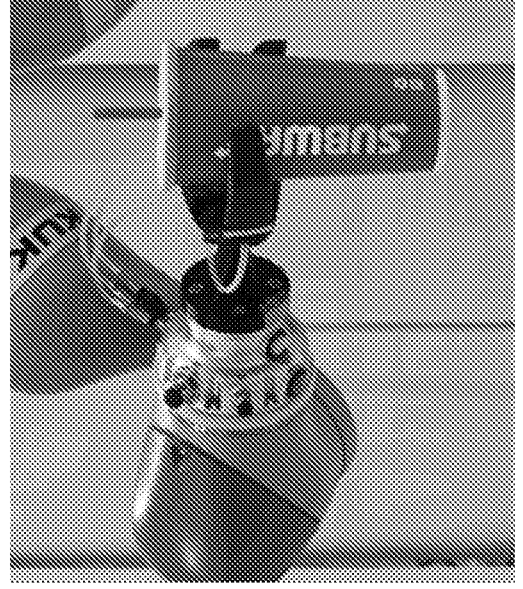
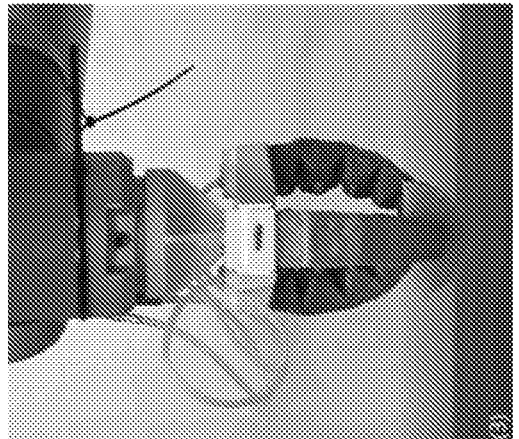
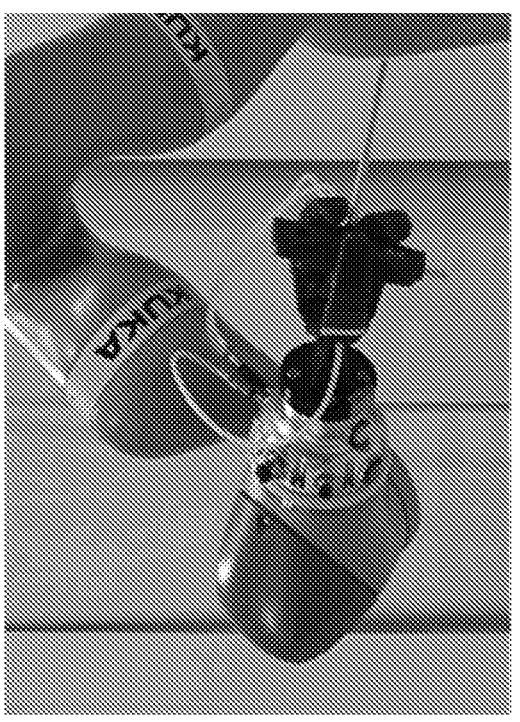
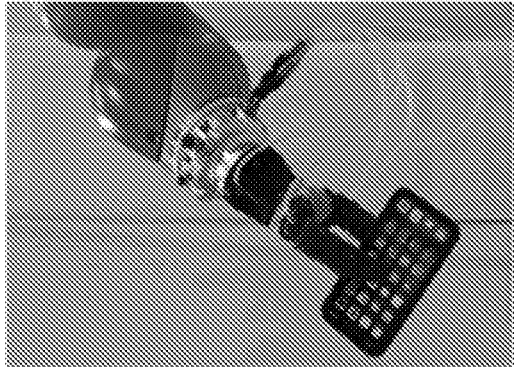
FIG. 21B

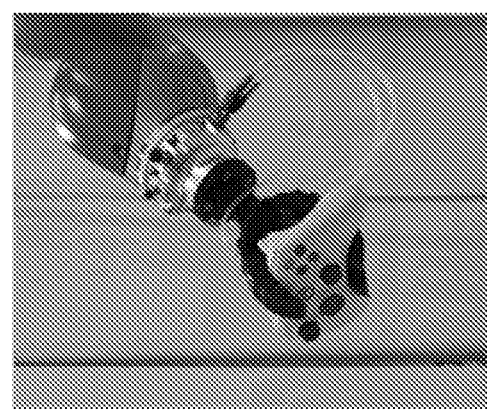
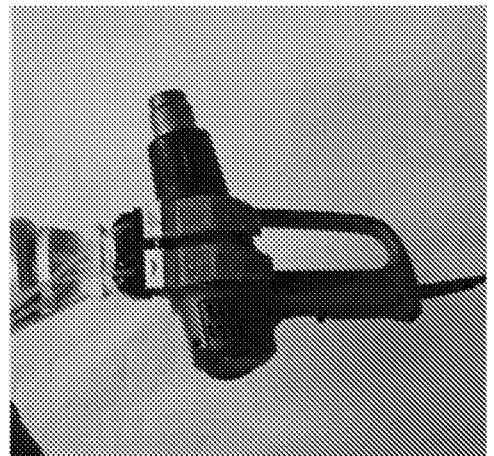
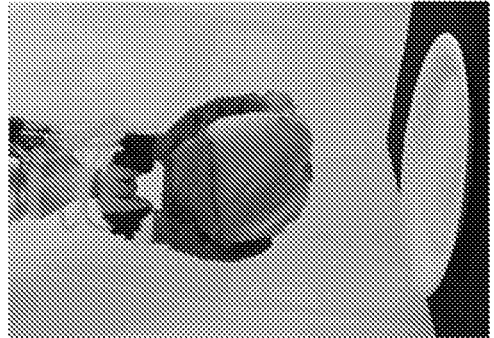
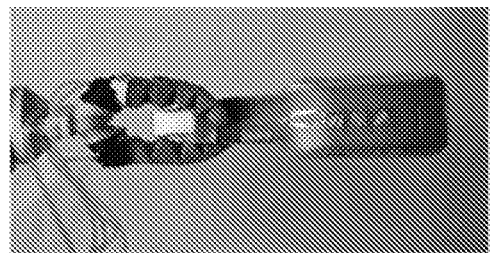
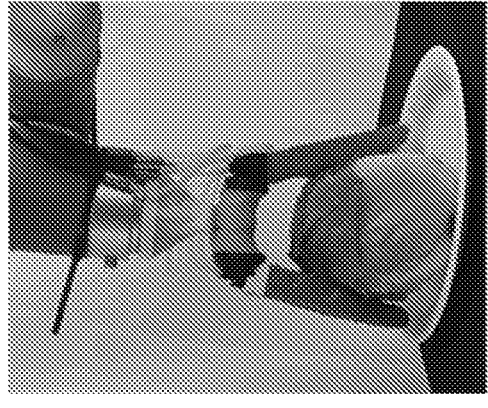
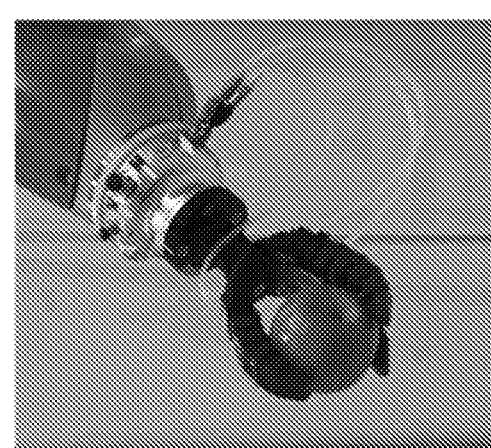
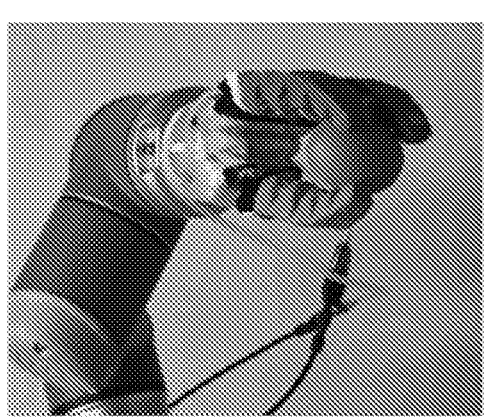
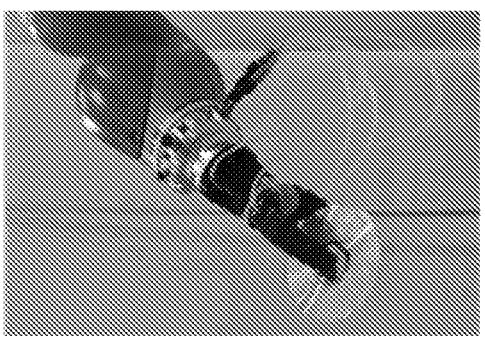
FIG. 21C

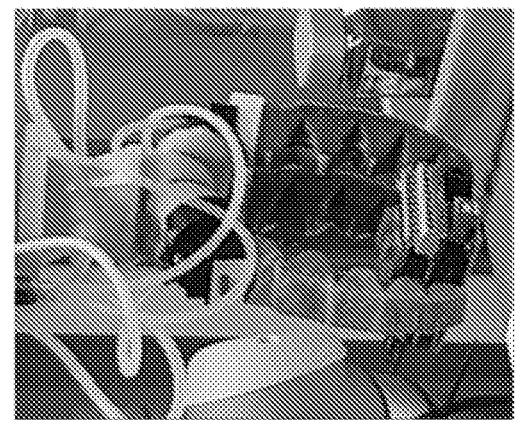
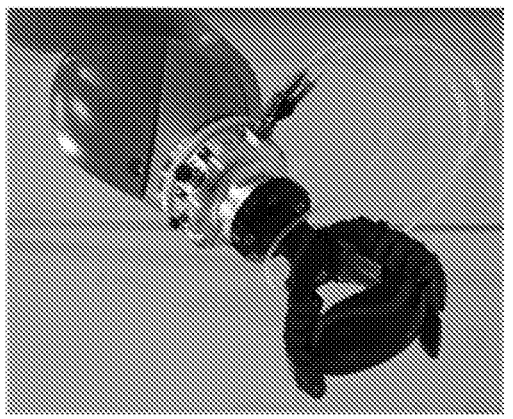
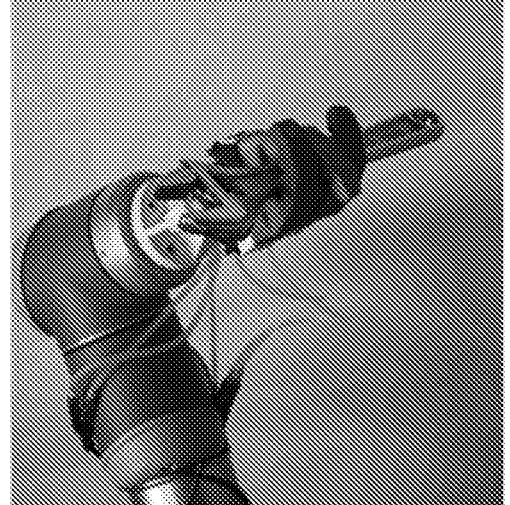
FIG. 21D

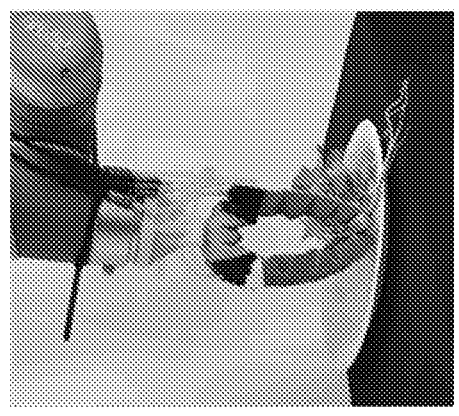
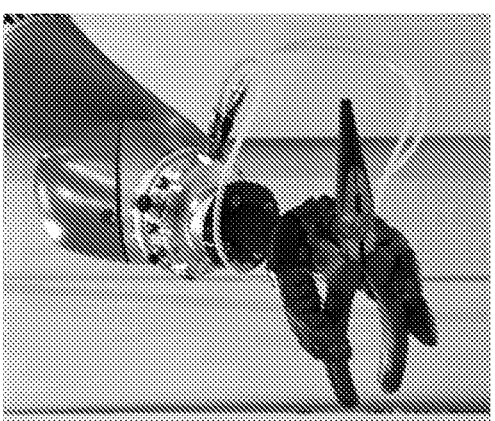
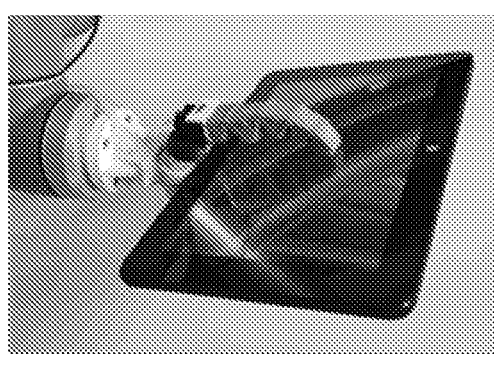
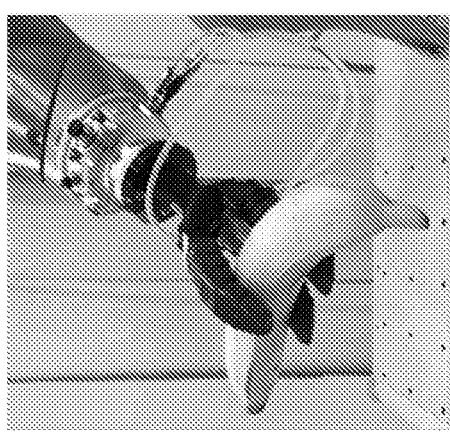
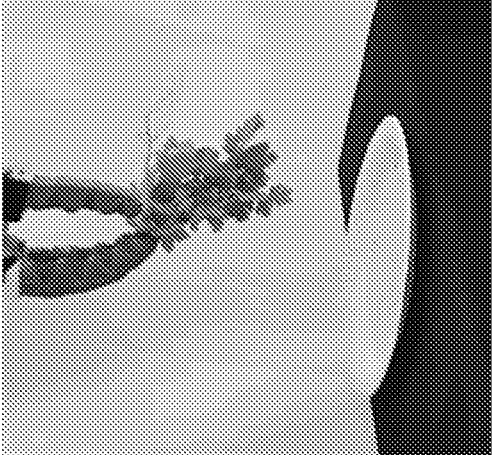
FIG. 21E

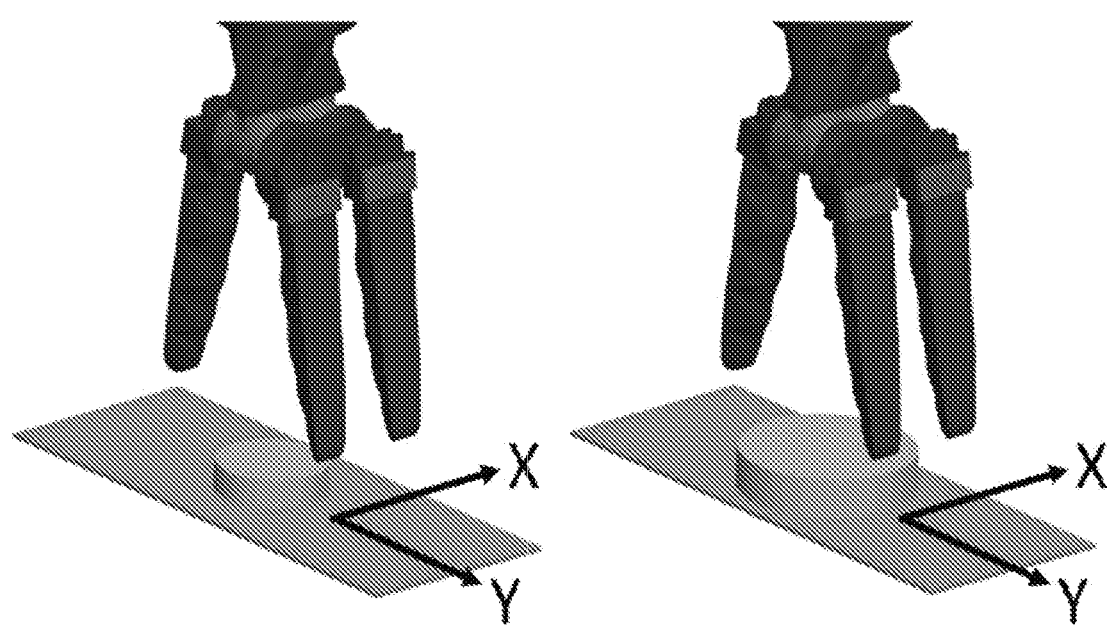
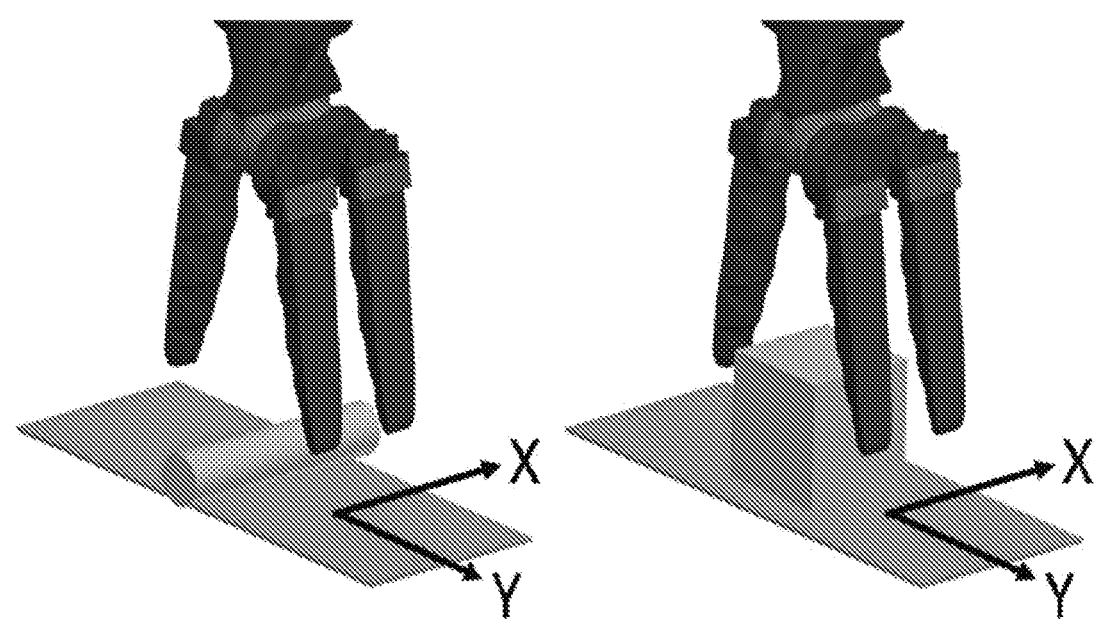
FIG. 22C

| Objects | W | SUTID Gripper | | | | | Origami | | | | | Jamming | | | | | Bellows-Style | | | | |
|---|---|---|---|---|---|---|---|---|---|---|---|---|---|---|---|---|---|---|---|---|---|
| | | S | C | P | E | H | S | C | P | E | H | S | C | P | E | H | S | C | P | E | H |
| Broccoli | 406 | | | | | | | | | | | | | | | | | | | | |
| Eggplant | 118 | | | | | | | | | | | | | | | | | | | | |
| Grape bunch | 212 | | | | | | | | | | | | | | | | | | | | |
| Mushroom | 89 | | | | | | | | | | | | | | | | | | | | |
| Kiwi | 98 | | | | | | | | | | | | | | | | | | | | |
| Potato | 420 | | | | | | | | | | | | | | | | | | | | |
| Potato chip | 4 | | | | | | | | | | | | | | | | | | | | |
| Bok Choy | 138 | | | | | | | | | | | | | | | | | | | | |
| Apple | 164 | | | | | | | | | | | | | | | | | | | | |
| Banana | 167 | | | | | | | | | | | | | | | | | | | | |
| Tomato | 114 | | | | | | | | | | | | | | | | | | | | |
| Pack of pulses | 513 | | | | | | | | | | | | | | | | | | | | |
| Egg | 21 | | | | | | | | | | | | | | | | | | | | |
| Rittersport chocolate | 102 | | | | | | | | | | | | | | | | | | | | |
| Ferrero Rocher box | 183 | | | | | | | | | | | | | | | | | | | | |
| Hazelnut cream | 230 | | | | | | | | | | | | | | | | | | | | |
| Hersheys chocolate bar | 99 | | | | | | | | | | | | | | | | | | | | |
| Cup noodles | 100 | | | | | | | | | | | | | | | | | | | | |
| Cereal box | 430 | | | | | | | | | | | | | | | | | | | | |
| Pack of bread | 280 | | | | | | | | | | | | | | | | | | | | |
| Jam jar | 642 | | | | | | | | | | | | | | | | | | | | |
| Soda bottle | 2105 | | | | | | | | | | | | | | | | | | | | |
| Spray bottle | 1207 | | | | | | | | | | | | | | | | | | | | |
| Wine glass | 245 | | | | | | | | | | | | | | | | | | | | |
| Coke can | 370 | | | | | | | | | | | | | | | | | | | | |

FIG. 23A

| Objects | W | SUTID Gripper | | | | | Origami | | | | | Jamming | | | | | Bellows-Style | | | | |
|---|---|---|---|---|---|---|---|---|---|---|---|---|---|---|---|---|---|---|---|---|---|
| | | S | C | P | E | H | S | C | P | E | H | S | C | P | E | H | S | C | P | E | H |
| Coin | 8 | | | | | | | | | | | | | | | | | | | | |
| Water bottle | 653 | | | | | | | | | | | | | | | | | | | | |
| Wine bottle | 676 | | | | | | | | | | | | | | | | | | | | |
| Shampoo dispenser | 871 | | | | | | | | | | | | | | | | | | | | |
| WD40 | 312 | | | | | | | | | | | | | | | | | | | | |
| 3M adhesive spray | 567 | | | | | | | | | | | | | | | | | | | | |
| Mug | 315 | | | | | | | | | | | | | | | | | | | | |
| Futaba RC | 682 | | | | | | | | | | | | | | | | | | | | |
| iPhone | 148 | | | | | | | | | | | | | | | | | | | | |
| Galaxy tablet | 678 | | | | | | | | | | | | | | | | | | | | |
| Xbox controller | 281 | | | | | | | | | | | | | | | | | | | | |
| Scissors | 98 | | | | | | | | | | | | | | | | | | | | |
| Padlock | 163 | | | | | | | | | | | | | | | | | | | | |
| Hot gun | 1154 | | | | | | | | | | | | | | | | | | | | |
| PC mouse | 93 | | | | | | | | | | | | | | | | | | | | |
| PC keyboard | 215 | | | | | | | | | | | | | | | | | | | | |
| Flashlight | 345 | | | | | | | | | | | | | | | | | | | | |
| Allen key w/ T-handle | 159 | | | | | | | | | | | | | | | | | | | | |
| Marker pen | 67 | | | | | | | | | | | | | | | | | | | | |
| Board marker | 35 | | | | | | | | | | | | | | | | | | | | |
| Liquid refill | 368 | | | | | | | | | | | | | | | | | | | | |
| Toothpaste | 251.7 | | | | | | | | | | | | | | | | | | | | |
| Travel mask | 15 | | | | | | | | | | | | | | | | | | | | |
| Portable lamp | 47 | | | | | | | | | | | | | | | | | | | | |
| Metal gear | 2100 | | | | | | | | | | | | | | | | | | | | |
| Compact disc | 14 | | | | | | | | | | | | | | | | | | | | |
| Metal gear-shaft assembly | 2740 | | | | | | | | | | | | | | | | | | | | |

GRIPPING APPARATUS, METHOD OF FORMING THE GRIPPING APPARATUS AND METHOD OF OPERATING THEREOF

CROSS-REFERENCE TO RELATED APPLICATION

This is a national phase of PCT application PCT/SG2021/050096, which claims the benefit of priority of Singapore Patent Application No. 10202001712Q, filed on 26 Feb. 2020, the content of each of which is hereby incorporated by reference in its entirety for all purposes.

TECHNICAL FIELD

The present invention generally relates to a gripping apparatus, a method of forming the gripping apparatus and a method of operating the gripping apparatus.

BACKGROUND

Traditional grippers used in industrial automation are designed for specific tasks and their mechanisms are composed primarily of stiff components. These systems tend to be expensive, heavy, bulky, and not easily adaptable to a wide variety of object shapes, sizes, and compliances. New industrial applications increasingly involve a wider range of parts to be grasped, and to accommodate part variety in size and complexity, grippers need to be changed on the go, requiring tool changers and other supporting hardware. As a result, operational cycle times increase due to the constant need to pause for tool changes, and cell space is reduced due to the need to place multiple grippers (i.e., one for every possible task) on a fixture in the work space.

In contrast, soft grippers, thanks to the soft materials used in their structures, allow direct handling of various components which might differ in size, complexity, weight, and compliance. Their soft structures can achieve better control over the contact area with objects and facilitate various grasping modes such as pinching, wrap around, pincer, tong, etc.

The state of the art in soft grippers can be categorized by the actuation type used for grasping and the added features implemented in addition to grasping. Designs are generally anthropomorphic and positive pneumatic pressure-driven grippers are currently the most widely used in the field. In a conventional apparatus, "pneu-net" actuators which consisted of inflatable channels cast within a soft extensible elastomer structure paired with a bottom layer made of a harder elastomer were used. Upon inflation, actuator bending resulted from the difference in volume between the soft and hard layers. A similar approach was used in another conventional apparatus to develop a robotic hand using "PneuFlex" actuators as fingers. The design was capable of recreating the grasping modes detailed in Feix T, Romero J, Schmiedmayer H, Dollar AM and Kragic D (2016) The grasp taxonomy of human grasp types. IEEE Transactions on Human-Machine Systems 46(1): 66-77, showing high versatility, although the maximum payload achieved was only close to 600 g. In another conventional apparatus, a similar design principle was used and the robotic tentacles had high dexterity and the capability to grasp and manipulate objects with complex shapes.

An alternative actuation mode involves granular jamming which is the hardening of a volume of particles due to internal friction forces generated by vacuum packing. This approach has been used to both achieve actuation and stiffness control. In another conventional apparatus, a gripper made of a flexible membrane bag filled with granular material was developed. The gripper could conform to a large range of object geometries and lift them using particle jamming. In yet another conventional apparatus, a hybrid design with soft fingers composed of a chamber filled with granular material for stiffness control and pneumatic channels for actuation was employed.

Artificial muscles that comprise origami-like structures made of hard materials encapsulated by thin soft membranes, have also been demonstrated. In another approach, a design where vacuum is used to collapse a soft membrane with an internal origami-like hard structure used to control the actuation mode as a result of the volume reduction. These structures can contract over 90% of their initial length, generate stresses of 600 kPa, and produce peak power densities over 2 kW/kg (excluding the vacuum generation hardware). Various hard structures were used to achieve bending, torsion and contraction.

Cable-driven mechanisms for actuation of soft grippers have also been explored. Tension-controlled cables embedded within a gripper soft fingers are used to force buckling. Finger deformation and grasping capabilities are controlled by the structural design (e.g., wedges and other flexure-enabling geometries at joints) and material properties. FIG. 1 shows some of the common types of designs used in both rigid and soft grippers. For example, the traditional grippers include (a) vacuum gripper with suction cups, (b) parallel pneumatic gripper (pinching action), (c) hydraulic gripper (collet type), (d) servo-electric gripper (pinching action), while the types of soft grippers include (e) granular jamming-based soft gripper, (f) gripper with soft fingers driven by positive pneumatic pressure, and (g) soft gripper with cable-driven fingers.

The state of the art in soft grippers has various limitations in terms of design and scalability in payload. Grippers based on positive-pressure actuators such as pneu-nets are not suitable for large payloads since large grasping forces can only be achieved by ramping up pressure. High pressures in the range of 50-345 kPa used in such grippers can make the system unsafe in case of failures, especially in an industry assembly line. While grippers based on tentacle design have high dexterity and manipulation capabilities, they have low payload scalability due to the limitations in safe use of positive pressure. In another conventional apparatus, 3D printed grippers use photopolymers such as Agilus Black and VeroClear that fail after 25-200% elongation range, making them unusable for actuators that undergo large bending. Besides, the grasping forces demonstrated by these grippers limit their ability to handle heavy industrial components.

Grippers based on jamming of granular material or layers require the payload surface to be smooth in order to provide a high holding force. The holding force can vary by an order of magnitude depending on the shape of the object as it depends on the airtight seal and contact created between the membrane and payload. Such approach may not be feasible for parts of different sizes and geometries. Soft grippers with cable-driven finger mechanisms require servo motors to control cable actuation which can make the end-effector heavy and bulky and generally not as fast as pressure-driven designs. Origami-like structures developed in another gripping apparatus, where actuation is achieved by applying negative pressures, are much safer than other soft-gripper actuators that operate with high positive pressures. Moreover, the force generated by these grippers is due to a combination of material properties and the vacuum pressure, unlike other conventional gripping apparatuses where payload is increased solely by increasing the positive pressure injected into the system.

As described, conventional soft grippers can be fabricated using many techniques, including lost wax-core casting, monolithic and multi-step 3D printing, soft lithography and so on. However, most of these methods are not scalable since they are time consuming, involve wastage of material or are not compatible to be used with materials that offer higher tensile strengths and elongations.

A need therefore exists to provide a gripping apparatus that seeks to overcome, or at least ameliorate, one or more of the deficiencies of conventional gripping apparatus and provide an improved gripping apparatus. It is against this background that the present invention has been developed.

SUMMARY

According to a first aspect of the present invention, there is provided a gripping apparatus comprising:

a palm member;

a plurality of finger members configured to couple to the palm member, each of the plurality of finger members comprising:

a plurality of phalange members arranged in series along a longitudinal axis of the finger member, each phalange member being formed of an elastomer;

a multilayer finger membrane configured to encapsulate the plurality of phalange members, the multilayer finger membrane being formed of multiple material layers, comprising a strain limiting layer configured to limit the multilayer finger membrane from stretching; and a coupling end portion configured to couple to the palm member and comprises an opening configured for fluid communication with a vacuum system, wherein each of the plurality of finger members is configured to bend based on vacuum pressure actuation generated by the vacuum system via the opening of the coupling end portion of the finger member.

According to a second aspect of the present invention, there is provided a method of forming a gripping apparatus, the method comprising:

providing a palm member;

providing a plurality of finger members configured to couple to the palm member, each of the plurality of finger members comprising:

a plurality of phalange members arranged in series along a longitudinal axis of the finger member, each phalange member being formed of an elastomer;

a multilayer finger membrane configured to encapsulate the plurality of phalange members, the multilayer finger membrane being formed of multiple material layers, comprising a strain limiting layer configured to limit the multilayer finger membrane from stretching; and a coupling end portion configured to couple to the palm member and comprises an opening configured for fluid communication with a vacuum system, wherein each of the plurality of finger members is configured to bend based on vacuum pressure actuation generated by the vacuum system via the opening of the coupling end portion of the finger member.

According to a third aspect of the present invention, there is provided a method of operating the gripping apparatus as described above according to the first aspect of the present invention, the method comprising:

applying a vacuum pressure to the plurality of finger members so as to create a bending motion of the plurality of finger members.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 3 depicts a schematic flow diagram of a method of forming a gripping apparatus according to various embodiments of the present invention;

FIG. 4 depicts a schematic flow diagram of a method of operating the gripping apparatus as described hereinbefore according to various embodiments;

FIGS. 7A-7D show a CAD model of a palm member according to various example embodiments;

FIG. 11D illustrates images of the cast multilayer finger membrane and embedded strain-limiting layer according to various example embodiments;

FIGS. 14A-14C illustrate an exemplary method of fabricating a palm wedge member according to various example embodiments, and FIG. 14D illustrates an image of cast palm block members according to various example embodiments;

FIGS. 21A-21E show images an of exemplary gripping apparatus grasp and manipulation of various objects in different orientations according to various example embodiments;

FIGS. 22A-22C illustrate repeatability measurements for pick and place of four objects of different geometries and weights according to various example embodiments; and FIGS. 23A-23B show a table (Table 4) illustrating comparison of objects that can be lifted by the gripping apparatus according to various example embodiments.

DETAILED DESCRIPTION

Various embodiments of the present invention provide a gripping apparatus, a method of forming the gripping apparatus and a method of operating the gripping apparatus.

Figure 1:
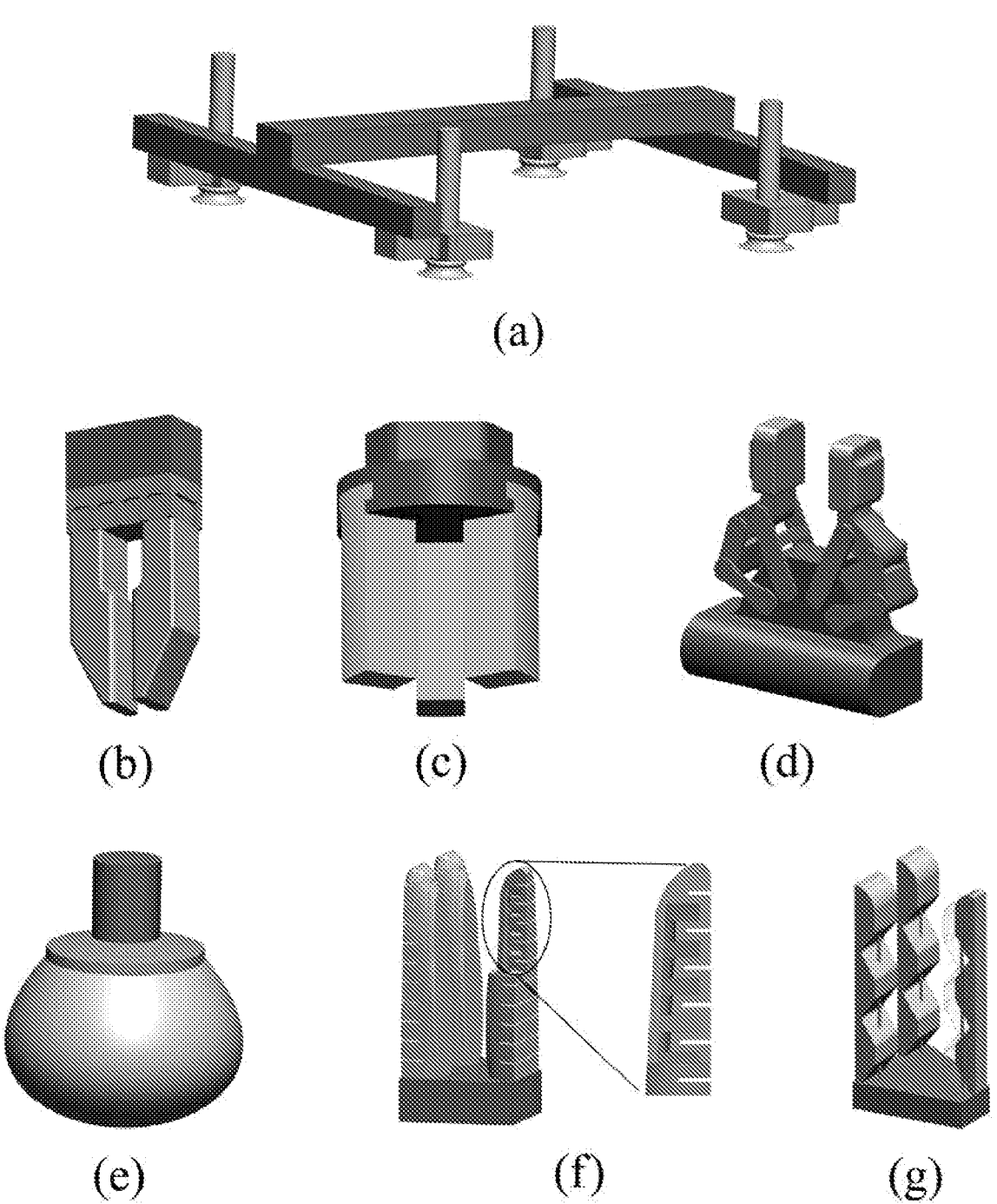
FIG. 1 depicts a schematic drawing of example types of designs used in both rigid and soft grippers.
Figure 2:
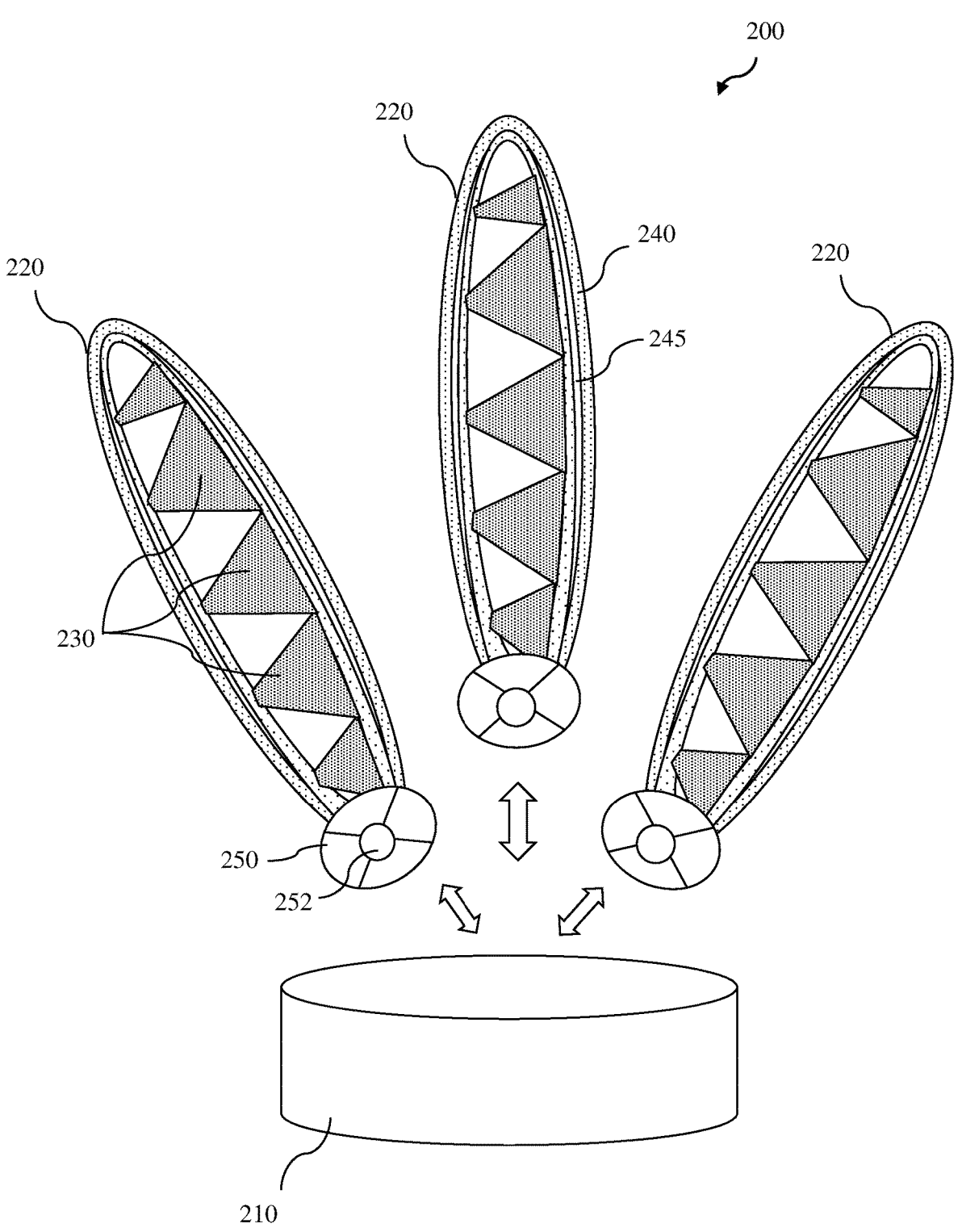
FIG. 2 depicts a schematic drawing of a gripping apparatus according to various embodiments of the present invention.

FIG. 2 depicts a schematic drawing of a gripping apparatus 200 (which may also be herein interchangeably referred to as a gripper assembly or simply as a gripper) according to various embodiments of the present invention. The gripping apparatus 200 comprises: a palm member 210; a plurality of finger members 220 configured to couple to the palm member, each of the plurality of finger members comprising: a plurality of phalange members 230 arranged in series along a longitudinal axis of the finger member, each phalange member being formed of an elastomer; a multilayer finger membrane 240 configured to encapsulate the plurality of phalange members, the multilayer finger membrane being formed of multiple material layers, comprising a strain limiting layer 245 configured to limit the multilayer finger membrane from stretching; and a coupling end portion 250 configured to couple to the palm member and comprises an opening 252 configured for fluid communication with a vacuum system, wherein each of the plurality of finger members is configured to bend based on vacuum pressure actuation generated by the vacuum system via the opening of the coupling end portion of the finger member.

In relation to the strain limiting layer, it may facilitate the multilayer finger membrane being inextensible yet flexible for bending. The shape of the strain limiting layer may be tailored to avoid bending in the backwards and lateral direction. Therefore, the gripping apparatus may maintain a stable grip while manipulating at high accelerations, and without excessive stretching of the multilayer finger membrane. Accordingly, the gripping apparatus may have improved force and aperture control for lifting and manipulating delicate items.

In various embodiments, the multilayer finger membrane comprises a first flexible membrane layer and a second flexible membrane layer, and the strain limiting layer is embedded between the first and second flexible membrane layers. In relation to the multilayer finger membrane being formed of multiple material layers, the first and second flexible membrane layers are formed of different materials from the strain limiting layer.

The first flexible membrane layer and the second flexible membrane layer may each be formed of polymer. In a non-limiting example, the multilayer finger membrane may be formed having a modulus of elasticity E, ranging from about 50 kPa up to about 1 MPa depending on the application. In various embodiments, the first flexible membrane layer and the second flexible membrane layer are each a soft silicone layer, and the strain limiting layer is a fiberglass fabric layer. The softness of the components of the gripping apparatus, such as the multilayer finger membrane and the phalange members formed of an elastomer, enables robust open loop grasping even when components are not properly aligned, making the gripper compliant to errors in robot or payload position.

In various embodiments, for each of the plurality of finger members, each of the plurality of phalange members of the finger member comprises a first side wall and a second side wall on an opposite side of the phalange member with respect to the first side wall, and a through hole configured for fluid communication with the vacuum system, wherein the through hole of the phalange member extends from the first side wall to the second side wall. The first side wall and the second side wall may be slanted with respect to a base of the phalange member. In various embodiments, a tubing or fluid connector may be inserted in the opening of the coupling end portion and one of the phalange member of the plurality of finger members which is nearest to the coupling end portion for fluid communication with the vacuum system.

In various embodiments, for each of the plurality of finger members, the through hole of each of the plurality of phalange members of the finger member are at least substantially aligned with the longitudinal axis of the finger member.

In various embodiments, for each of the plurality of finger members, each of the plurality of phalange members of the finger member further comprises a first side portion and a second side portion opposite to the first side portion, and the first side portion and the second side portion are bonded to the multilayer finger membrane of the finger member.

In various embodiments, for each of the plurality of finger members, the first side portion and the second side portion of each of the plurality of phalange members of the finger member comprises a first opening and a second opening, respectively, and the multilayer finger membrane of the finger member comprises, for each of the plurality of pha-
lange members of the finger member, a first opening and a
second opening corresponding to the first opening and the
second opening of the phalange member.

In various embodiments, the first and second side portions
are bonded to the multilayer finger membrane of the finger
member at the first and second openings of the first and
second side portions and the corresponding first and second
openings of the multilayer finger membrane, respectively.

In various embodiments, for each of the plurality of finger
members, for each pair of immediately adjacent phalange
members of the plurality of phalange members of the finger
member, the second side wall of a first phalange member of
the pair and the first side wall of a second phalange member
of the pair are configured to define a space therebetween
when the finger member is at a relaxed state so as to provide
the space for the second side wall of the first phalange
member and the first side wall of the second phalange
member to move towards each other when the finger mem-
ber is in a bending state, wherein the finger member is
configured to receive vacuum pressure at the space between
each pair of immediately adjacent phalange members for
causing the multilayer finger membrane to deform around
the plurality of phalange members of the finger member to
create a net bending motion of the finger member towards an
object. For example, when vacuum is applied via the cou-
pling end portion, a net bending torque is created due to the
negative pressure at the spaces between each pair of imme-
diately adjacent phalange members and the stretching of the
multilayer finger membrane. In various embodiments, the
space has a substantially V-shaped cross-section when the
finger member is at the relaxed state.

In various embodiments, the multilayer finger membrane
may further comprise a dip portion over the space between
each pair of immediately adjacent phalange members, so as
to reduce the amount of material of the multilayer finger
membrane that folds into the space between the pair of
immediately adjacent phalange members during actuation.

In various embodiments, there may be provided any
multiple numbers of finger members as desired or as appro-
priate, such as two to eight finger members, two to six finger
members, two to four finger members, or three finger
members.

In various embodiments, the coupling end portion may be
formed by three-dimensional (3D) printing.

In various embodiments, the palm member comprises a
plurality of palm block members (or palm sectional mem-
bers) arranged in series, each palm block member being
formed of an elastomer; and a multilayer palm membrane
configured to encapsulate the plurality of palm block mem-
bers, the multilayer palm membrane being formed of mul-
tiple material layers, comprising a strain limiting layer
configured to limit the multilayer palm membrane from
stretching, and a first coupling end portion configured to
couple to a robotic component (e.g., robotic arm/robotic
manipulator) and comprises an opening configured for fluid
communication with the vacuum system, wherein the palm
member is configured to bend based on vacuum pressure
actuation generated by the vacuum system via the opening
of the first coupling end portion of the palm member. The
palm member may provide higher control of the aperture of
the gripping apparatus and mimics the human palm by
offering more contact and higher grasping forces. By pro-
viding an active palm member, the gripping apparatus may
grasp a wide range of geometries while achieving maximum
payloads of tens of newtons, such as 30N (about 3 kgf), in
a non-limiting example.

In a non-limiting example, the multilayer palm membrane
may be formed having a modulus of elasticity E, ranging
from about 50 kPa up to about 1 MPa depending on the
application.

In various embodiments, the palm member further com-
prises a plurality of second coupling end portions configured
to couple to corresponding coupling end portions of the
finger members, respectively. In various embodiments, the
plurality of finger members may be connected to the palm
member using the second coupling end portions of the palm
member. The second coupling end portions may be mount-
ing sockets or connectors to receive a respective coupling
end portion of a finger member. The second coupling end
portions may include, but is not limited to, 3D printed
connectors or interfaces fitted with metal inserts, which
allows for simple mechanical plug-and-play.

In various embodiments, the plurality of phalange mem-
bers and/or the palm block members may be the three-
dimensional (3D) polygons. In a non-limiting example, the
plurality of phalange members may each be formed having
a modulus of elasticity E, ranging from about 0.6 MPa to
about 200 MPa, depending on the application. Similarly, the
palm block members may each be formed having a modulus
of elasticity E, ranging from about 0.6 MPa to about 200
MPa, depending on the application.

In various embodiments, for each pair of immediately
adjacent palm block members of the plurality of palm block
members of the palm member, a second side wall of a first
palm block member of the pair and a first side wall of a
second palm block member of the pair are configured to
define a space therebetween when the palm member is at a
relaxed state so as to provide the space for the second side
wall of the first palm block member and the first side wall
of the second palm block member to move towards each
other when the palm member is in a bending state, wherein
the palm member is configured to receive vacuum pressure
at the space between each pair of immediately adjacent palm
block members for causing the multilayer palm membrane
to deform around the plurality of palm block members of the
palm member to create a net bending motion of the palm
member towards an object. For example, when vacuum is
applied via the first coupling end portion, a net bending
torque is created due to the negative pressure at the spaces
between each pair of immediately adjacent palm block
members and the stretching of the multilayer palm mem-
brane.

In various embodiments, each of the plurality of palm
block members of the palm member comprises a first side
wall and a second side wall on an opposite side of the palm
block member with respect to the first side wall, and a
through hole configured for fluid communication with the
vacuum system wherein the through hole of the palm block
member extends from the first side wall to the second side
wall.

In various embodiments, one or more tubings or fluid
connectors may be inserted through the opening of the first
coupling end portion and one of the palm block member of
the plurality of palm block members, such as the central
palm block member, for fluid communication with the
vacuum system (through which vacuum is applied in the
spaces between each pair of immediately adjacent palm
block members to create a bending moment).

In various embodiments, each of the plurality of palm
block members of the palm member further comprises a first
side portion and a second side portion opposite to the first side portion, and the first side portion and the second side portion are bonded to the multilayer palm membrane of the palm member.

In various embodiments, the plurality of finger members is coupled to a first valve, and the palm member is coupled to a second valve, wherein the first valve and the second valve are configured to independently regulate the flow of fluid to the plurality of finger members and the palm member.

In various embodiments, for each of the plurality of finger members, each of the plurality of phalange members of the finger member further comprises a force sensor configured to detect applied force on the phalange member.

In various embodiments, the multilayer finger membrane comprises a flex sensor configured to detect bending of the finger member in medial and lateral directions.

As described, the hollow composite design of the actuator (e.g., each finger member, palm member) causes a multilayer membrane (an outer soft skin) to deform around the hard or stiff phalange members and/or palm block members (hard or stiff relative to the multilayer membrane), resulting in the bending or folding of the actuator. The plurality of phalange members and multilayer finger membrane may be formed of a combination of different materials of varying rigidities to achieve the desired bending and forces. Unlike conventional grippers which are limited in their ability to lift heavy payloads (more than 1 kg), lift complex geometries, lift non-rigid payloads or operate in non-dry environments, the gripping apparatus according to various embodiments may lift objects up to a few kilograms of weight, irregular polyhedrons, deformable or flexible objects or objects with wet surfaces. These advantages or technical effects will become more apparent to a person skilled in the art as the gripping apparatus 200 is described in more detail according to various embodiments or example embodiments of the present invention.

FIG. 3 depicts a schematic flow diagram of a method 300 of forming a gripping apparatus, such as the gripping apparatus 200 as described herein with reference to FIG. 2. The method 300 comprises: providing (at 302) a palm member; providing (at 304) a plurality of finger members configured to couple to the palm member, each of the plurality of finger members comprising a plurality of phalange members arranged in series along a longitudinal axis of the finger member, each phalange member being formed of an elastomer; a multilayer finger membrane configured to encapsulate the plurality of phalange members, the multilayer finger membrane being formed of multiple material layers, comprising a strain limiting layer configured to limit the multilayer finger membrane from stretching; and a coupling end portion configured to couple to the palm member and comprises an opening configured for fluid communication with a vacuum system, wherein each of the plurality of finger members is configured to bend based on vacuum pressure actuation generated by the vacuum system via the opening of the coupling end portion of the finger member.

In various embodiments, the method 300 is for forming the gripping apparatus 200 as described hereinbefore with reference to FIG. 2, therefore, the method 300 may further include various steps corresponding to providing or forming various configurations and/or components/elements of the gripping apparatus 200 as described herein according to various embodiments, and thus such corresponding steps need not be repeated with respect to the method 300 for clarity and conciseness. In other words, various embodiments described herein in context of the gripping apparatus 200 is analogously or correspondingly valid for the method 300 (e.g., for forming the gripping apparatus 200 having various configurations and/or components/elements as described herein according to various embodiments), and vice versa.

In various embodiments, providing the gripping apparatus comprises forming the plurality of phalange members and the multilayer finger membrane by casting. In various other embodiments, providing the gripping apparatus comprises forming the plurality of phalange members and the multilayer finger membrane by additive manufacturing. In various embodiments, providing the gripping apparatus comprises forming the palm member by casting. In various other embodiments, providing the gripping apparatus comprises forming the palm member by additive manufacturing.

It will be appreciated by a person skilled in the art that various steps of the method 300 presented in FIG. 3 may be performed concurrently or simultaneously, rather than sequentially, as appropriate or as desired.

FIG. 4 depicts a schematic flow diagram of a method 400 of operating the gripping apparatus 200 as described hereinbefore according to various embodiments. The method 400 comprises: applying (at 402) a vacuum pressure to the plurality of finger members so as to create a bending motion of the plurality of finger members.

In various embodiments, the method 400 further comprises applying a vacuum pressure to the palm member so as to create a bending motion of the palm member.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Various example embodiments provide a gripping apparatus or soft gripper with an active palm to control grasp postures. The gripper structure may be a hybrid of soft and stiff components to facilitate integration with traditional arm manipulators. In various example embodiments, the gripping apparatus may have an anthropomorphic design of easily replaceable soft bending finger members and a folding palm member. For purpose of illustration, various example embodiments will be described with respect to a gripping apparatus having three finger members (three fingers) and a palm member, however, it will be appreciated by a person skilled in the art that the gripping apparatus may include other numbers of finger members. The finger members and palm member may be vacuum actuated. In various example embodiments, the soft gripper comprises three finger members and a palm member made of enclosed structures that fold onto itself under vacuum actuation. Internal phalange or block members, such as wedges for example, may be used to tailor the deformation of a soft outer reinforced multilayer membrane (e.g., skin) as vacuum collapses the composite structure. A computational finite element model may be used to predict finger kinematics. Due to the active palm, the gripper is capable of grasping a wide range of part geometries and compliances while achieving maximum payloads of tens of newtons in a non-limiting example. Accordingly, the gripping apparatus may allow whole hand manipulation enabled by active control of the palm member. The gripper natural softness enables robust open loop grasping even when components are not properly aligned.

The finger members and palm member may each have an anthropomorphic design. The finger members and palm member may be referred to as actuators. In various example embodiments, a novel multi-step casting and assembly technique, or additive manufacture steps, may be used to fabricate the actuators having a composite structure with embedded sensors allowing the use of a combination of materials of varying rigidities to achieve the desired bending and forces. In various example embodiments, multi-step casting, or additive manufacturing, and assembly may be used to develop hollow actuators (finger member having space defined between the phalange members and/or palm member having space defined between the palm block members) with embedded sensors and strain limiting layers.

In various example embodiment, the gripping apparatus may include three soft fingers with five phalanges each, mounted on a soft actuated palm. The fingers have a non-axisymmetric cross-section and are able to grasp and manipulate objects of various geometries. Instead of using origami-like structures, objects (e.g., 3D polygons or wedges) are embedded inside the soft skins and their material properties, geometries, and positioning are used to tailor bending motions. In addition, fabric membrane (skin) inserts are used to enable directional stiffness.

Another design consideration was to keep the gripper components modular and lightweight to allow easy installation on various robotic manipulators such as the KUKA IIWA 14 and UR10. The soft gripper can lift parts ranging from moderately heavy (e.g, about 3 kg) and stiff industrial components to small consumer products spanning a wide range of geometries and grasping modes. The payload may be easily scaled by changing the finger member and/or palm member dimensions and the gripper may be easily integrated with industrial manipulators to manipulate payloads of a wide range of geometries, rigidities and surfaces using a feedback controller. The gripping apparatus may be used for dexterous grasping and manipulation tasks using traditional arm manipulators. The gripping apparatus, for example, may be used for packaging of food in kitchens requiring high yield and round-the-clock production. The gripping apparatus, for example, may be used for manipulation tasks in highly dynamic domestic or industrial environments where human-robot interaction is high. In various example embodiments, the gripping apparatus may be fabricated using material, such as RTV silicones, the design allowing for easy replaceability of the actuators. Further, the grasp pose of objects with various aspect ratios and compliances may be robustly maintained during manipulation, such as at linear accelerations of up to 15 m/s$^2$, and angular accelerations of up to 5.23rad/s$^2$ in a non-limiting gripper geometry example with similar dimensions/scale to a human hand. Using embedded resistive sensors and a custom-made control module, the gripper can grasp delicate objects without applying excessive force. The gripper may be easily integrated with robotic manipulators (e.g., KUKA, UR10). Grasping and manipulation tests have been performed on collaborative robotic arms like the UR10 and Kuka LBR iiwa7 for a large collection of items to demonstrate the gripper's capabilities. The gripper stiff base may be easily mechanically coupled with various commercial end-effectors and the pneumatic circuit can be controlled, for example, using the standard electric outputs. Open loop grasping experiments demonstrated that a large range of objects, from rigid and heavy to small and delicate items, could be robustly lifted and manipulated.

In various example embodiment, several factors were considered in the design of the gripper but the primary considerations were: (i) high payload capacity (e.g., more than about 2 kg), (ii) capability to grasp a wide range of geometries (e.g., cylindrical, flat, spherical, and irregular polyhedrons), (iii) robust grasping capable of tolerating disturbances (high linear and angular accelerations), (iv) easy interface with commercial collaborative manipulators, (v) include features that allow for easy replacement of individual components in case of failures, (vi) robust design suitable for industrial applications. From a preliminary study of grasping taxonomies, such as described in Feix et al. (2016) The grasp taxonomy of human grasp types. *IEEE Transactions on Human-Machine Systems* 46(1): 66-77, it was determined that a three finger gripper design was sufficient for most grasp configurations and geometries, such as described in Odhner et al. (2014) A compliant, underactuated hand for robust manipulation. *The International Journal of Robotics Research* 33(5): 736-752. An active palm was included to enable a wider range of grasping poses; this feature also increases grasping forces and enables better contact around irregular geometries.

Figure 5A:
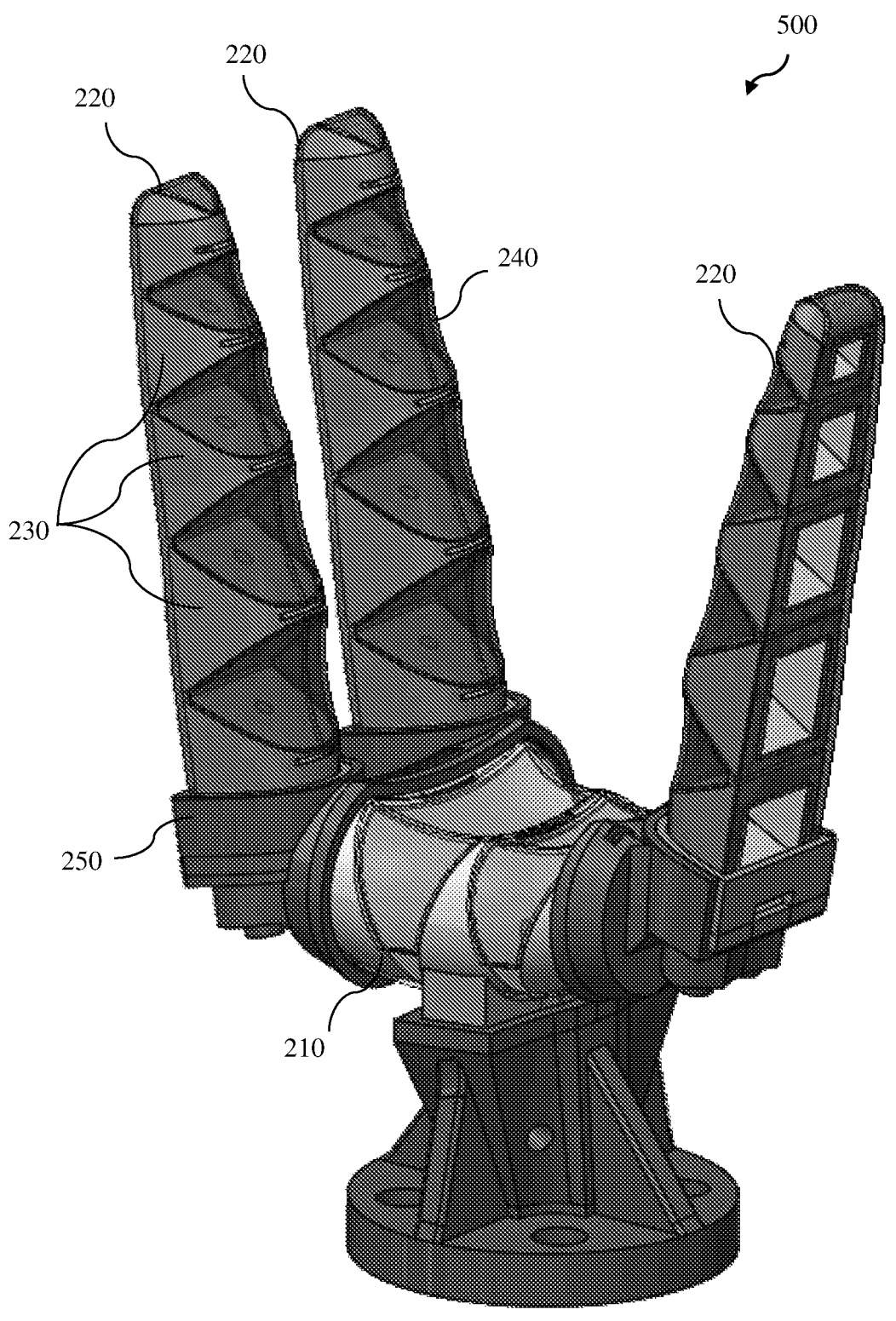
FIGS. 5A-5B illustrate perspective views of a gripping apparatus according to various example embodiments.
Figure 5B:
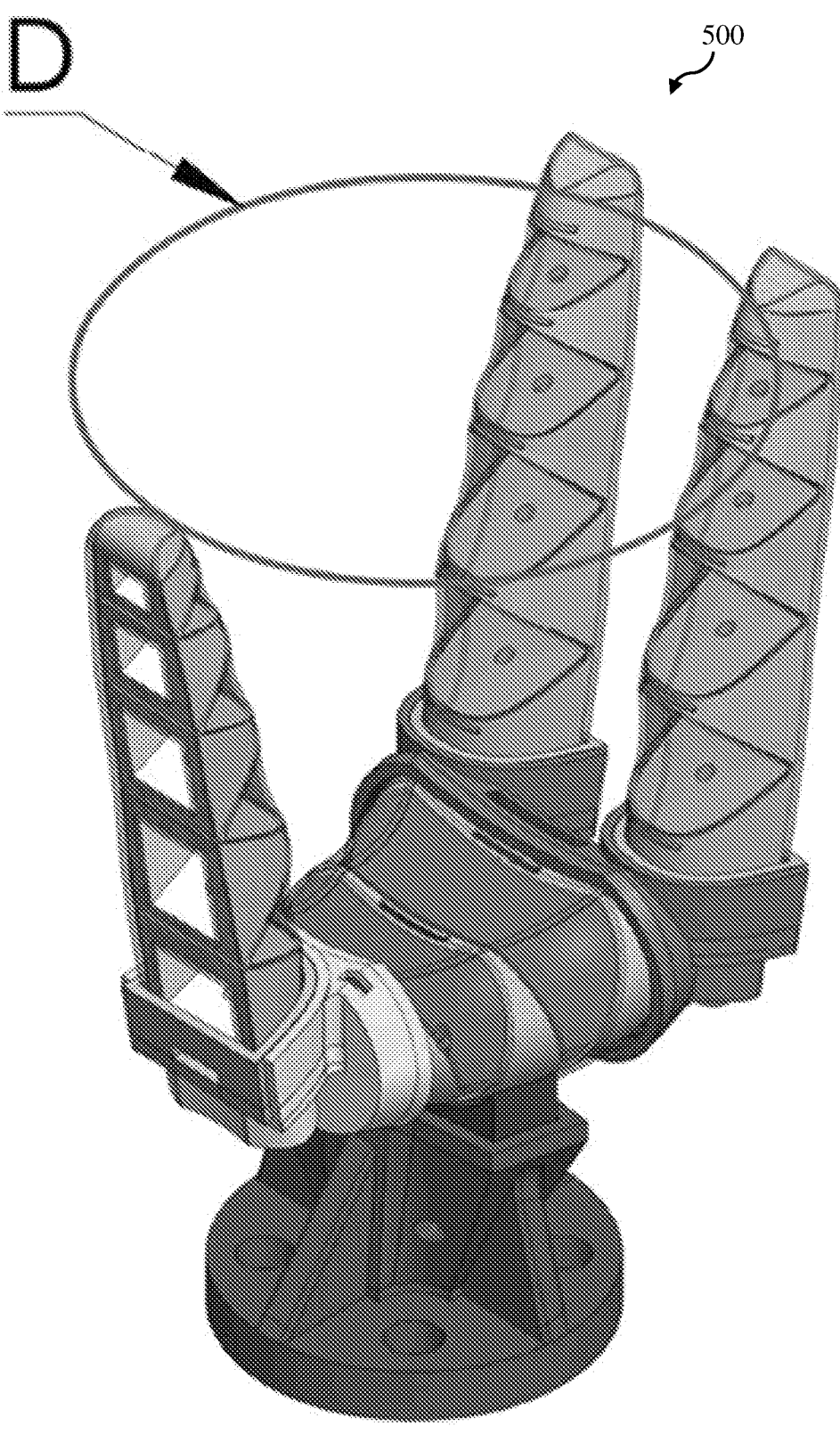

The gripper can be mounted on a robotic arm using the 3D printed base. FIGS. 5A-5B illustrate perspective views of a gripping apparatus (or gripper assembly) 500 according to various example embodiments. The gripping apparatus may also be referred to as a soft hybrid gripper. Referring to FIG. 5A, the gripping apparatus 500 comprises: a palm member 210; a plurality of finger members 220 configured to couple to the palm member, each of the plurality of finger members comprising: a plurality of phalange members 230 arranged in series along a longitudinal axis of the finger member, each phalange member being formed of an elastomer; a multilayer finger membrane 240 configured to encapsulate the plurality of phalange members, the multilayer finger membrane being formed of multiple material layers, comprising a strain limiting layer configured to limit the multilayer finger membrane from stretching; and a coupling end portion 250 configured to couple to the palm member and comprises an opening configured for fluid communication with a vacuum system. FIG. 5B shows of a CAD model of the gripper assembly 500 highlighting the unactuated aperture diameter D (e.g., D may be scaled or tailored to particular application requirements, values in the order of 100 mm were demonstrated in non-limiting examples). The unactuated aperture diameter may be defined as the diameter of the circle drawn through three points at the tips of the unactuated finger members.

Finger Design

Figure 6A:
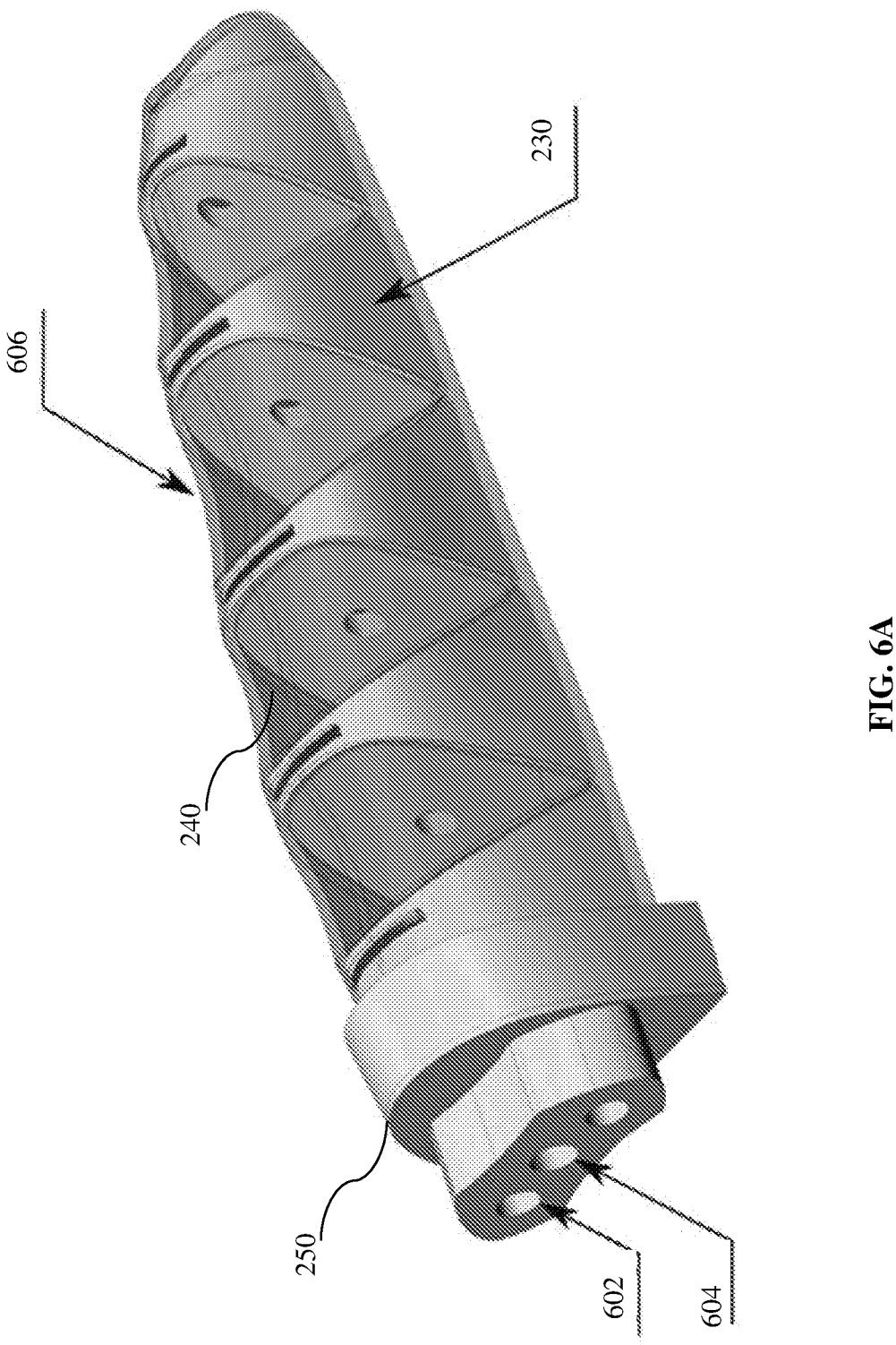
FIGS. 6A-6D show a CAD model of a finger member according to various example embodiments.
Figure 6B:
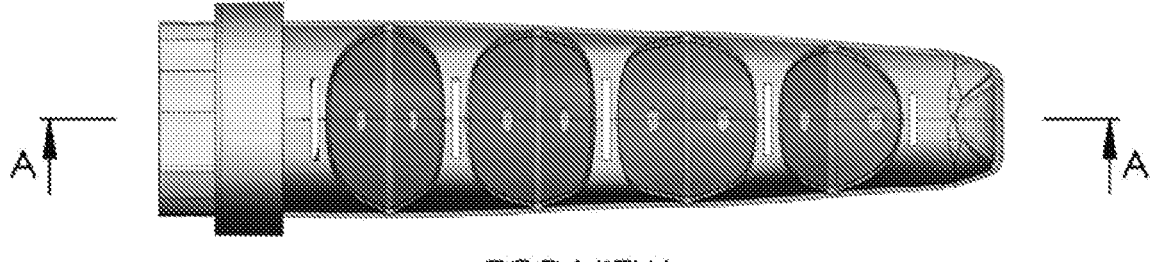

According to various example embodiments, the finger members may be designed to mimic human fingers with a smooth gradual taper in both the lateral and medial directions. FIGS. 6A-6D show a CAD model of a finger member according to various example embodiments. FIG. 6A shows a perspective view of the finger member. The finger member includes a coupling end portion (3D printed mounting support or connector) 250, a multilayer finger membrane (soft skin) 240 and a plurality of phalange members (wedges) 230. According to various example embodiments, the coupling end portion 250 includes a mounting interface 602 (e.g., M3 threaded inserts) and an opening 604 (e.g., hole for silicone tubing having a diameter of 4 mm in a non-limiting example). The opening 604 may be configured for fluid communication with a vacuum system. The multilayer finger membrane 240 may be embedded with a strain limiting layer such as PTFE-coated fiberglass fabric, in a non-limiting example. The multilayer finger membrane 240 may have a thickness of about 1 mm, in a non-limiting example. According to various example embodiments, the multilayer finger membrane 240 may include dents or dips 606.

Figure 6C:
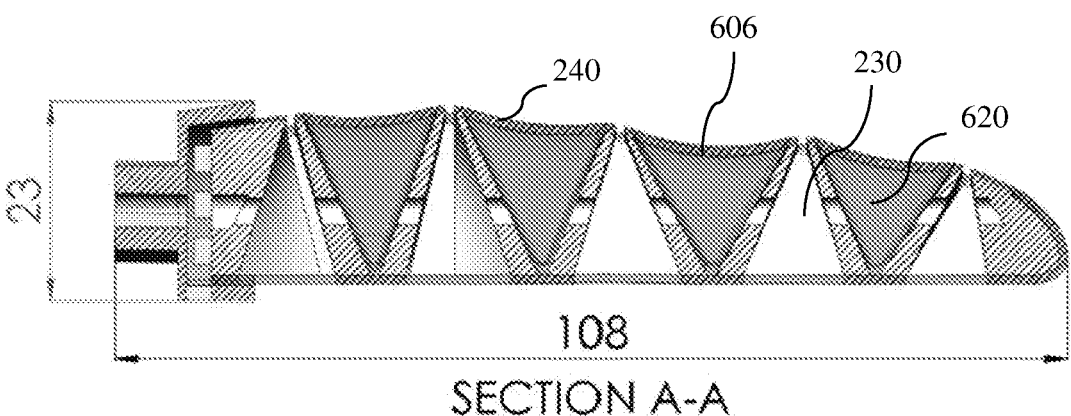
Figure 6D:
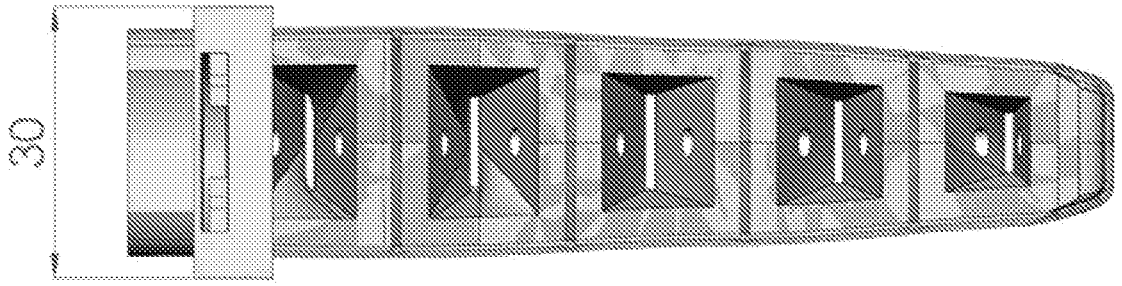

Each phalange member (wedge) may be formed of a material having a modulus of elasticity E which provides sufficient stiffness to the phalange member. For example, each phalange member may be formed of a material having a modulus of elasticity E ranging from 0.6 MPa to 200 MPa. FIG. 6C shows a cross-section view of a non-limiting example finger member, and FIG. 6D shows a bottom view of a non-limiting example finger member. As shown in FIG. 6C, the cross-section may comprise five stiff silicone wedges (corresponding to the plurality of phalange members) separated by small spaces or gaps 620. The wedges are shown to be hollow for purposes of illustration. The first (or base or proximal) wedge may comprise a silicone tube for connection to vacuum actuation. The silicone tube may be inserted into the through hole of the first wedge. The remaining wedges may each have a through hole in the medial direction. The wedges are encapsulated by a thin soft silicone skin (corresponding to the multilayer finger membrane). A thin strain limiting sheet may be embedded within the skin to make it inextensible yet flexible for bending. The shape of the sheet can be tailored to avoid bending in the backwards and lateral directions. When vacuum is applied through the silicone tube, a net bending motion is created due to the negative pressure at the gaps (spaces) between the wedges and the collapse of the skin (multilayer finger membrane). Between the wedges (the plurality of phalange members), dips 606 were introduced in the multilayer finger membrane 240 to reduce the amount of material that folds in during actuation.

Palm Design

Figure 7A:
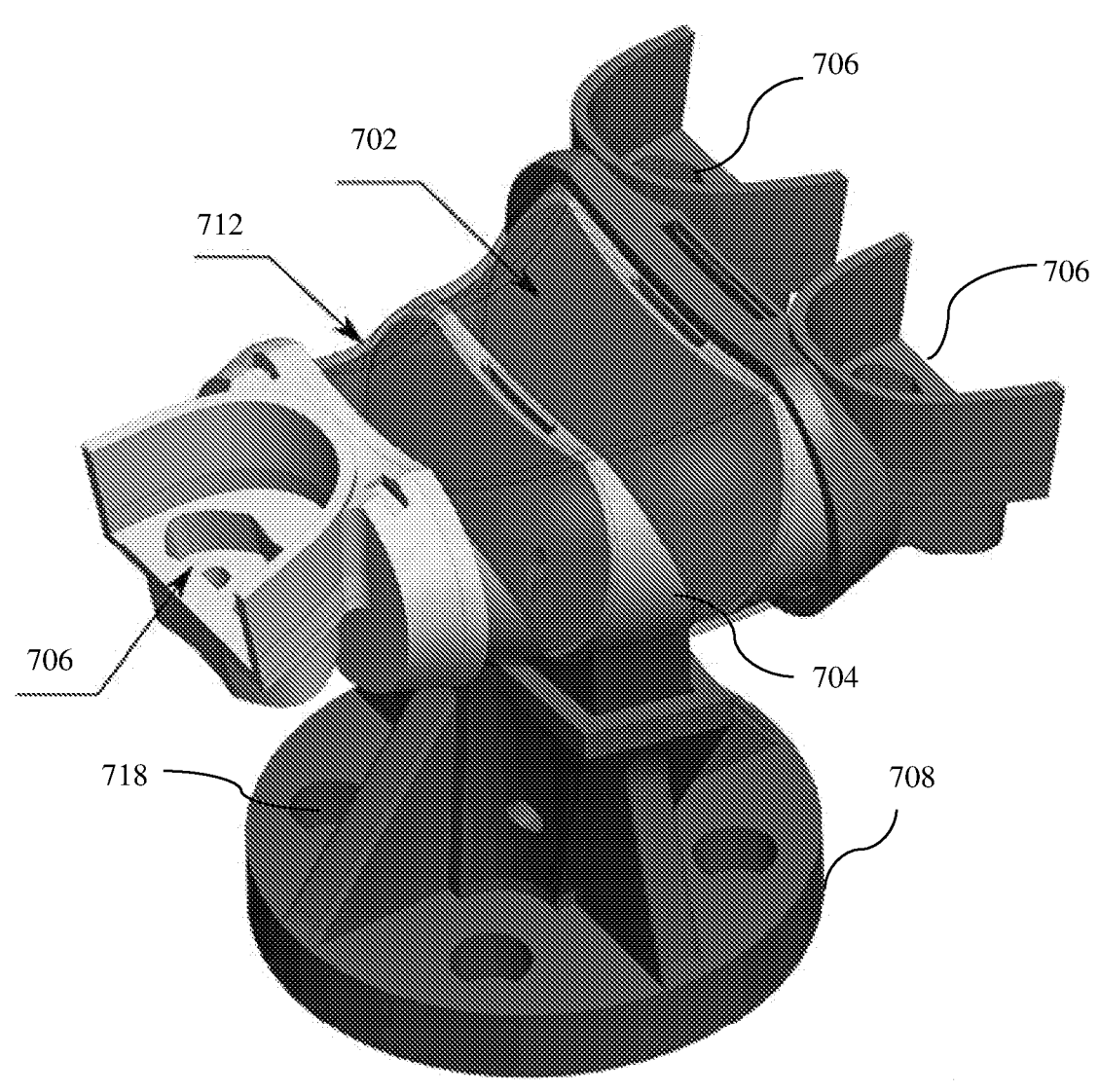
Figure 7B:
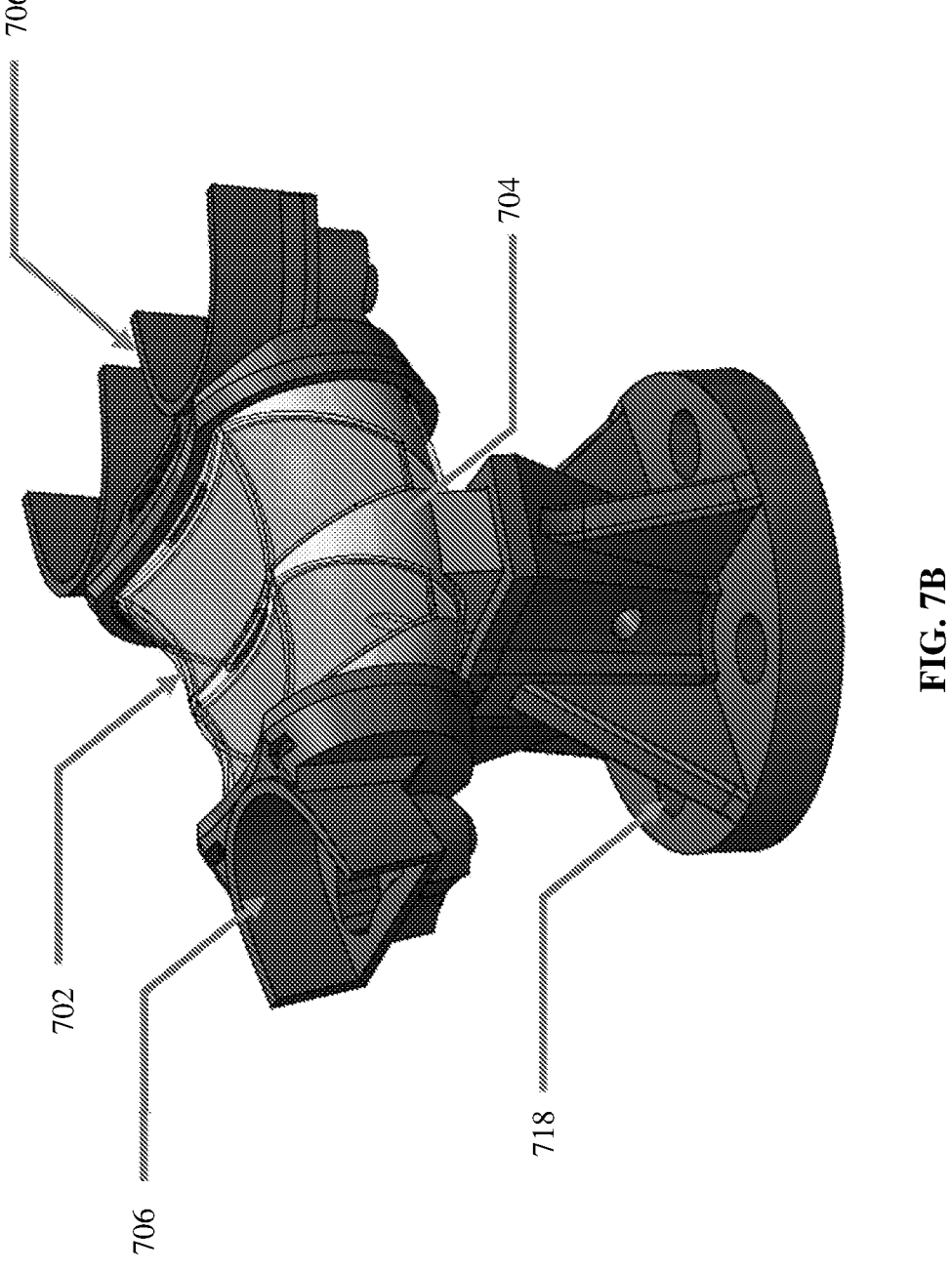
Figure 7C:
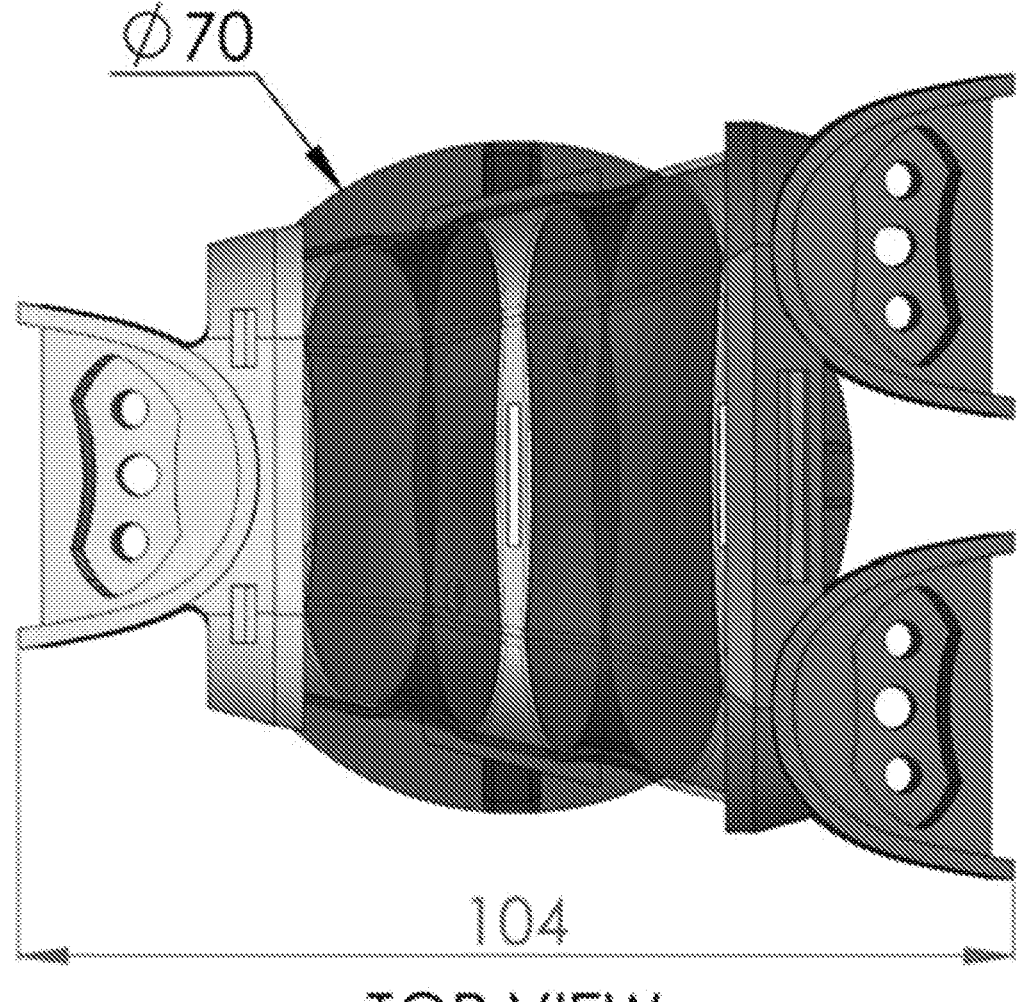

According to various example embodiments, the soft gripper's palm may comprise three stiff silicone wedges encapsulated in a thin soft skin. FIGS. 7A-7D show a CAD model of a palm member according to various example embodiments. All dimensions are in millimeters. FIGS. 7A and 7B show perspective views of the palm member. Referring to FIG. 7A, the palm member may include a multilayer palm membrane 702, a plurality of palm wedges (corresponding to the plurality of palm block members) 704 and second coupling end portions (e.g., finger sockets) 706. The multilayer palm membrane 702 may be embedded with PTFE-coated fiberglass fabric, The multilayer palm membrane 702 may have a thickness of about 1.5 mm, in a non-limiting example. The multilayer palm membrane 702 may include dips or dents 712 to reduce the amount of material that folds in during actuation. The finger sockets 706 may be 3D printed. The second coupling end portions 706 may each include mounting openings (e.g., two M3 mounting holes) for mechanical interface with a finger member (coupling end portion of the finger member). The palm member may be mounted on a first coupling end portion (e.g., 3D printed base support and mounting interface) 708 of the palm member. The first coupling end portion 708 of the palm member may include a base mounting opening 718 (e.g., M6 mounting hole) for interface with robotic manipulators such as KUKA llWA14 and UR10, in a non-limiting example.

According to various example embodiments, two soft silicone tubes may be laid through the central palm wedge (central palm block member) through which vacuum is applied in the two hollow sections between the wedges (palm block members) to create a bending moment. The finger members may be connected to the palm member using ABS interfaces (3D printed on Stratasys Fortus 450mc, in a non-limiting example) fitted with metal inserts, which allows for simple mechanical plug-and-play.

As described, the phalange members of each finger member are sealed within the multilayer finger membrane. The 3D printed interface, multilayer finger membrane and phalange members when assembled form an airtight structure. Similarly, the palm block members of the palm member are sealed within the multilayer palm membrane. The 3D printed interface, multilayer palm membrane and palm block members when assembled form an airtight structure. While the 3D printed interfaces shown in FIGS. 6A-6D and FIGS. 7A-7D do not contribute actively to the actuation, they are designed with the correct tolerances and internal crossbeam structures to ensure that the soft actuators are airtight and strongly held, when subject to high loads.

Modeling

Figure 8:
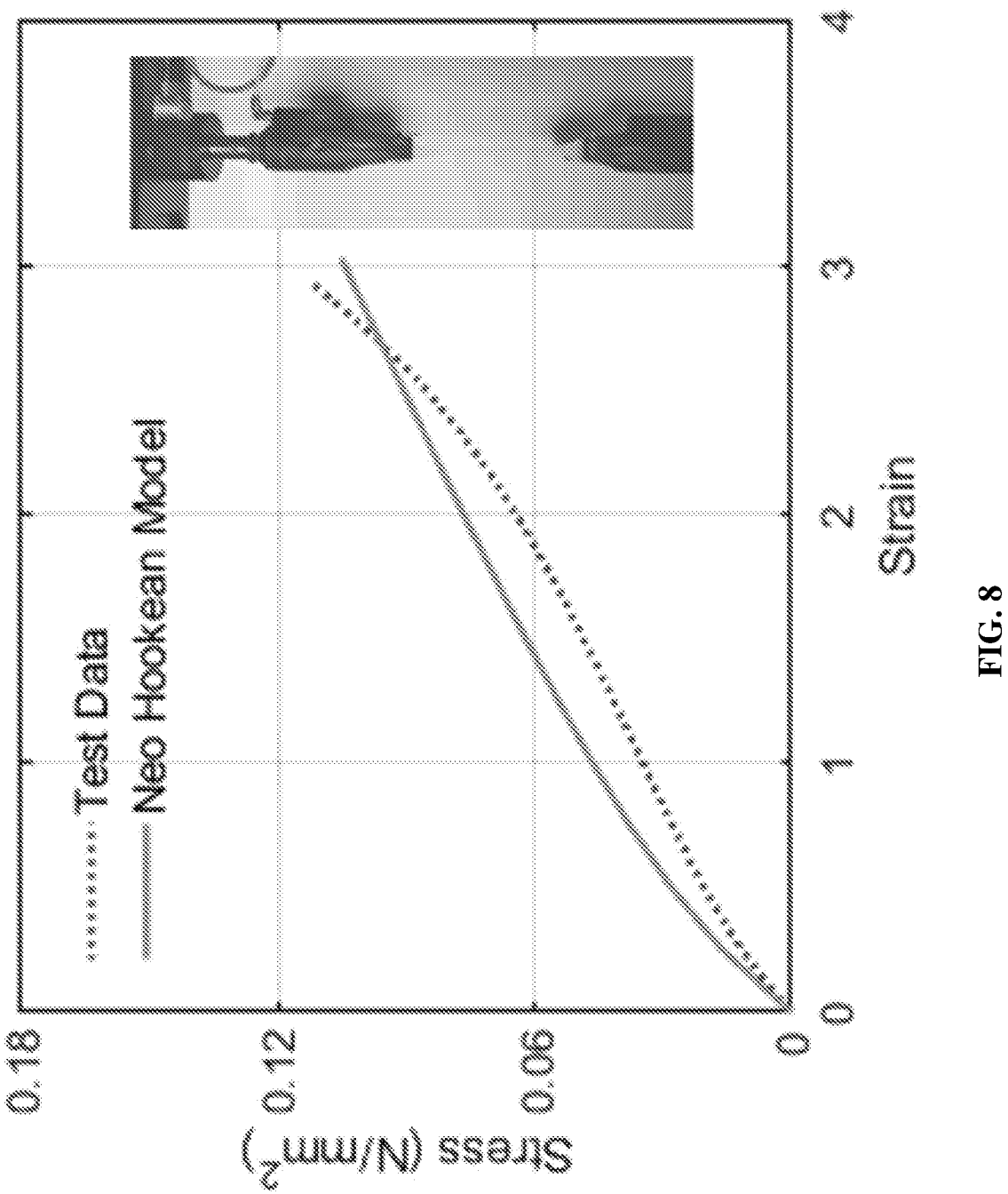
FIG. 8 shows a graph illustrating a Reduced Order Polynomial Curve that was fit to test data obtained from a uniaxial testing of a material according to various example embodiments.

The behaviour of the finger design under different input negative pressures for different materials was analyzed using 3D Finite Element Method models prepared in ABAQUS/CAE (Simulia, Dassault Systemes, RI). The objective was to establish a computational model capable of predicting finger behavior. Such a model may then be used for design purposes by optimizing material selection and feature geometries to achieve target kinematics and grasping forces. The geometry of the finger skin has multiple angles on its top surface and requires an extremely fine mesh size for analysis which is computationally expensive and can lead to convergence issues. Therefore, for simplicity, the wedge dimensions were left unchanged but the skin was modified into a hollow cuboid with the same length, width and height as that of the actual finger but without a taper. The wedges and skin geometries were imported from SolidWorks, and the assembly was defined using positional constraints. Both the skin and wedges were defined as homogeneous solids. To characterize the properties of candidate materials, uniaxial tests were conducted using dog bone shaped specimens (Type IV ASTM D638). The tests were performed using a MTS Criterion Model 43 Universal Testing Machine (UTM). Loads were measured using a 10 kN load cell at a strain rate of 50 mm/min. FIG. 8 shows a graph illustrating a Reduced Order Polynomial Curve that was fit to the test data obtained from the uniaxial testing of EcoFlex 00-30. The fitted curve is close to the experimental data for strain less than 300%.

In one study, stress strain data for five samples was averaged and the results were used as inputs for the hyperelastic curve fitting model in ABAQUS. The shear coefficients $C_{ij}$ were derived for different hyper-elastic models (e.g., Ogden, Mooney Rivlin, Neo Hookean, etc.). The coefficients estimated for various silicone polymer materials were found to be stable for the Neo Hookean model used for predicting behavior of materials undergoing large deformations in uni-axial loading which is relevant to the actuators according to various example embodiments. For simplicity, since the analysis involves contact between two deformable bodies (skin and wedges), the materials were assumed to be incompressible. The strain energy density function for an incompressible Neo Hookean material is given by, $$W_S = C_{10}(I_1 - 3) \hspace{2cm} \text{Equation (1)}$$

where $W_S$ is the strain energy density, $C_{10}$ is the material constant that controls the shear behaviour, and $I_1$ is the first invariant of the right Cauchy Green deformation tensor. Model coefficient values for some of the materials tested for different skin and wedge materials are listed in Table 1. $C_{10}$ may be defined as the coefficient of the Neo-Hookean strain energy density function of Equation 1.

TABLE 1

Neo Hookean Model Parameters

| Component/Material | $C_{10}$ |
| --- | --- |
| Wedges/SmoothSil 960 | 0.17 |
| Skin/SmoothSil 940 | 0.12 |
| Skin/EcoFlex 30 | 0.01 |
| Skin/MoldStar 30 | 0.055 |

Frictionless tangential boundary conditions were set up between the inner surface of the skin and the wedges. The mesh elements used on the skin and the wedges were 10-node quadratic tetrahedron with constant pressure on each element (ABAQUS element type C310H, where the H stands for hybrid formulation). Tetrahedral mesh elements were chosen to reduce the number of elements without losing solution accuracy. The materials used are assumed to be incompressible, therefore a hybrid formulation was adopted since conventional finite element meshes often exhibit overly stiff behaviour due to volumetric locking. Using hybrid elements, the pressure stress was treated as an independently interpolated basic solution variable, coupled to the displacement solution through the constitutive theory. To improve computational efficiency, the study was defined as a one-step static analysis for nonlinear geometric behavior and the load was directly applied on the inner surface of the skin and the wedges of the finger. The end surfaces of the base wedge and the skin were assigned hinged boundary conditions (ABAQUS condition ENCASTRE) as they were fixed to the base of the gripper within the finger interfaces. The model results show good qualitative agreement with experiments characterizing finger bending for three types of finger material combinations (see FIG. 17). Model predictions improve with higher actuation pressures but fail to converge for materials with low moduli (e.g., Ecoflex 0030) likely due to the large deformations induced (Ecoflex's modulus is an order of magnitude smaller than SmoothSil's and MoldStar's). Nevertheless, the model may be used to guide design choices of geometry and material selection for a good range of materials and actuation pressures.

Embedded Sensing and Force Control

Figure 9:
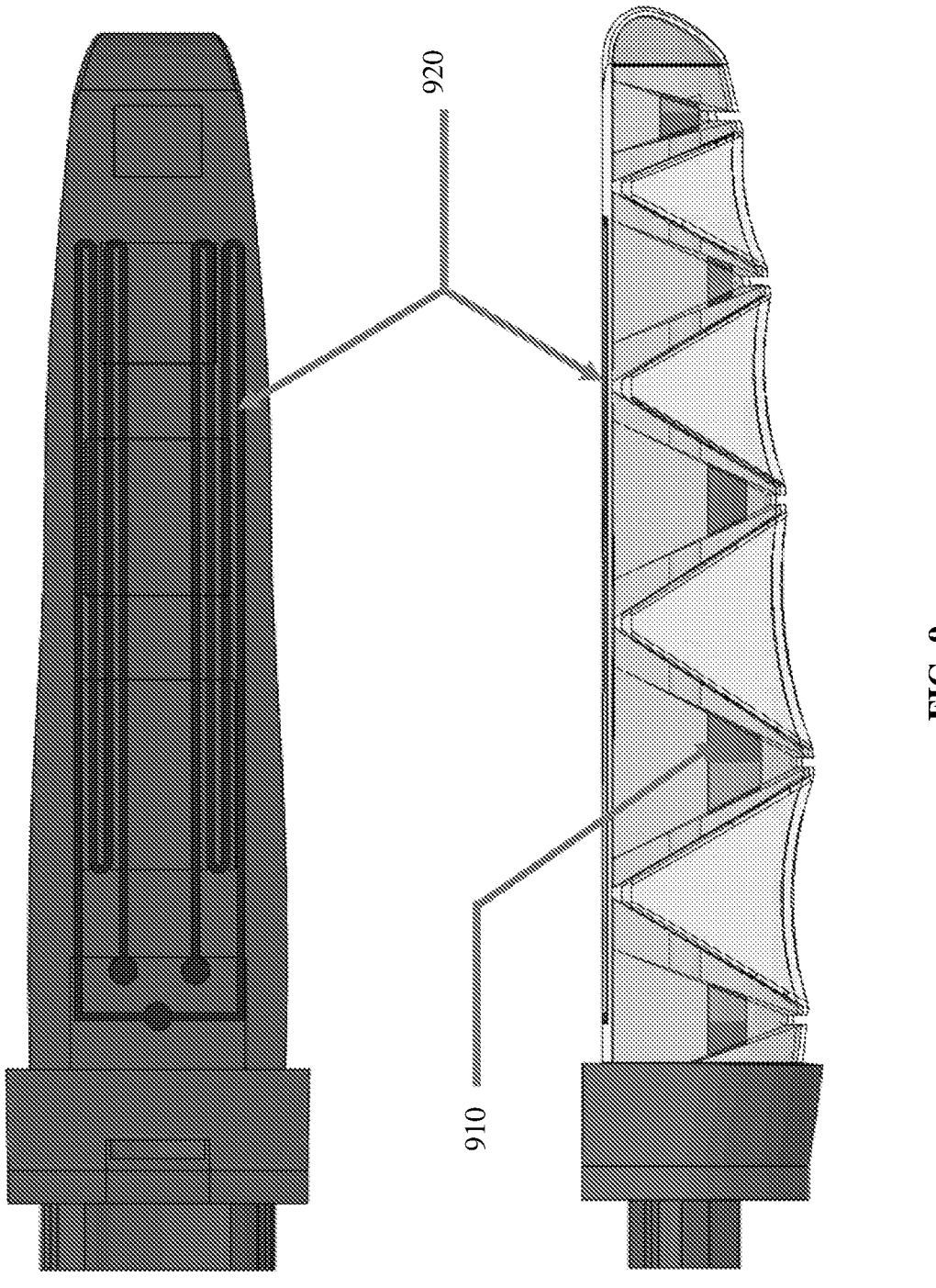
FIG. 9 shows embedded resistive sensors in the phalange members and the multilayer finger membrane of a finger member, according to various example embodiments.

According to various example embodiments, the gripping apparatus may include close loop control using feedback from the finger and palm member deformations as well as contact stresses. In various example embodiments, the gripping apparatus comprises embedded resistive elements made of conductive silicone material that respond to changes in length or cross-sectional area. FIG. 9 shows embedded resistive sensors in the phalange members and the multilayer finger membrane. In various example embodiments, force sensor elements 910 may be embedded inside the phalange members and/or palm block members. The force sensor may be configured to detect applied force on the phalange members and/or palm block members. In various example embodiments, the force sensor elements 910 may be made of NuSil conductive elastomer R-2631. During fabrication of the phalange members of the finger members, force sensors can be embedded inside the phalanges using a computer controlled cartesian robot along with a pressure air dispenser. For example, the force sensor elements may be embedded inside the phalange members and/or palm block members during the casting process, or via additive manufacturing, such as Direct Ink Writing (DIW) or Embedded 3D Printing. The phalange members and/or palm block members may be solids with the sensors embedded inside them. In an example, the phalange members and/or palm block members may be formed of silicone based materials or silicone compatible materials and the sensors may be embedded during casting or additive manufacturing, hence once fabricated, the phalange members and/or palm block members are solid. When force is applied to the phalange members and/or palm block members (which are deformable under a certain load range), the cross-sectional area of the element changes resulting in a change in the resistance of the material. Alongside the force sensors, flex sensors 920 may be embedded in the backside of the multilayer finger membrane and/or multilayer palm membrane by a technique called e3DP (Embedded 3D printing). The flex sensor may be configured to detect bending of the finger member and/or palm member. A computer controlled cartesian robot may be used along with a pressure air dispenser to lay out a pattern of carbon grease in a pool of uncured elastomer. The conductive pattern undergoes a change in resistance on elongation, which is caused by the bending of the finger. The novel pattern design allows detection and measurement of bending in the medial (desired) and lateral (undesired) directions.

The sensors may be connected to a controller module using conductive threads insulated in a thin wall of Ecoflex 0030. The flexibility and the low resistivity of the conductive thread make it an ideal choice for the connecting wires. The concentric coating of Ecoflex may serve a dual purpose, firstly, it insulates the thread without affecting its flexural properties, secondly, the Ecoflex coating allows the "wire" to bond well with the gripper's elastomer, offering a strong static contact between the sensor and the wire. This approach solves the problem of noise generation in most state-of-the-art embedded soft sensors due to improper contact between the conductive wires and the resistive elements.

Figure 10:
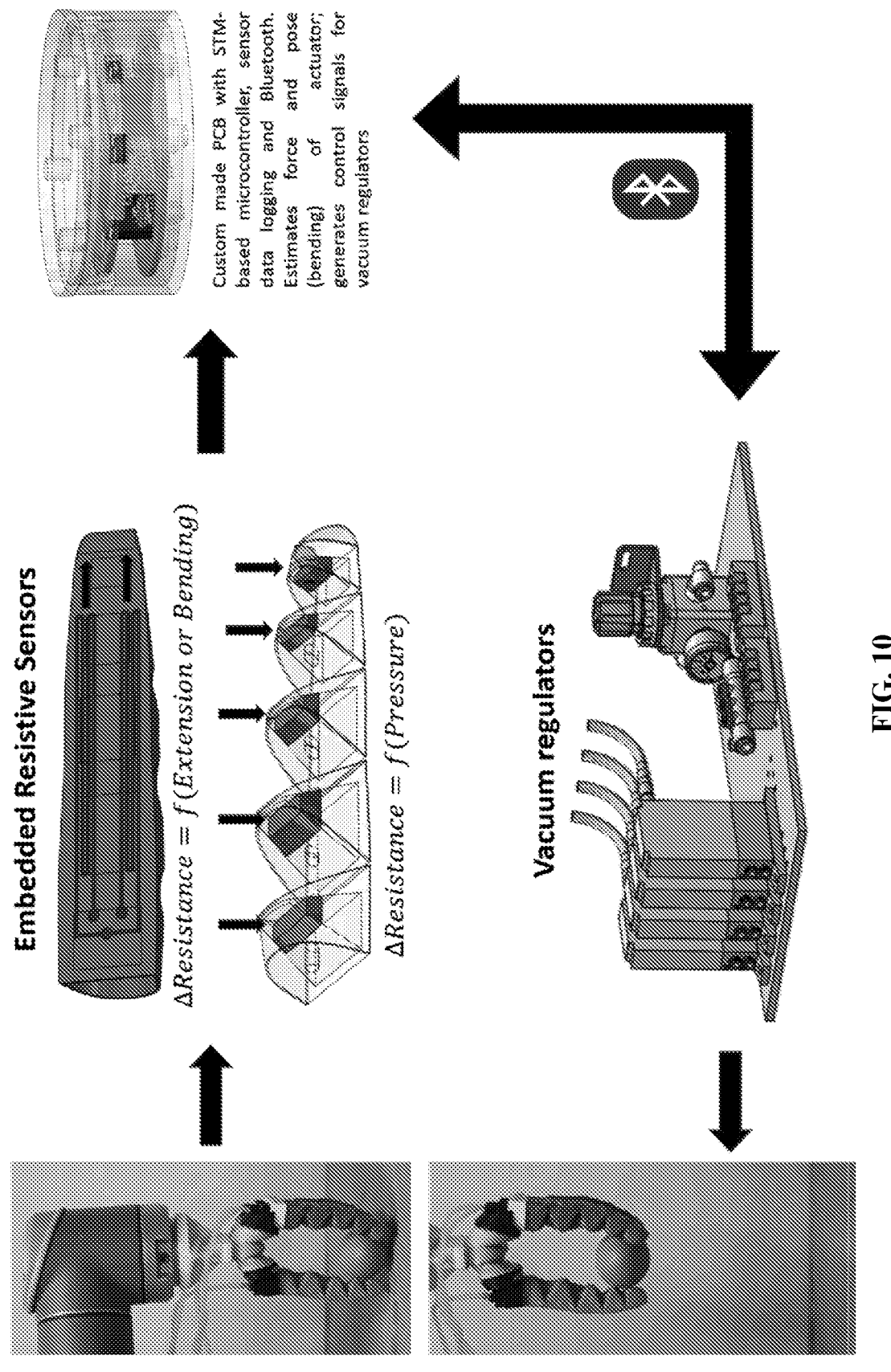
FIG. 10 shows a control system for the gripping apparatus according to various example embodiments.

FIG. 10 shows a control loop of a control module or system which contains a custom-made printed circuit board (PCB) that serves the purpose of collecting and storing the sensor data using a microcontroller, sending the sensor data to a workstation of a human operator through Bluetooth and generating the control signals for the vacuum regulators. More particularly, FIG. 10 shows a control system for the gripping apparatus. For example, (a) the gripper approaches the object to be lifted, vacuum is applied slowly until contact is detected by the (b) sensors, (c) the gripping apparatus' PCBs collect the data and send it to a microcontroller, (d) the forces are estimated and appropriate vacuum control signals are sent to the regulator board, (e) resulting in the right amount of force required for the gripper to lift objects including delicate objects, such as an egg.

Fabrication

Much of the gripper functionality is a result of its multi-material composite structure and the interplay of the structural properties of the different components when subjected to negative actuation pressure and external loads. Multi-material fabrication techniques for soft robotic systems are still limited. Yap et al. (2016) High-force soft printable pneumatics for soft robotic applications. *Soft Robotics* 3(3): 144-158 describe a technique for 3D printable soft pneumatic actuators, however, only a very limited range of material filaments exist for this technique. Also, the actuators printed have a fixed shore hardness and are not suitable for low force applications. Homberg et al. (2015) Haptic identification of objects using a modular soft robotic gripper. In: 2015 IEEE International Conference on Intelligent Robots and Systems (IROS). pp. 1698-1705 uses a soluble wax core to create a hollow pressure driven finger, a technique which is time-consuming. Several groups have used UV curable materials (e.g., 3D printed on Stratasys Polyjet J750); however these materials are not very robust in harsh environments.

According to various example embodiments, to facilitate compatibility with multiple materials, a simple casting method may be used. The fabrication steps are scalable, highly modular, and easy to implement even for mass production.

Figure 11A:
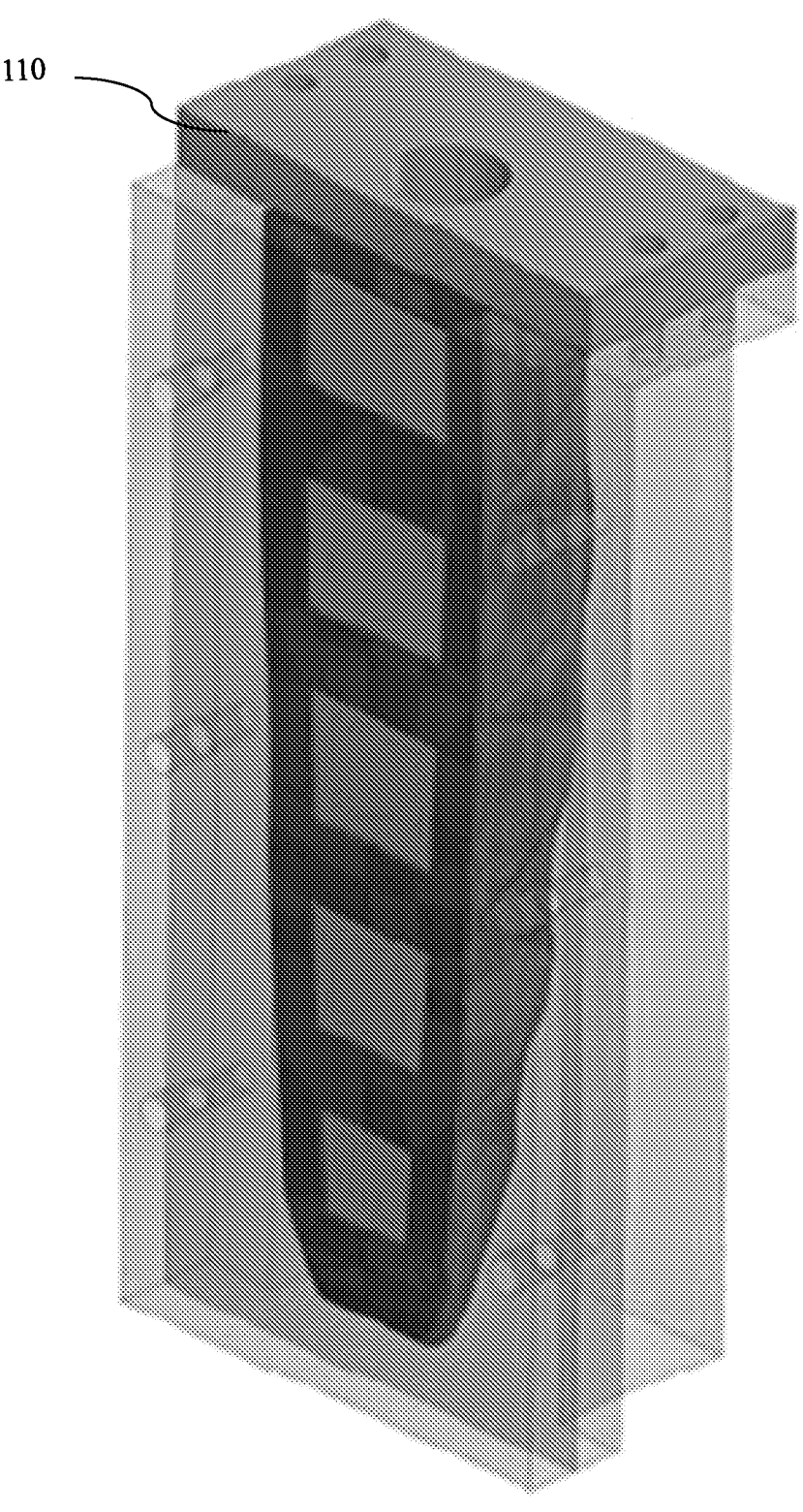
FIGS. 11A-11C illustrate an exemplary method of fabricating a multilayer finger membrane according to various example embodiments.
Figure 11B:
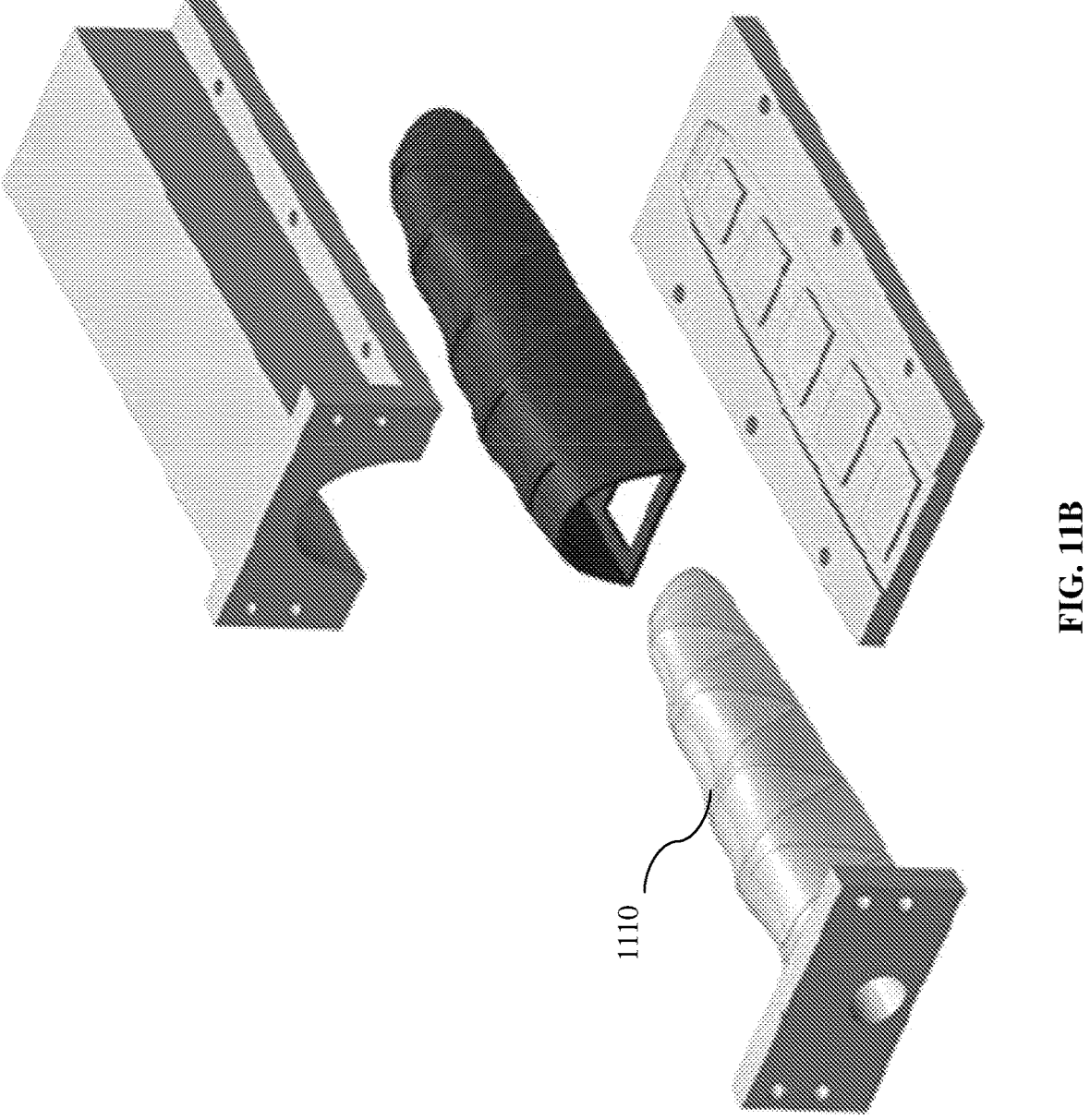
Figure 11C:

In various example embodiments, the multilayer finger membrane (e.g., reinforced finger skin) may be fabricated using a three-step press mold technique, as illustrated in FIGS. 11A-11C. FIG. 11A illustrates an assembled three-part mold with an insert 1110 for casting the multilayer finger membrane (finger skin). FIG. 11B illustrates de-molding of the multilayer finger membrane. FIG. 11C illustrates the cast multilayer finger membrane.

In various example embodiments, the multilayer finger membrane comprises a first flexible membrane layer and a second flexible membrane layer, and the strain limiting layer embedded between the first and second flexible membrane layers. For the first flexible membrane layer, it may be a soft silicone layer. In various example embodiments, the first flexible membrane layer may be formed of silicone rubber such as MoldStar 30 by SMOOTH-ON INC. For example, the silicone rubber such as MoldStar 30 may be applied manually to the mold and pressed to obtain a uniform thickness of the first flexible membrane layer, such as about 0.5 mm in a non-limiting example. Once cured, the strain limiting layer may be formed on the first flexible membrane layer. For example, once the first flexible membrane layer is cured, the mold may be unassembled and the strain limiting layer may be glued on top of the cured first flexible membrane layer. The strain limiting layer may be a fiberglass fabric layer. In various example embodiments, the strain limiting layer may be formed of a fiberglass fabric such as PTFE-coated fiberglass fabric or a similar high tensile strength textile or composite. For example, the fiberglass fabric such as PTFE-coated fiberglass fabric may be glued on the top of the first flexible membrane layer. Next, a second flexible membrane layer may be formed on the strain limiting layer. The second flexible membrane layer may be formed of silicone rubber such as MoldStar 30. For example, a second layer of MoldStar 30 of about 0.5 mm thickness may be cast on top of the fabric sheet. For example, the first membrane layer and the glued fabric sheet may be inserted into the mold again, and then MoldStar 30 is applied into the mold to form the second membrane layer of the multilayer finger membrane. This results in a 1 mm thick multilayer finger membrane (e.g., skin of the finger member) with a PTFE-coated fiberglass fabric embedded in its center. The thickness of the strain limiting layer may be encapsulated within the thicknesses of the first and second flexible membrane layers. In a non-limiting example, the strain limiting layer may have a thickness of about 0.12 mm. FIG. 11D illustrates images of the cast multilayer finger membrane and embedded strain-limiting layer (e.g., PTFE-coated fiberglass fabric) 1140. A profile of the strain-limiting layer 1140 is illustrated in the middle image of FIG. 11D. As illustrated, the strain-limiting layer 1140 may include a plurality of first type cut-outs 1150 and a plurality of second type cut-outs 1160. The plurality of first type cut-outs 1150 and the plurality of second type cut-outs 1160 may ensure the first and second flexible membrane layers above and below the strain limiting layer connect. For example, the plurality of second type cut-outs 1160 align with cut-outs in the multi-layer finger membrane and the openings in the phalange members (the first opening and the second opening of the first side portion and the second side portion of the phalange member, respectively). The multilayer finger membrane and phalange members may be assembled and connected at these locations (of the plurality of second type cut-outs 1160) by casting a same material as the phalange members through the cavity (openings at the plurality of second type cut-outs 1160). This casting step may create a sealed enclosure. The plurality of first type cut-outs 1150 are to prevent undesirable folding of the strain-limiting layer when the finger members are actuated. The plurality of first type cut-outs 1150 also enable a robust embedment of the strain-limiting layer in the multilayer finger membrane by bonding two flexible membrane layers during the casting step.

In various example embodiments, the plurality of phalange members (e.g., wedges) may be cast using a four-piece 3D printed mold setup using compressed air-assisted injection molding.

Figure 12A:
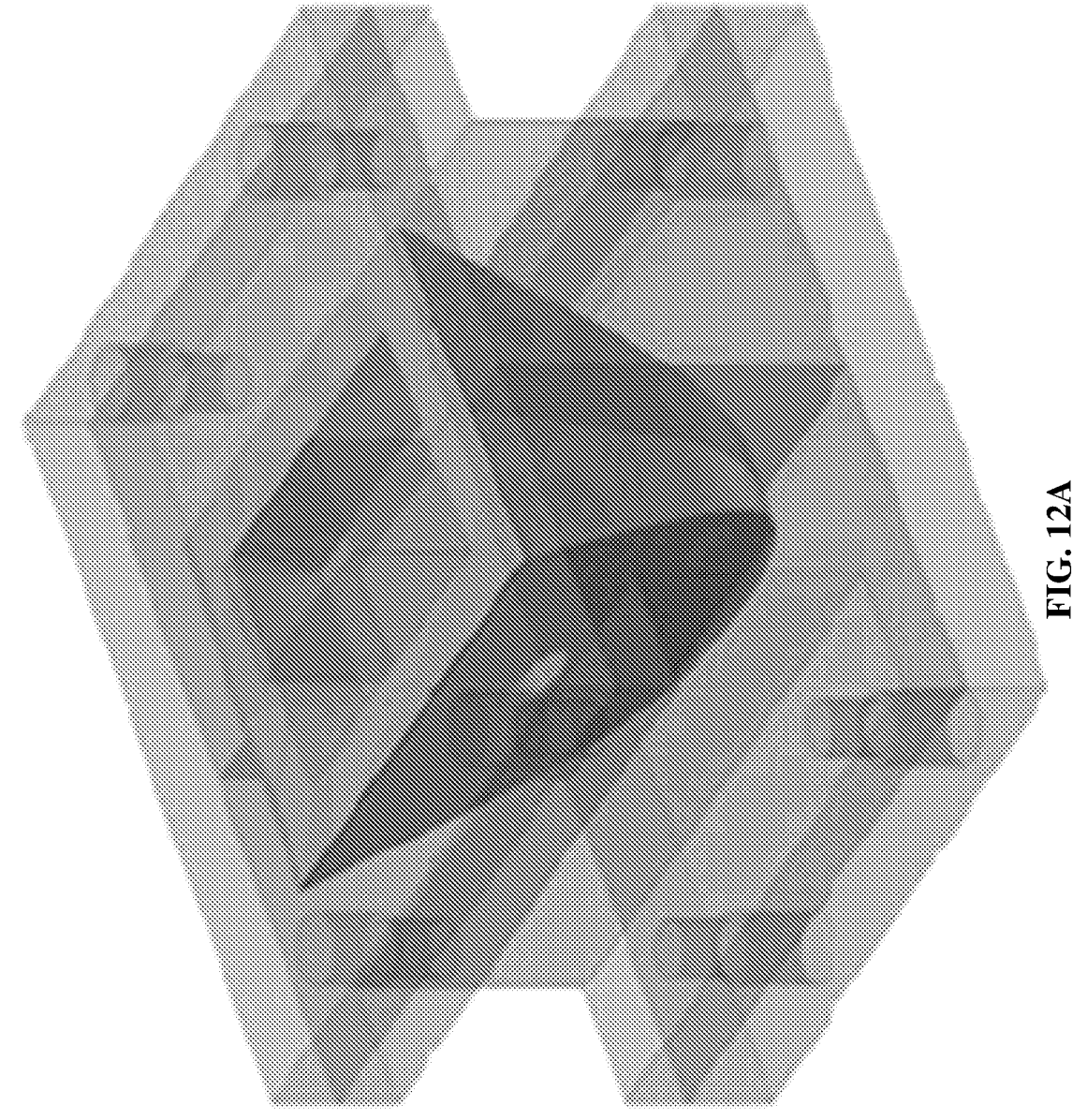
FIGS. 12A-12C illustrate an exemplary method of fabricating a phalange member according to various example embodiments.
Figures 12B, 12C:
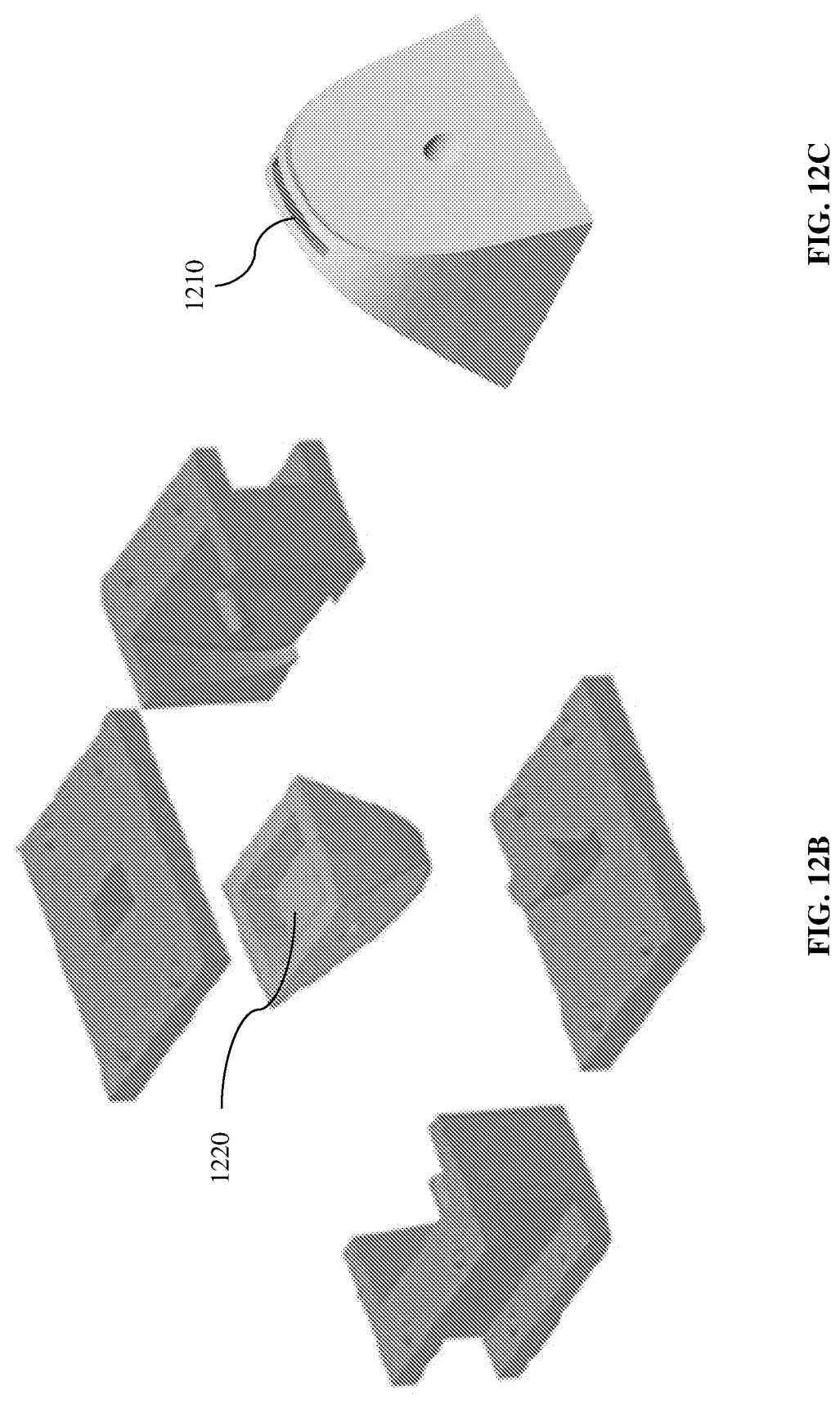
Figure 12D:
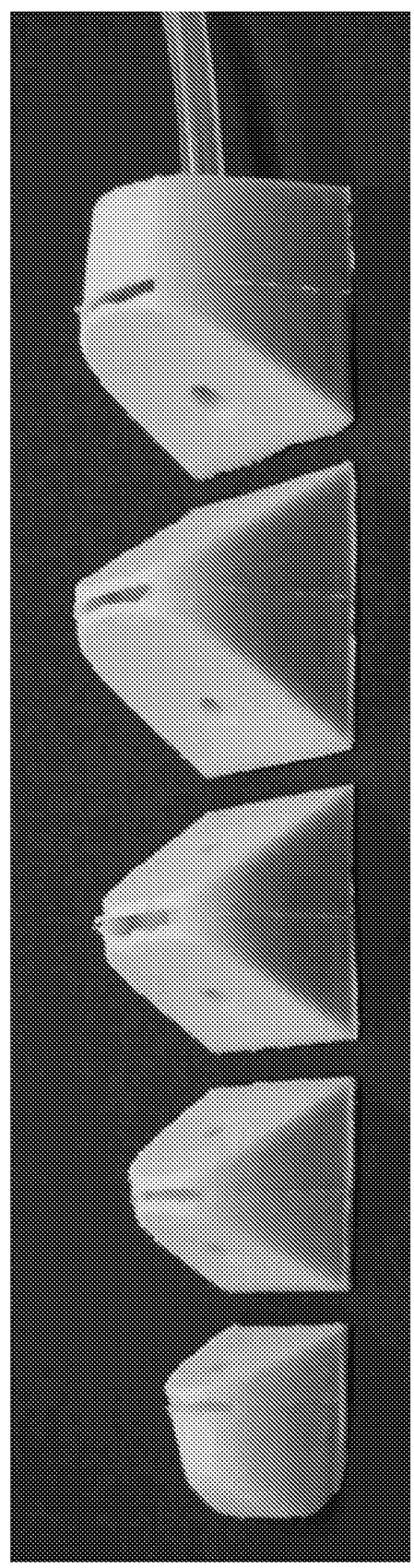
FIG. 12D illustrates an image of cast phalange members according to various example embodiments.

Each phalange member may be formed of an elastomer. In a non-limiting example, each phalange member may be formed of a material having a modulus of Elasticity, E ranging from 0.6 MPa to 200 MPa. In various example embodiments, the elastomer may be a polymer such as SmoothSil 960 by SMOOTH-ON INC, due to the relative hardness and suitable viscosity of SmoothSil 960 for injection molding. For example, a suitable viscosity of the material for forming each phalange member may range from about $1\text{Ns/m}^2$ to about $25\text{Ns/m}^2$. FIGS. 12A-12C illustrate the fabrication of a phalange member using a four-piece 3D printed mold. FIG. 12A illustrates a four-part mold for casting a phalange member (e.g., wedge). FIG. 12B illustrates de-molding of the phalange member. FIG. 12C illustrates the cast phalange member. The same process may be repeated for each of the plurality of phalange members (e.g., repeated for five wedges). It is understood that different molds may be used to form different phalange members of the plurality of phalange members or even additive manufacture processes. For example, the plurality of phalange members of a finger member may have different sizes and variation in shapes to mimic the shape of the human finger if the application so requires, or a completely different morphology as well. Accordingly, different sets of mold may correspond to respective phalange members of the plurality of phalange members of a finger member. For the base or proximal phalange member (e.g., phalange member nearest to the coupling end portion of the finger member), a tubing or fluid connector (e.g., silicone tube) may be fixed to the base phalange member (e.g., wedge) before a pressure dispenser is used to force the polymer into the molds corresponding to the base phalange member. The filled moulds are then cured for about 24 hours at room temperature. The mould design results in a first opening or slit (corresponding to the first opening of the first side portion of the phalange member) 1210 and a second opening or cavity 1220 (corresponding to the second opening of the second side portion of the phalange member) (e.g., having a rectangular shape) on the top and bottom faces of each phalange member, as illustrated in FIGS. 12C and FIG. 12B, respectively. These features may facilitate easy assembly of the phalange members later. FIG. 12D illustrates an image of five cast phalange members (e.g., five wedges).

Figure 13A:
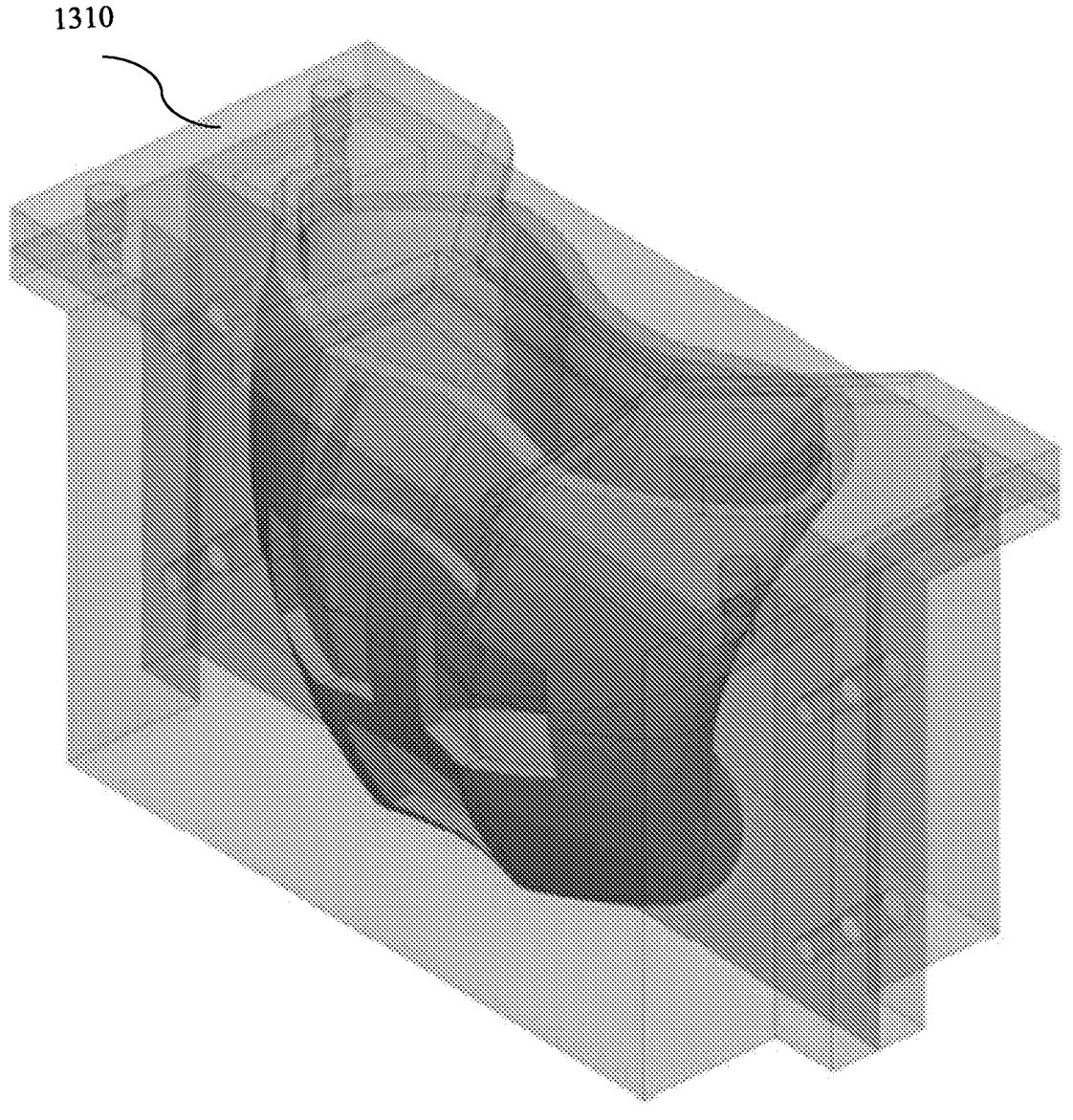
FIGS. 13A-13C illustrate an exemplary method of fabricating a multilayer palm membrane according to various example embodiments.
Figure 13B:
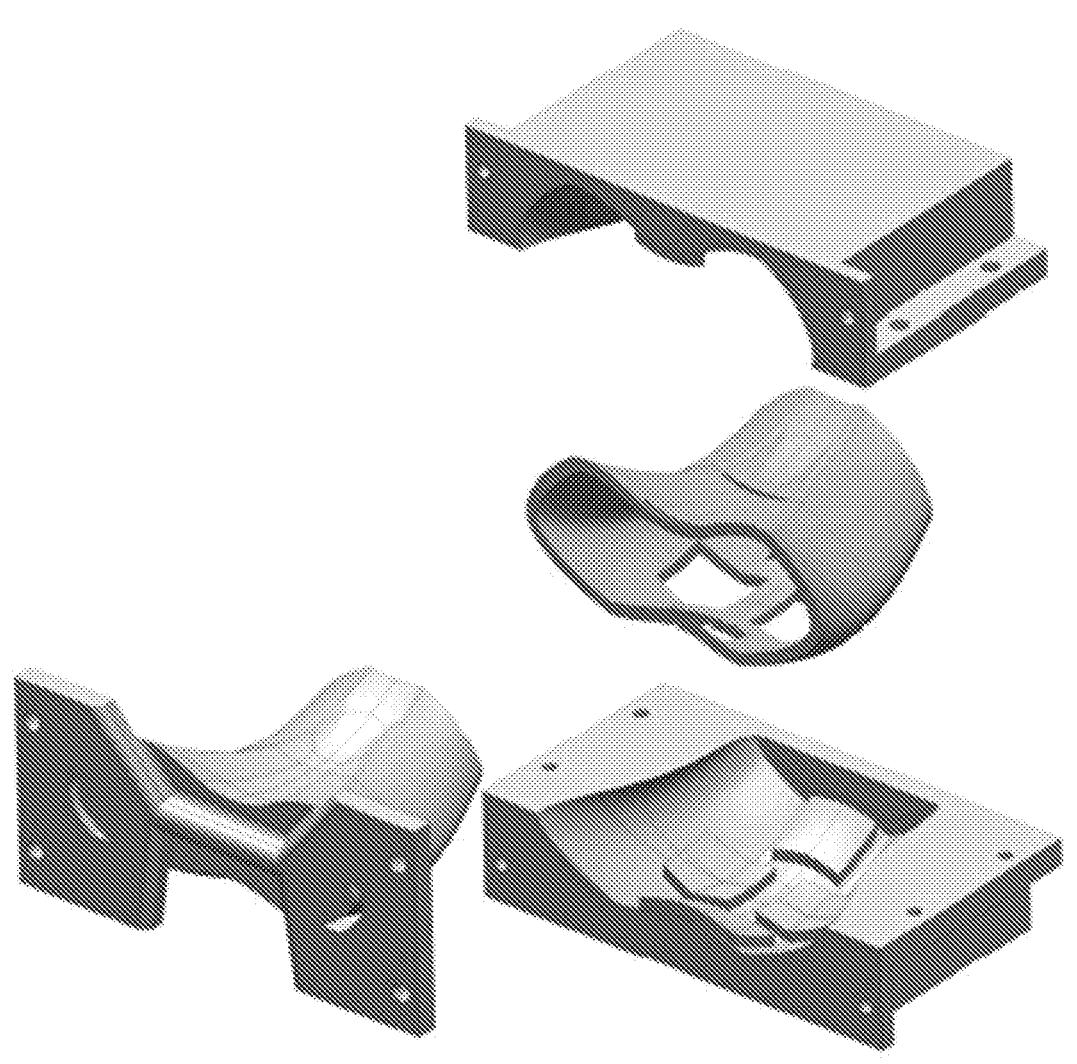
Figure 13C:
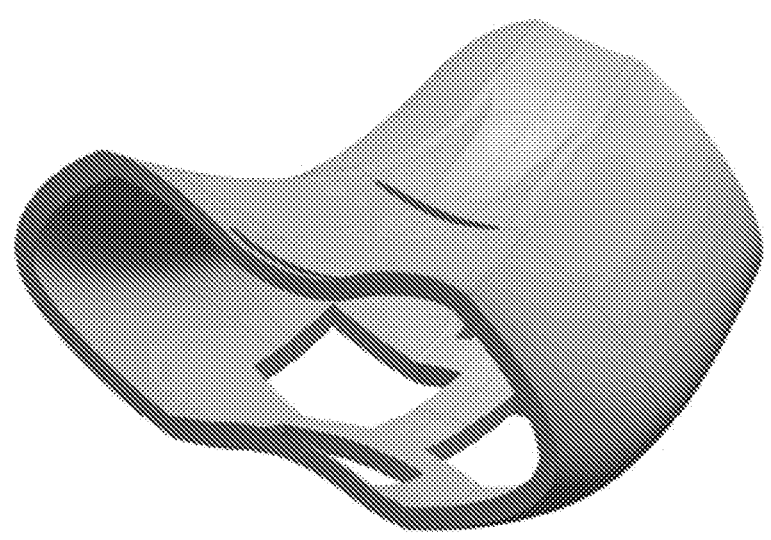
Figure 13D:
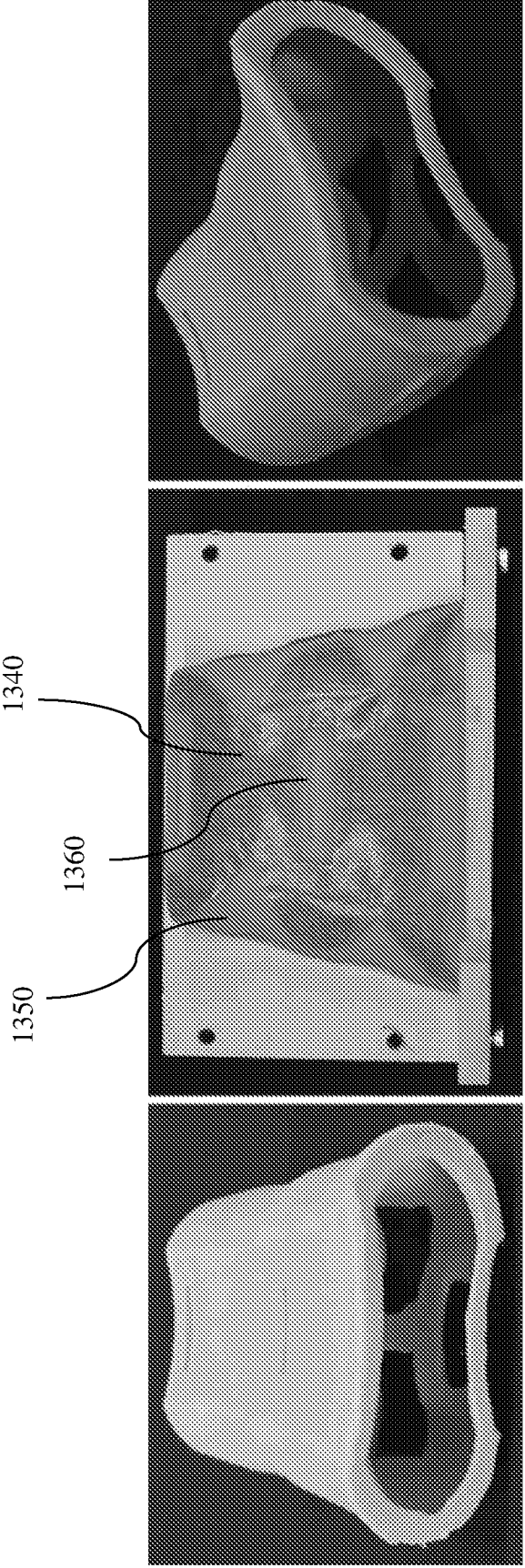
FIG. 13D illustrates images of the cast multilayer palm membrane with embedded strain-limiting layer according to various example embodiments.

The multilayer palm membrane and the plurality of wedge members of the palm member may be cast using the same or similar techniques as described with respect to the multilayer finger membrane and the plurality of phalange members, respectively. In various non-limiting example embodiments, the polymers used for casting the multilayer palm membrane and the plurality of wedge members may be SmoothSil 935 and SmoothSil 960, respectively. FIGS. 13A-13C illustrate the fabrication of the multilayer palm membrane. FIG. 13A illustrates an assembled three-part mold with an insert 1310 for casting the multilayer palm membrane (palm skin). FIG. 13B illustrates de-molding of the multilayer palm membrane. FIG. 13C illustrates the cast multilayer palm membrane. FIG. 13D illustrates images of the cast multilayer palm membrane with embedded strain-limiting layer (e.g., PTFE-coated fiberglass fabric) 1340. A profile of the strain-limiting layer 1340 is illustrated in the middle image of FIG. 13D. Similar to the strain-limiting layer 1140 of the multilayer finger membrane as described above, the strain-limiting layer 1340 of the multilayer palm membrane may include a plurality of first type cut-outs 1350 and a plurality of second type cut-outs 1360. The plurality of first type cut-outs 1350 and the plurality of second type cut-outs 1360 may ensure the first and second flexible membrane layers above and below the strain limiting layer of the multilayer palm membrane connect. For example, the plurality of second type cut-outs 1360 align with cut-outs in the multilayer palm membrane and the openings in the 3D polygon members (wedges). The multilayer palm membrane and 3D polygon members may be assembled and connected at these locations (of the plurality of second type cut-outs 1360) by casting a same material as the 3D polygon members through the cavity (openings at the plurality of second type cut-outs 1360). This casting step may create a sealed enclosure. The plurality of first type cut-outs 1350 are to prevent undesirable folding of the strain-limiting layer when the palm member is actuated. The plurality of first type cut-outs 1350 also enable a robust embedment of the strain-limiting layer in the multilayer palm membrane by bonding two flexible membrane layers during the casting step.

Figure 14A:
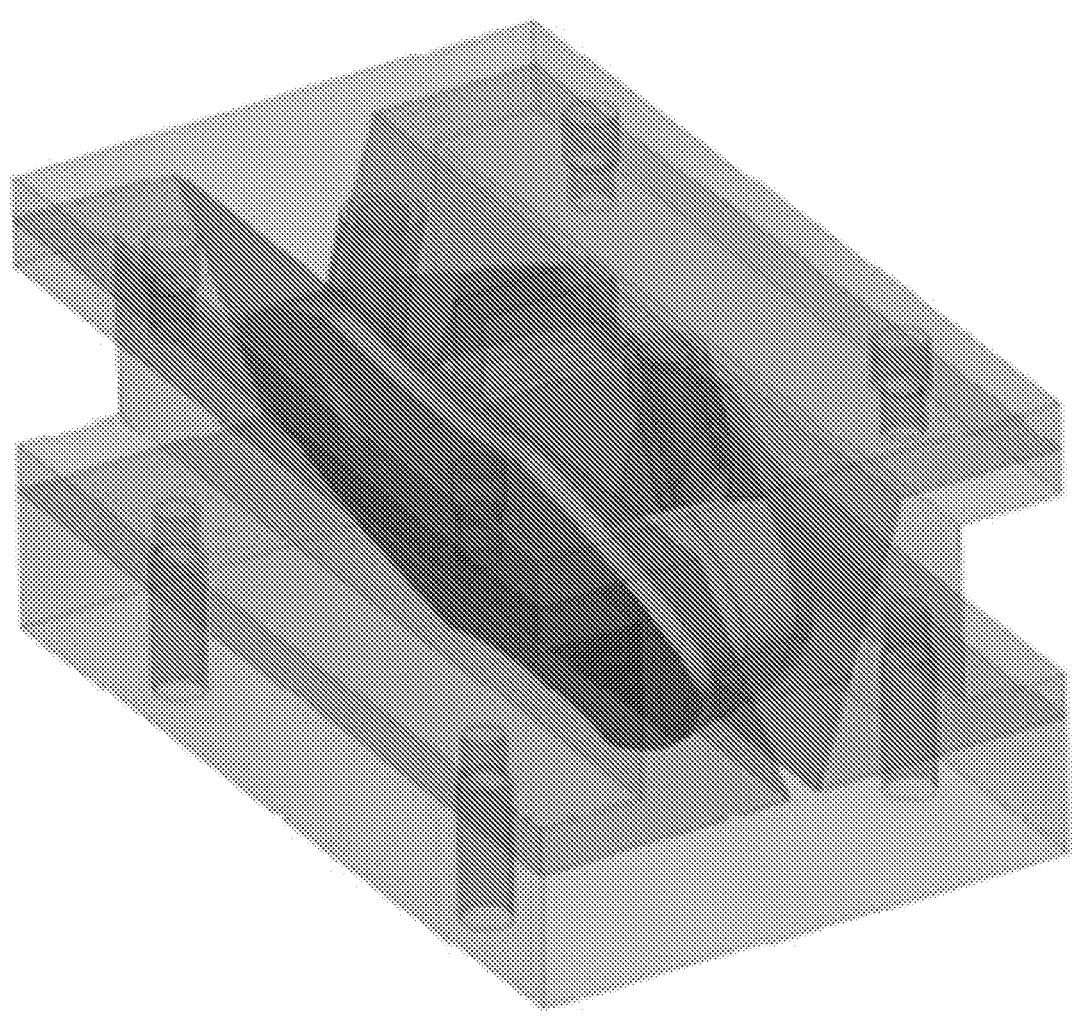
Figure 14B:
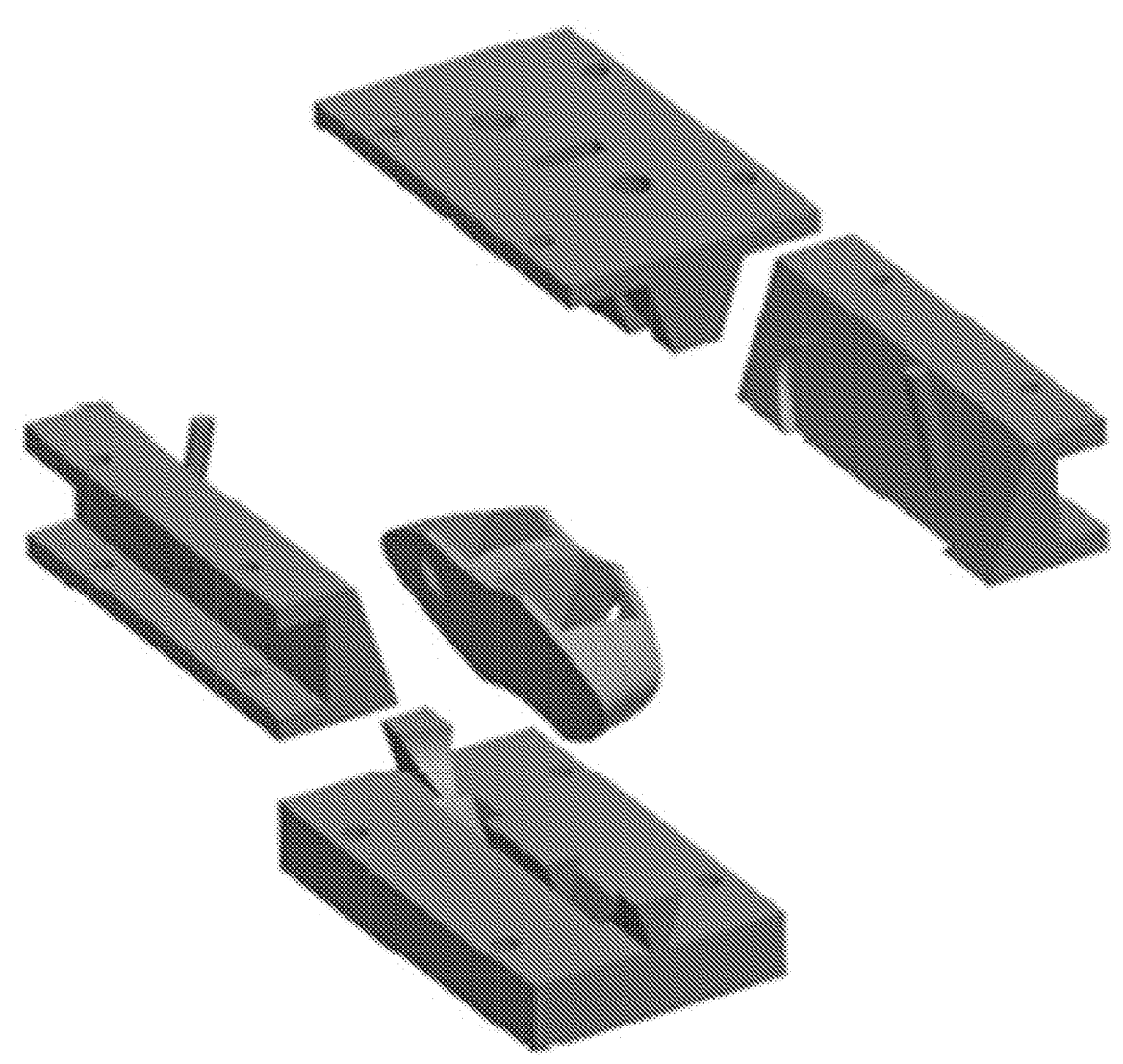

FIGS. 14A-14C illustrate the fabrication of a palm wedge member using a four-piece 3D printed mold. FIG. 14A illustrates an assembled four-part mold for casting a palm wedge member (e.g., wedge). FIG. 14B illustrates de-molding of the palm wedge member. FIG. 14C illustrates the cast palm wedge member. The same process may be repeated for each of the plurality of palm wedge members (e.g., repeated for three wedges). FIG. 14D illustrates an image of three cast palm block members (e.g., three palm wedges). As illustrated, one or more tubings or fluid connectors (tubes) 1410 may be inserted or fixed through the central palm wedge member.

In various example embodiments, the plurality of phalange members (wedges) may be aligned inside the multilayer finger membrane (skin) using slits and cavities (corresponding to the first opening of the first side portion and the second opening of the second side portion of each phalange member, respectively). Once aligned, a polymer which may serve as a bonding agent/glue/sealant, such as SmoothSil 960 in a non-limiting example, may be dispensed into the slits and cavities of the phalange members through the multilayer finger membrane. This is done to bond the plurality of phalange members to the surface of the multilayer finger membrane (the skin surface) and create an airtight seal inside the plurality of finger members (airtight with respect to the exterior of the finger member, where inside the finger member all of the cavities are connected through the internal holes). The SmoothSil is acting like a bonding agent/glue/sealant since it is chemically compatible with the rest of the materials in the structure. The polymer for bonding the plurality of phalange members to the surface of the multilayer finger membrane may be chosen based on their moduli of elasticity, and moduli of elasticity depends on a given application (e.g., harder moduli may be chosen for larger finger members or applications requiring larger forces, and vice versa).

Figure 15A:
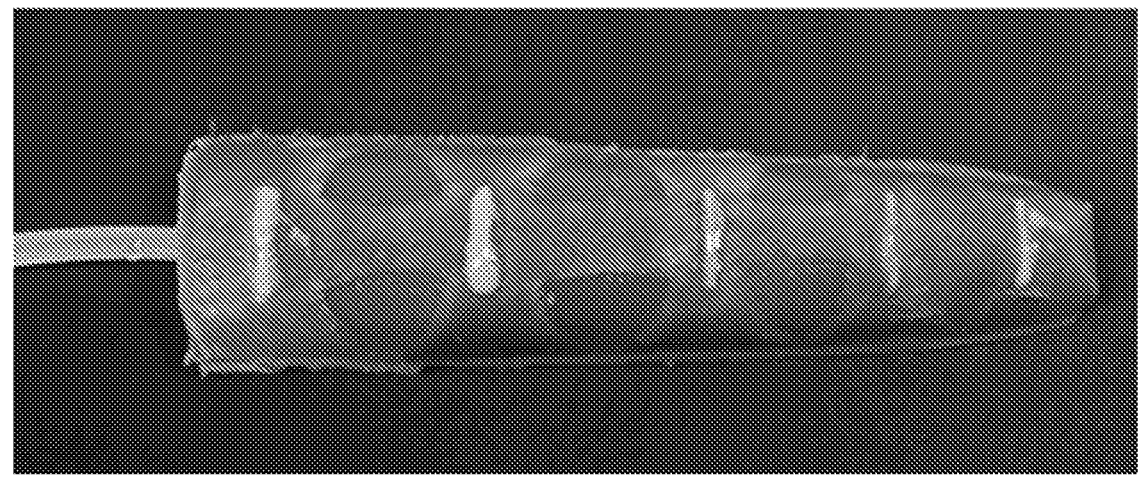
FIG. 15A illustrates a top view of an assembled finger member according to various example embodiments.
Figure 15B:
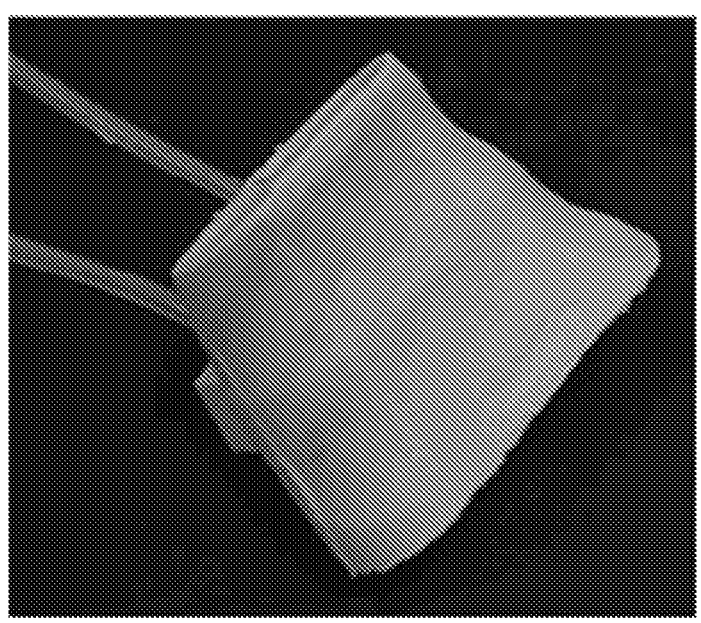
FIG. 15B illustrates a top view of an assembled palm member according to various example embodiments.

FIG. 15A illustrates a top view of an assembled finger member. The same process may be repeated for the plurality of palm wedge members and the multilayer palm membrane (palm skin). FIG. 15B illustrates a top view of an assembled palm member.

Figure 15C:
FIG. 15C illustrates a perspective view of an assembled finger member according to various example embodiments.

As illustrated in FIG. 15C, the assembled finger member (including the plurality of phalange members encapsulated by the multilayer finger membrane) may be assembled to a coupling end portion (e.g., 3D printed connector) 1505. The assembled finger member may be tight-fitted into the coupling end portion. The finger member may be then fixed to the coupling end portion by pouring a polymer which may serve as a bonding agent/glue/sealant, such as SmoothSil 960 in a non-limiting example, into a window (e.g., rectangular window) in the coupling end portion. The material flows through the window and distributes itself between crossbeams in the coupling end portion. Once cured, the material of the polymer (bonding agent) may form a strong mechanical bond with the coupling end portion due to the crossbeams as well as a strong chemical bond with the soft finger member (with the both the phalange member and the multilayer finger membrane).

Figure 15D:
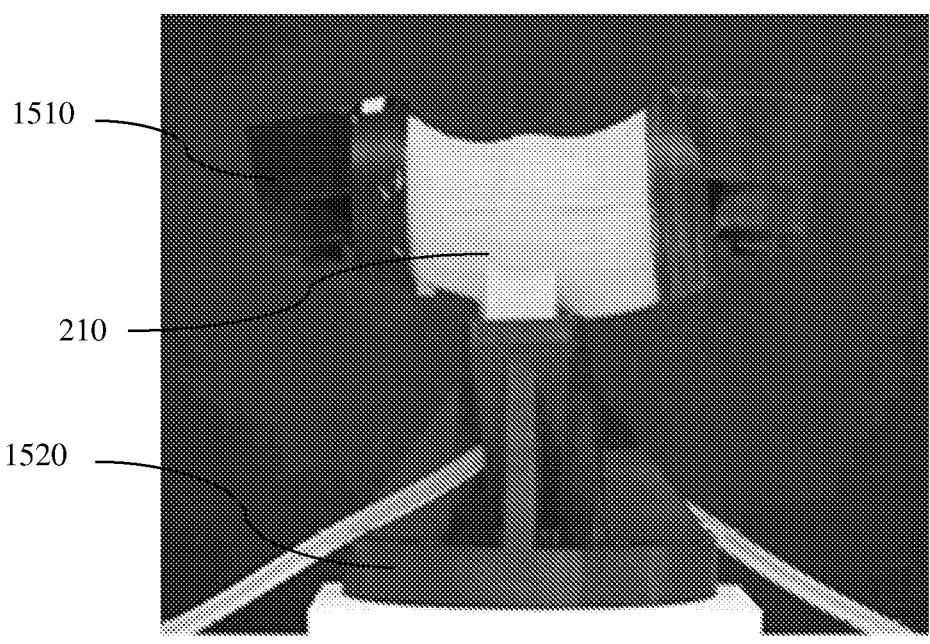
FIG. 15D illustrates a side view of an assembled palm member according to various example embodiments.

As shown in FIG. 15D, the mounting sockets (e.g., 3D printed connectors or ABS interfaces) 1510 and mounting base 1520 may be attached and fixed to the sides and bottom of the palm member 210, respectively. The mounting sockets 1510 and the mounting base 1520 may be formed by 3D printing, in a non-limiting example.

Figure 15E:
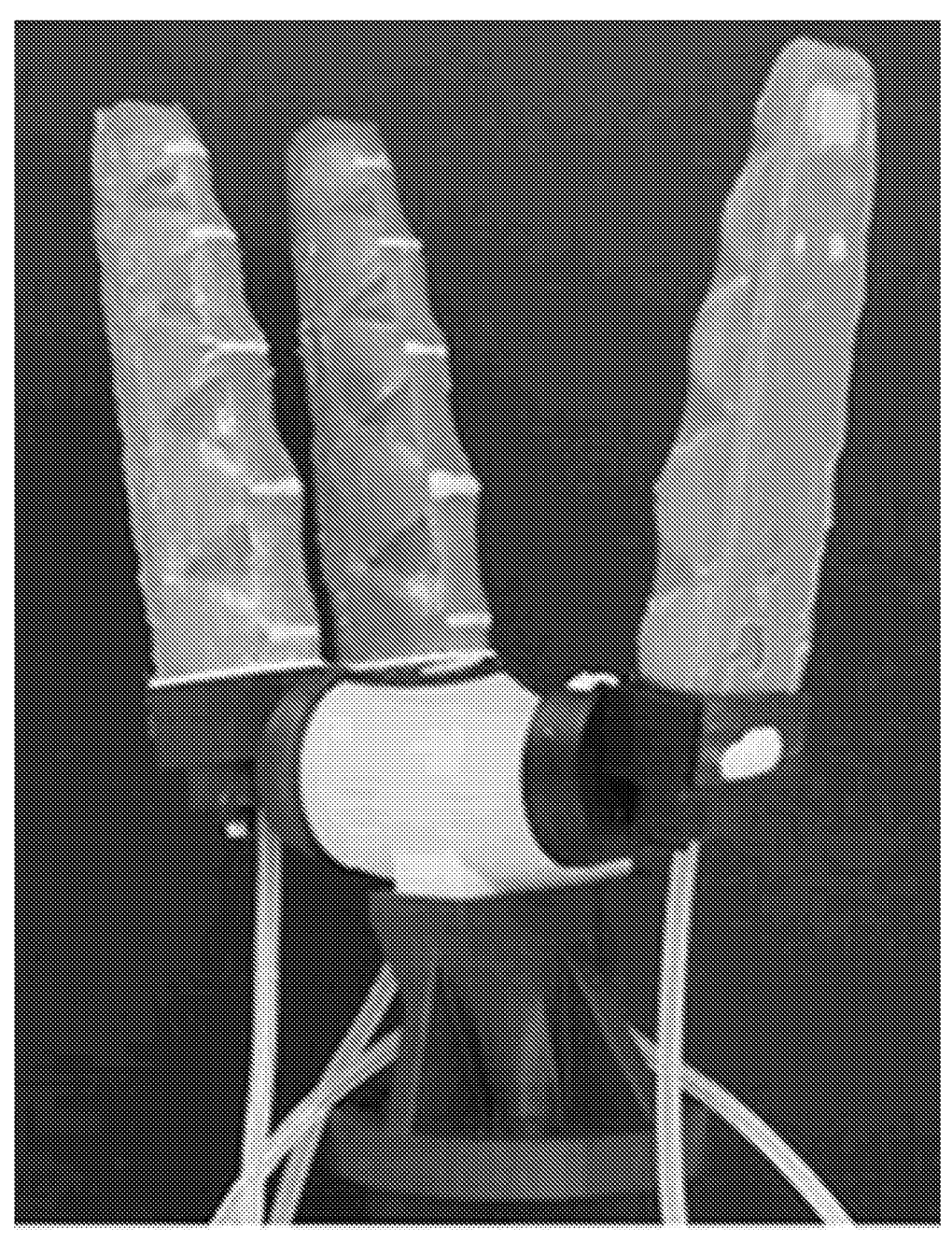
FIG. 15E illustrates a perspective view of an assembled gripping apparatus according to various example embodiments.

The plurality of finger members may be mounted to the palm member to form the assembled gripping apparatus, as shown in FIG. 15E. In various example embodiments, the coupling end portion of the finger member may be plugged-in and fastened to the mounting socket on the palm member. While the 3D printed interfaces do not contribute actively to the actuation, they are designed with the correct tolerances and internal crossbeam structures to ensure that the soft actuators are airtight and strongly held, when subject to high loads.

Figure 15F:
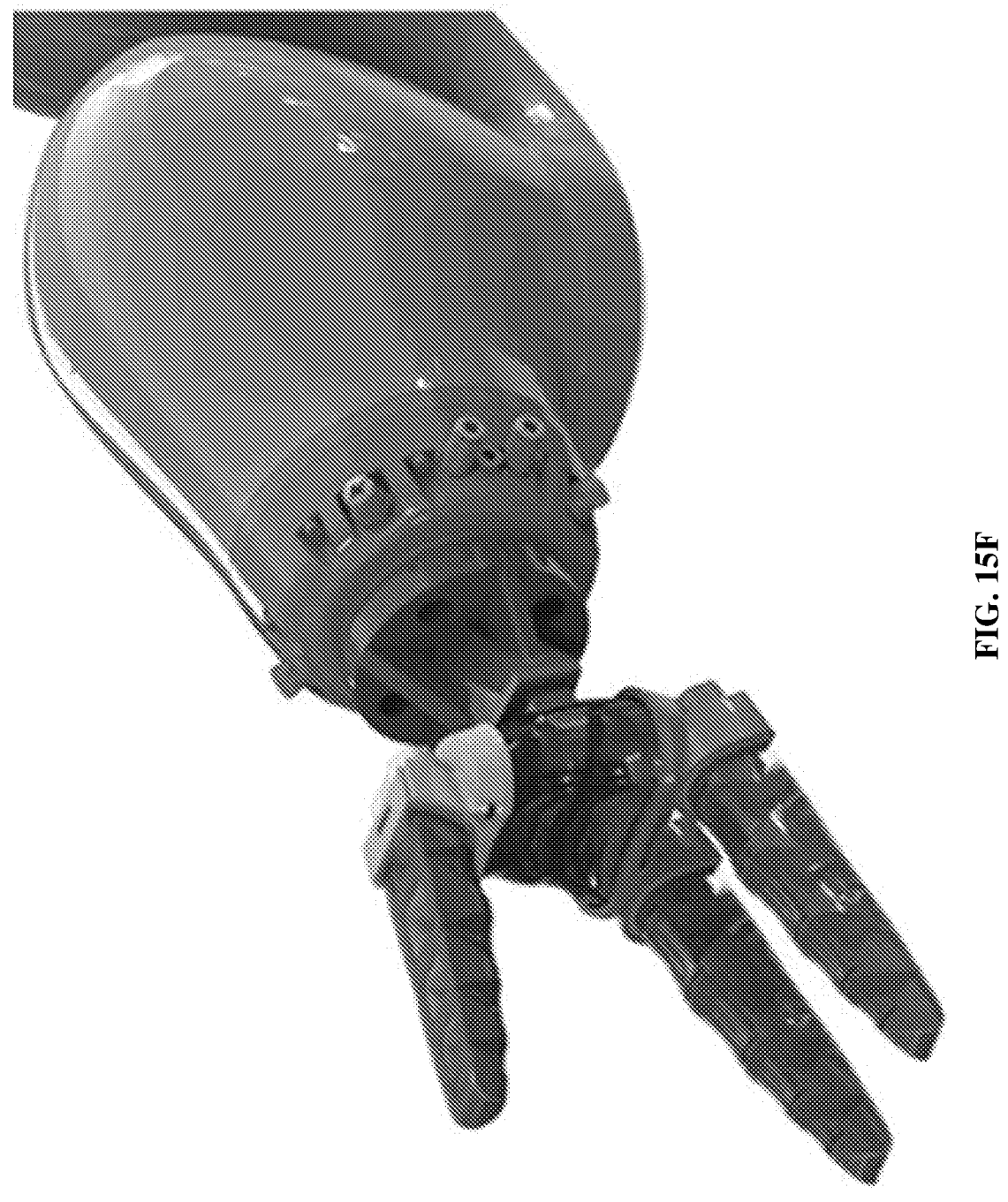
FIG. 15F illustrates a perspective view of a gripping apparatus mounted to a robotic component according to various example embodiments.

The gripping apparatus may be mounted on a robotic arm using the 3D printed mounting base. As illustrated in FIG. 15F, the entire assembly may be attached to robotic manipulators such as a manipulator end-effector.

Accordingly, the fabrication of the gripping apparatus allows the moulds to be reused and creating hollow assemblies without the use of sacrificial materials. The multi-step process facilitates in forming a multi-material actuator with the desired dynamics.

Pneumatic Setup

Figure 15G:
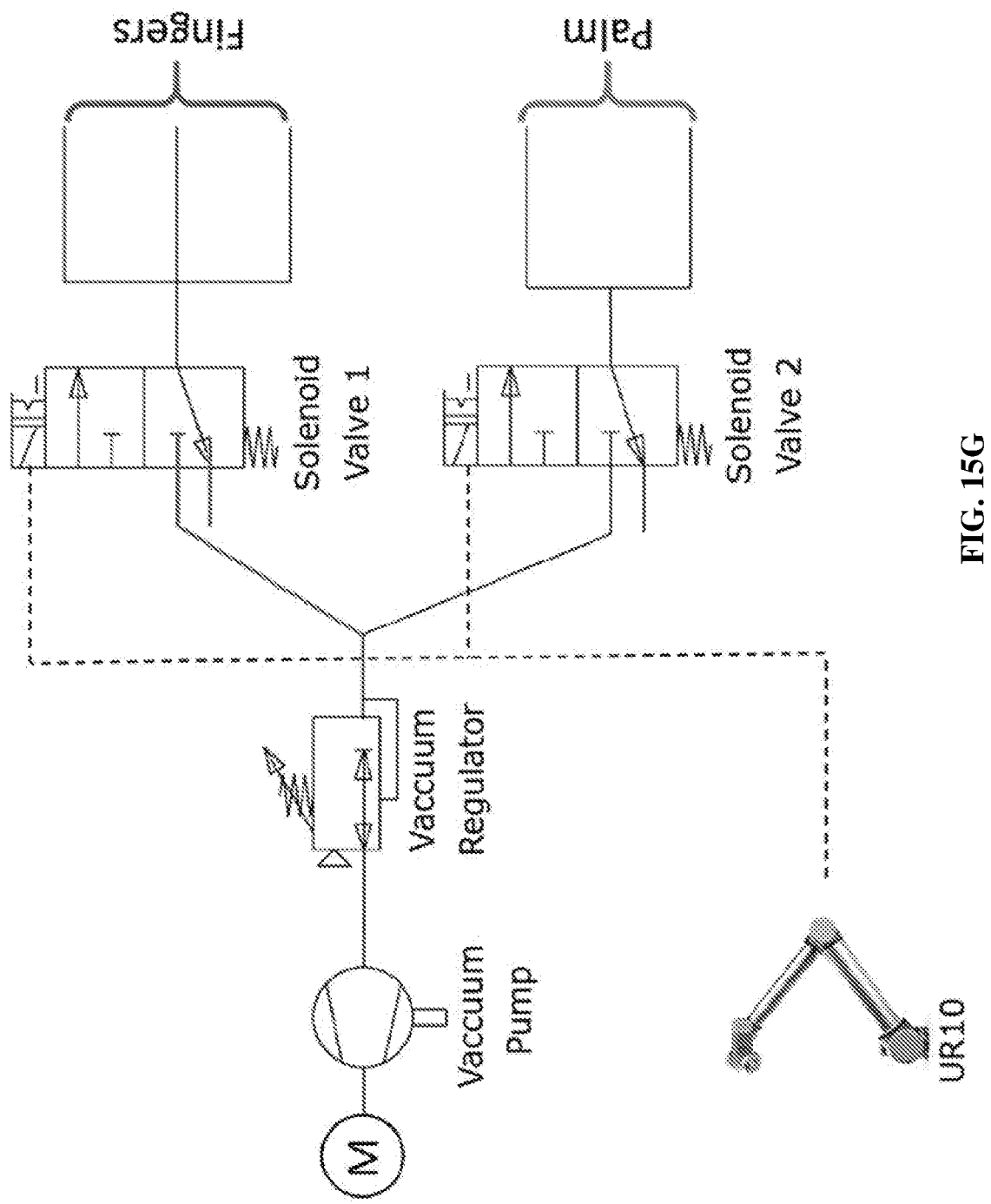
FIG. 15G depicts a schematic illustrating the gripping apparatus connected to a vacuum system according to various example embodiments.

In various example embodiments, a vacuum pump connected in series to a programmable vacuum regulator (corresponding to the vacuum system) may be used to provide negative pressure. In a non-limiting example, two SMC solenoid valves from SMC-PNEUMATICS may be connected in parallel to the output of the vacuum regulator as shown in FIG. 15G. The output of one valve may be connected to the plurality of finger members and the other to the palm member to enable independent control of the two modules. For example, the output of one valve may be connected to the silicone tubes of the finger members and the other to the tubes of the palm member. The valves may be controlled using standard 24V digital outputs found in the controllers of commercially available robotic arms allowing for easy installation on multiple robot arms while keeping the pneumatic hardware outside the robot end-effector.

Experiments

Finger Bending Characterization

In one study, bending tests were performed on three soft fingers (three finger members) made of different materials in order to study the role of material selection in actuator performance. Vacuum actuation was controlled using the same pneumatic circuit shown in FIG. 15G and finger member bending was tracked and measured using an open-source vision-based tracking software tool as described in, Jackson et al. (2016) 3d for the people: Multi-camera motion capture in the field with consumer-grade cameras and open source software. *Biology Open* 5: bio.018713. The software enabled position tracking of distinct points in space or "markers" (with known distances between them) over a series of frames and minimized 2D projection errors using adjustments as implemented by Lourakis et al. (2009) Sba: A software package for generic sparse bundle adjustment. *ACM Trans. Math. Softw.* 36(1): 2:1-2:30. Finger members made of three different skin materials: MoldStar 30, Eco-FleX 00-30 and SmoothSil 940 were used for the experiments (bulk material properties are listed in Table 2). Finger members were actuated at about −15, −30, −60 and −100 kPa (i.e., a corresponding step in negative pressure was applied at t=0) and their bending response was recorded at 240 fps until maximum deformation was attained. The values in the second column of Table 2, labeled "Modulus (MPa)", are the moduli of elasticity of the various materials. The third column denotes the strength (max stress value before plastic deformation), the forth column list the strains at which the samples break, and the lasts column shows the densities (weight per unit volume) of the materials.

TABLE 2

| Gripper material properties | | | | |
| --- | --- | --- | --- | --- |
| Component/Material | Mod-ulus (M Pa) | Yield strength (M Pa) | Elon-gation at break (%) | Density (kg/m³) |
| Finger wedges/SmoothSil 960 | 4.5 | 1.9 | 270 | 1250 |
| Palm wedges/SmoothSil 960 | 4.5 | 1.9 | 270 | 1250 |
| Finger skin/MoldStar 30 | 2.9 | 0.66 | 339 | 1120 |
| Finger skin/SmoothSil 940 | 4.5 | 1.9 | 300 | 1180 |
| Finger skin/EcoFlex 00-30 | 0.125 | 0.66 | 900 | 1070 |
| Palm skin/SmoothSil 935 | 4.5 | 1.2 | 300 | 1180 |
| Connectors/ABS | 2230 | 31 | 7 | 1040 |
| Gripper base/ABS | 2230 | 31 | 7 | 1040 |
| Embedded fabric/PTFE-coated fiberglass | 2800 | 138 | 5 | 2200 |

Figure 16:
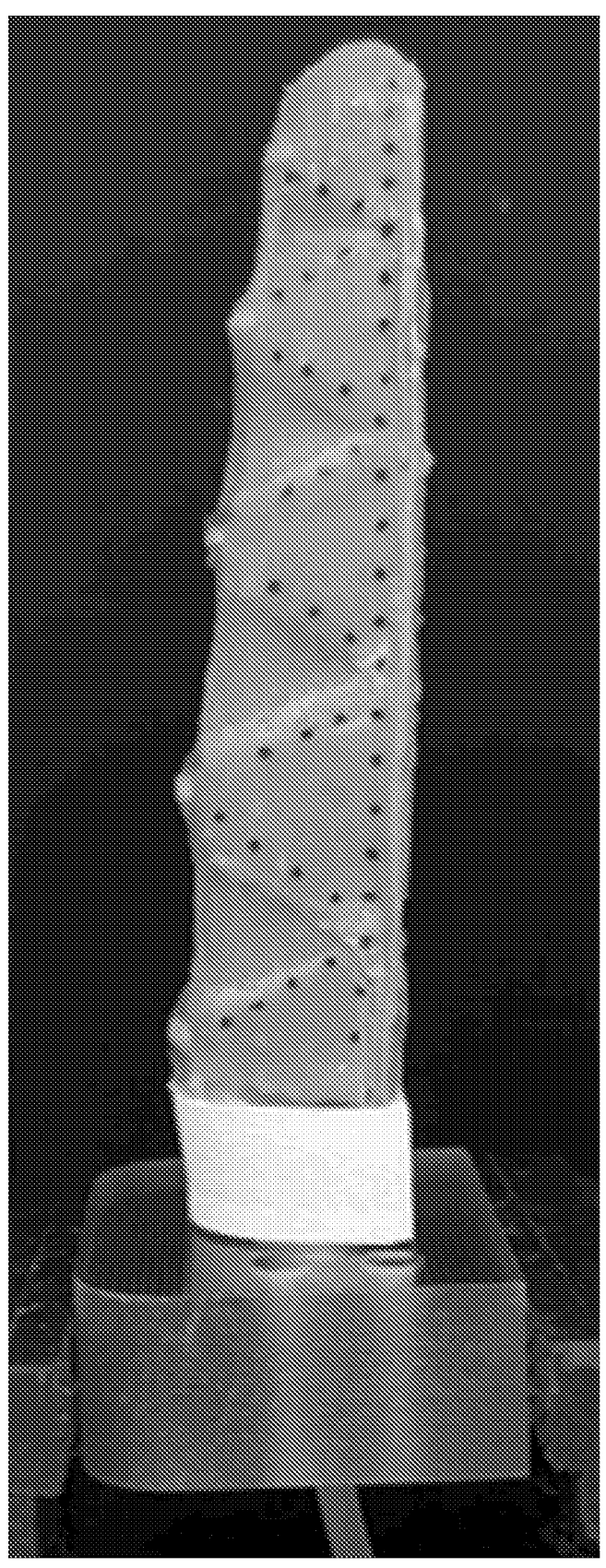
FIG. 16 shows an image illustrating ink markers added to a finger member to aid tracking of bending motions according to various example embodiments.
Figure 17:
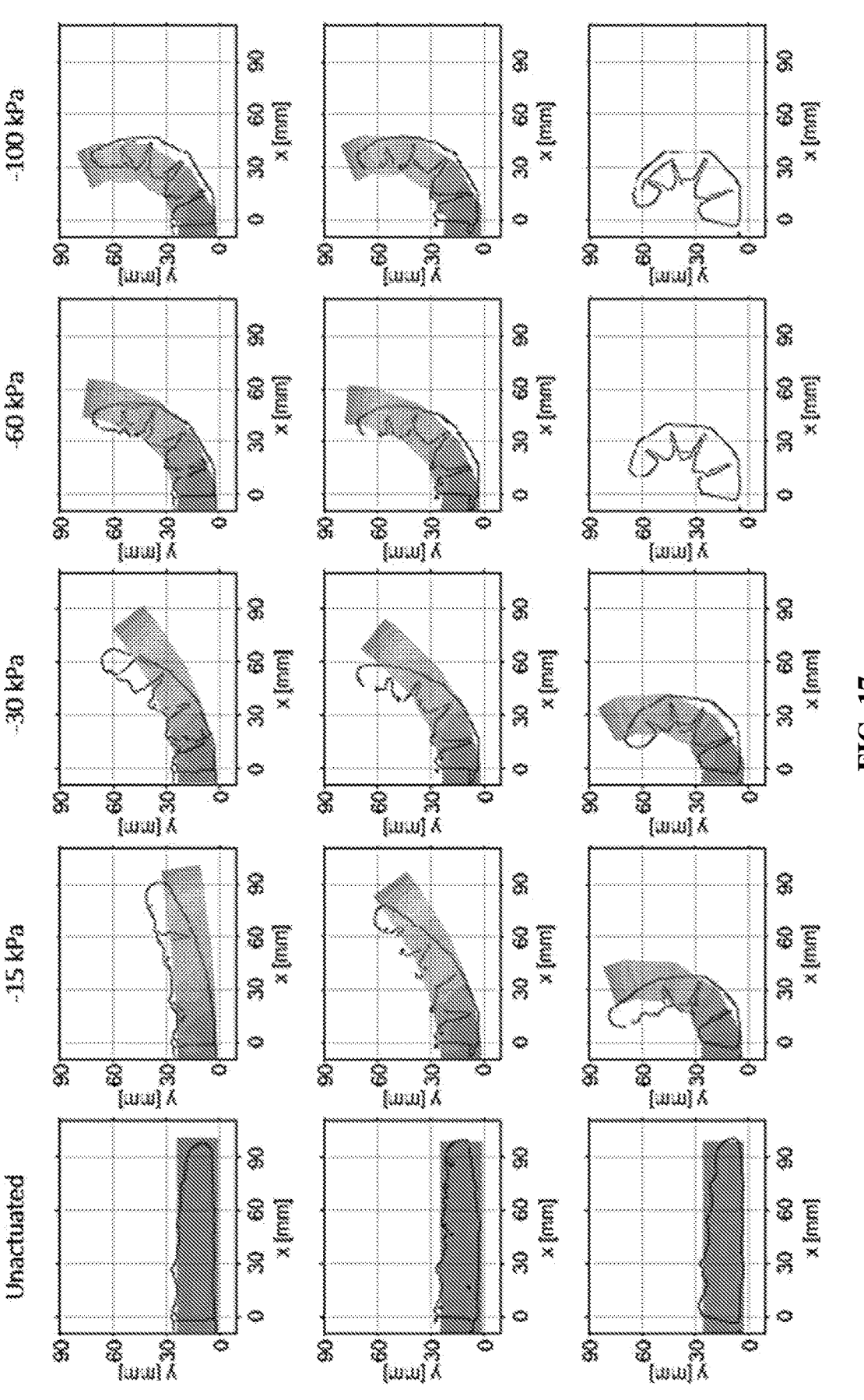
FIG. 17 shows an image illustrating finger bending, simulations versus experiments according to various example embodiments.

A set of ink markers were added in a fixed pattern to the multilayer finger membrane using a stencil. Points for 2D tracking during bending were selected along the boundary of the finger. FIG. 16 shows ink markers added to a finger member to aid tracking of bending motions. The fixed distances between the markers shown in FIG. 16 are used as 'wands' for accurate tracking of the boundary points. The x, y coordinates of the selected boundary points were exported and then plotted in FIG. 17 to replicate the final outline of the finger member (finger outline). Results from the simulation study done in the modeling section (with ABAQUS) as described above are also shown for comparison. More particularly, FIG. 17 shows finger bending, simulations (grayscale regions) vs. experiments (black contours). Three finger members were actuated using four different vacuum pressures, where the multilayer finger membrane of each finger member is made with different materials. SmoothSil 960 has the highest modulus and EcoFlex 00-30 has the lowest (values listed in Table 2). As expected, the softest finger member requires the least pressure (−30 kPa) to achieve its final bent state, and higher vacuum pressures lead to negligible increases in bending. For harder materials, finger members bend noticeably until −60 kPa, followed by smaller changes at higher vacuum pressures. Super-imposed ABAQUS simulations for each case show good qualitative agreement with experiments, in particular at higher vacuum pressures. Simulations for EcoFlex 0030 only converge at lower pressures (up to −30 kPa).

Finger Payload Tests

Figure 18B:
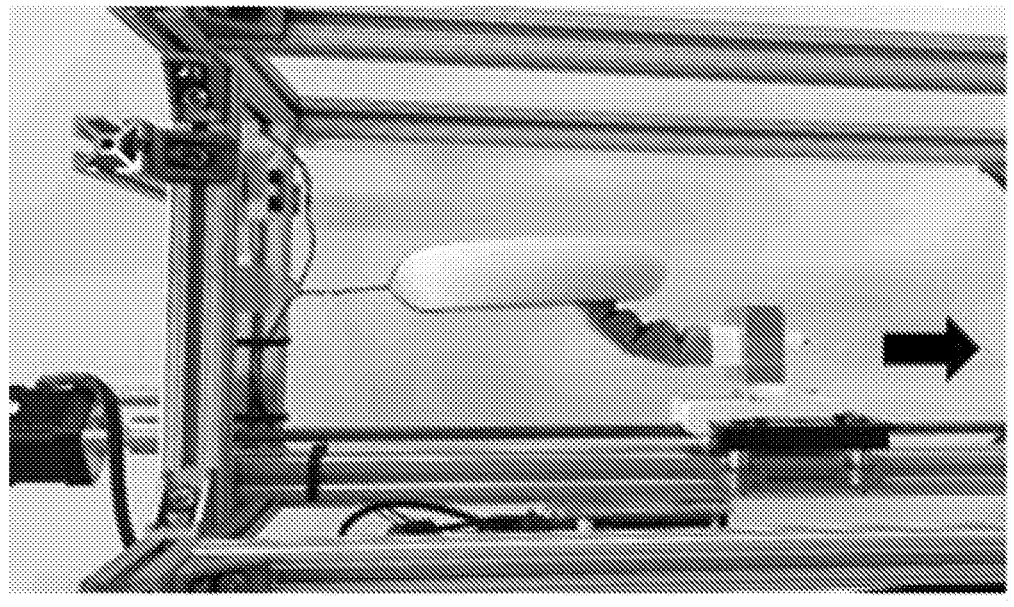
FIGS. 18A-18B show a finger force experiment setup according to various example embodiments.
Figure 18A:
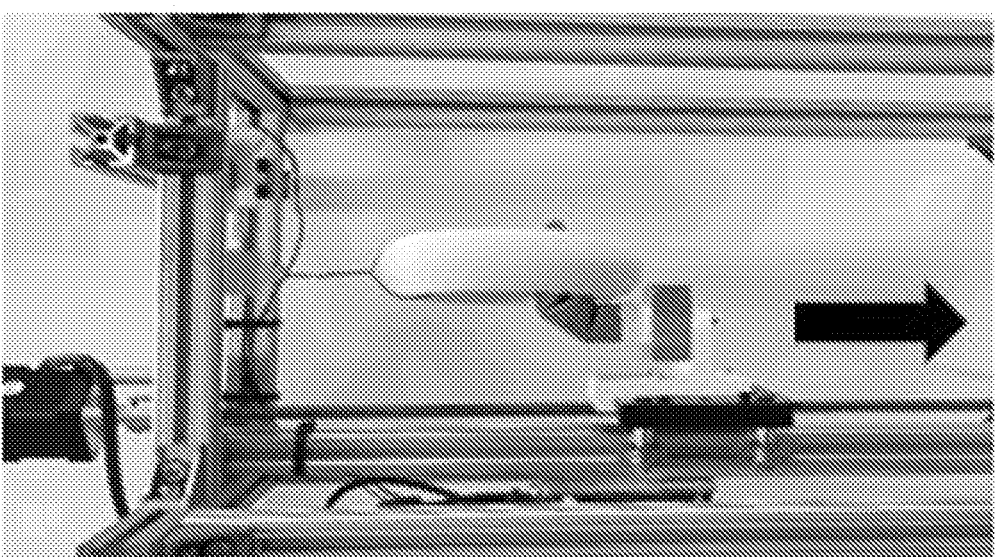
Figure 18C:
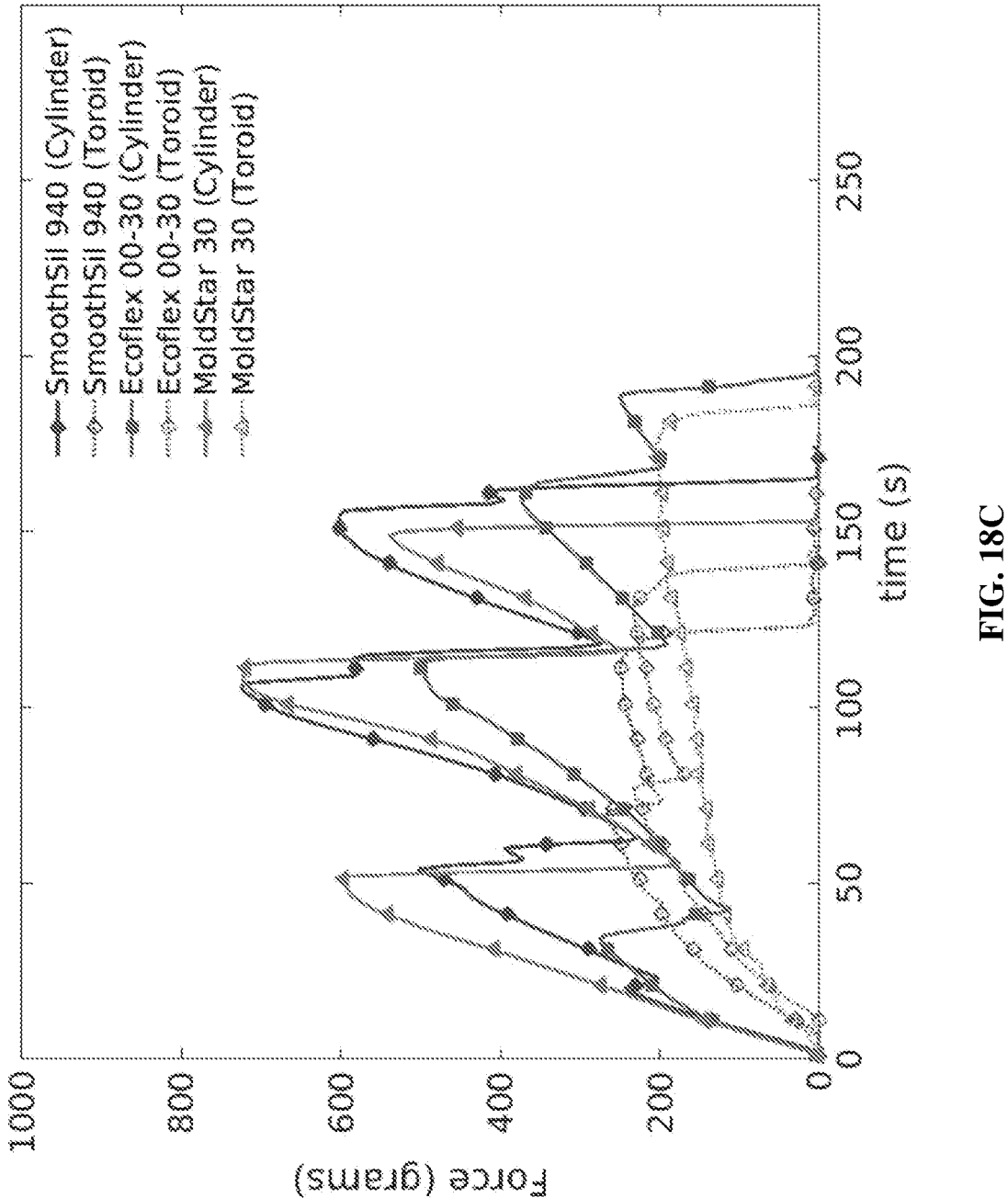
FIG. 18C shows a graph illustrating a plot of the forces required to unwrap the finger member according to various example embodiments.

To study payload capabilities, a setup was created to conduct force experiments on the soft finger members and the full gripper assembly. The setup, shown in FIG. 18A, includes a linear stage (lead screw driven by a NEMA-17 stepper motor) mounted longitudinally inside a rectangular frame. A uni-axial 5 kg load cell (HX711) was mounted at one end of the frame and a test object was attached to the load cell. Individual soft fingers (finger members) were mounted on the linear stage using a 3D printed fixture and actuated to wrap the object's surface as shown in FIG. 18A. More particularly, FIGS. 18A-18B show the finger force experiment setup. FIG. 18A shows a test object was attached to the load cell and the finger member was actuated to wrap around the object (no preload). The stage was then moved away from its initial position (away from the load cell) at a fixed speed of 6 mm/s forcing the mounted finger to release the object. FIG. 18B shows that the finger member was moved away from the load cell and the finger member uncurled until the test object was released from its grip. The arrow corresponds to the direction of motion as well as the direction along which the load cell measures forces. The forces applied to the object were measured using the load cell. The experiments were run four times for each of the three finger members and the recorded data was averaged. Two objects were tested: a toroid, and a hollow cylinder. Results for a toroid and a cylinder are shown in FIG. 18C. More particularly, FIG. 18C shows a graph illustrating a plot of the forces required to unwrap the finger. In the course of the experiments, as the finger slides along the surface of the object the discontinuities of its inner surface (e.g., notches in between phalange members) generate spikes in the force data. This effect is more prominent for the cylinder than for the toroid, which has a much smoother geometry. The three spikes in the force data correspond to the slip transitions at the inner notches of the finger members.

From the bending comparison plots seen in FIG. 17 and the holding forces in FIG. 18C, it can be inferred that while a softer skin material such as EcoFlex 0030 ensures higher finger bending at lower vacuum pressures, the peak force generated on actuation is lower (e.g., 40% for EcoFlex 0030). This is primarily due to EcoFlex 0030 lower modulus which allows higher skin elongation, filling the gaps (or spaces) between the phalange members (wedges), while resulting in lower stresses and corresponding forces. The converse holds true for harder silicone materials such as SmoothSil 940, for which stresses and corresponding forces generated during actuation are larger as a result of their higher moduli and bending deformation is smaller at lower vacuum pressures. Hence, for the gripper finger members, an intermediate material, such as MoldStar30, may be chosen as the primary material for the multilayer finger membrane to allow for sufficient deformation at lower pressures while still achieving high stresses, forces, and corresponding payload capacities.

Gripper Payload Tests

Figure 19A:
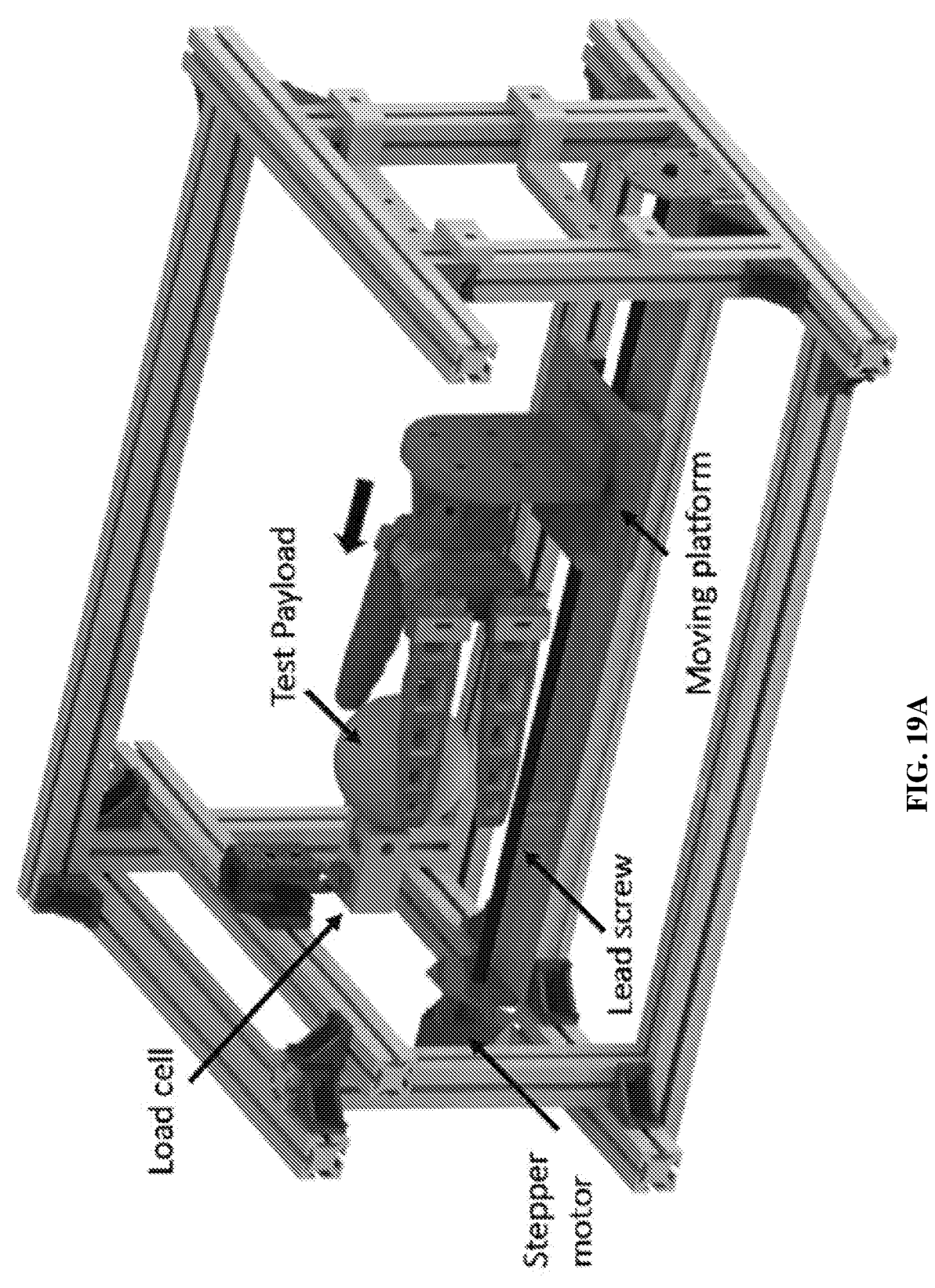
FIG. 19A shows a CAD model of setup for force tests where a gripping apparatus is mounted on a moving platform, while a test object is fixed to a load cell on a frame according to various example embodiments.

Three factors were chosen to characterize gripper payload: part geometry, part orientation with respect to the gripper, and palm actuation. Test objects including a sphere of 70 mm diameter and three cylinders with diameters of 35 mm, 50 mm and 65 mm were 3D printed and used for the experiments. A stage apparatus, shown in FIGS. 19A and 19B, was used for testing the gripper payload capabilities. The gripper was mounted on a moving platform (i.e., linear stage) in vertical and horizontal orientations. Test objects were fixed to a uni-axial load cell mounted at one end of the stage. The gripper was positioned near the object and actuated to achieve a solid grasp. More particularly, FIG. 19A shows a CAD model of setup for force tests where the gripper is mounted on a moving platform, while a test object is fixed to a load cell on the frame. The gripper is moved towards the payload and the vacuum is triggered to grasp the test object. Two actuation modes were employed: actuation of the finger members only (finger-only actuation), and actuation of the finger members and the palm member (palm-actuation). Once a secure grip was achieved, the gripper was moved away from the object at a fixed speed of 6 mm/s until the object was released from its grasp.

Figure 19B:
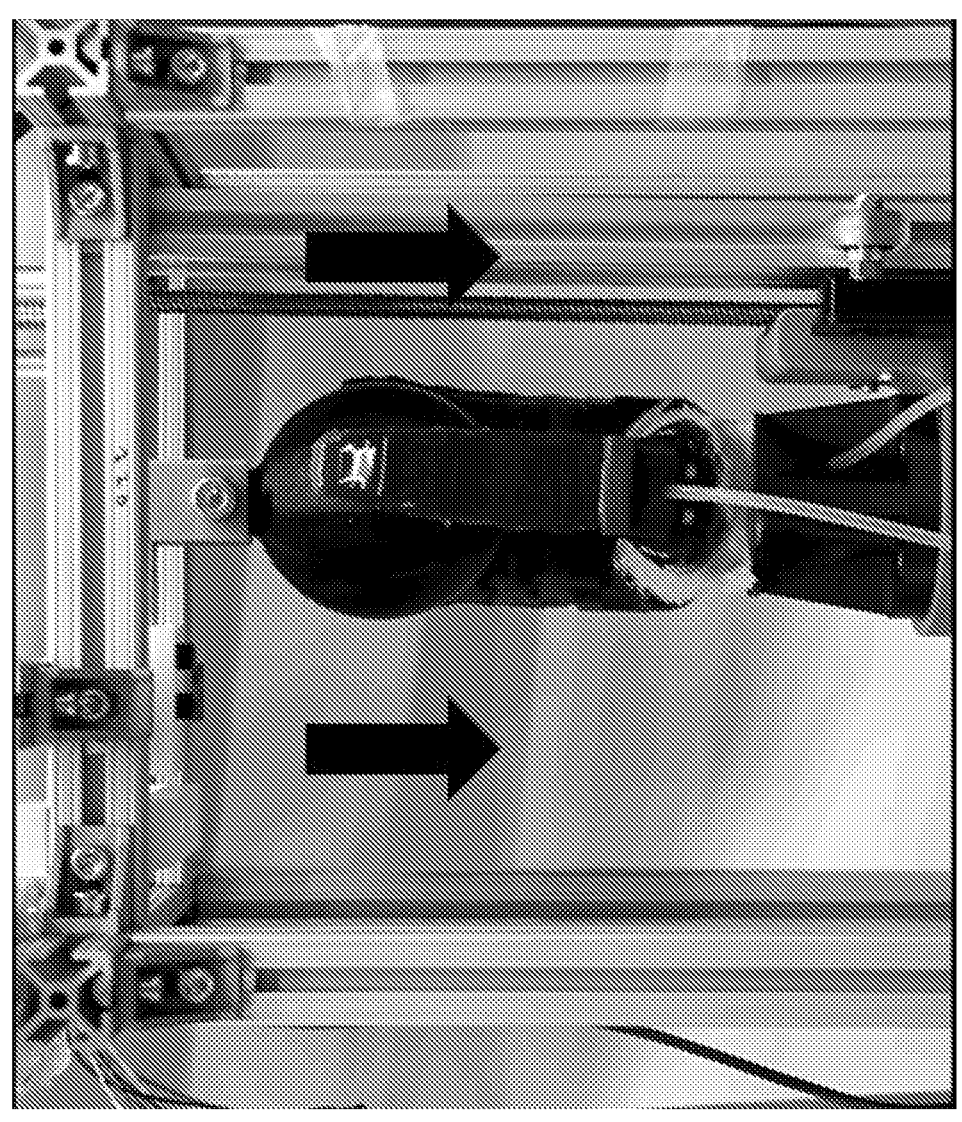
FIG. 19B illustrates the uni-axial load cell can measure forces only in the direction of motion of the gripper according to various example embodiments.
Figure 19C:
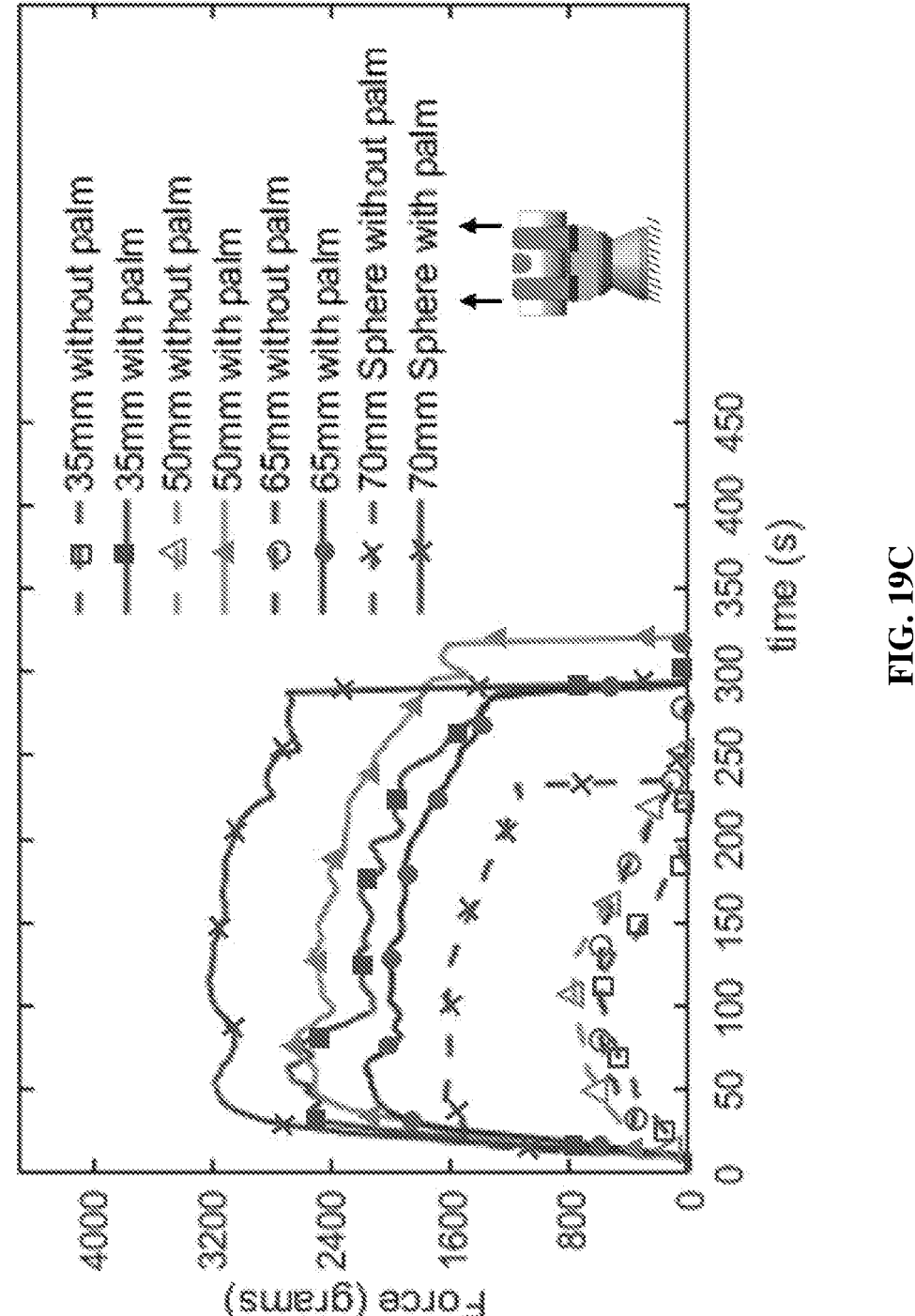
FIG. 19C shows a graph illustrating the holding forces for when motion occurs along the gripper axis and FIG. 19D shows a graph illustrating the holding forces for when motion occurs perpendicularly to the gripper axis according to various example embodiments.
Figure 19D:
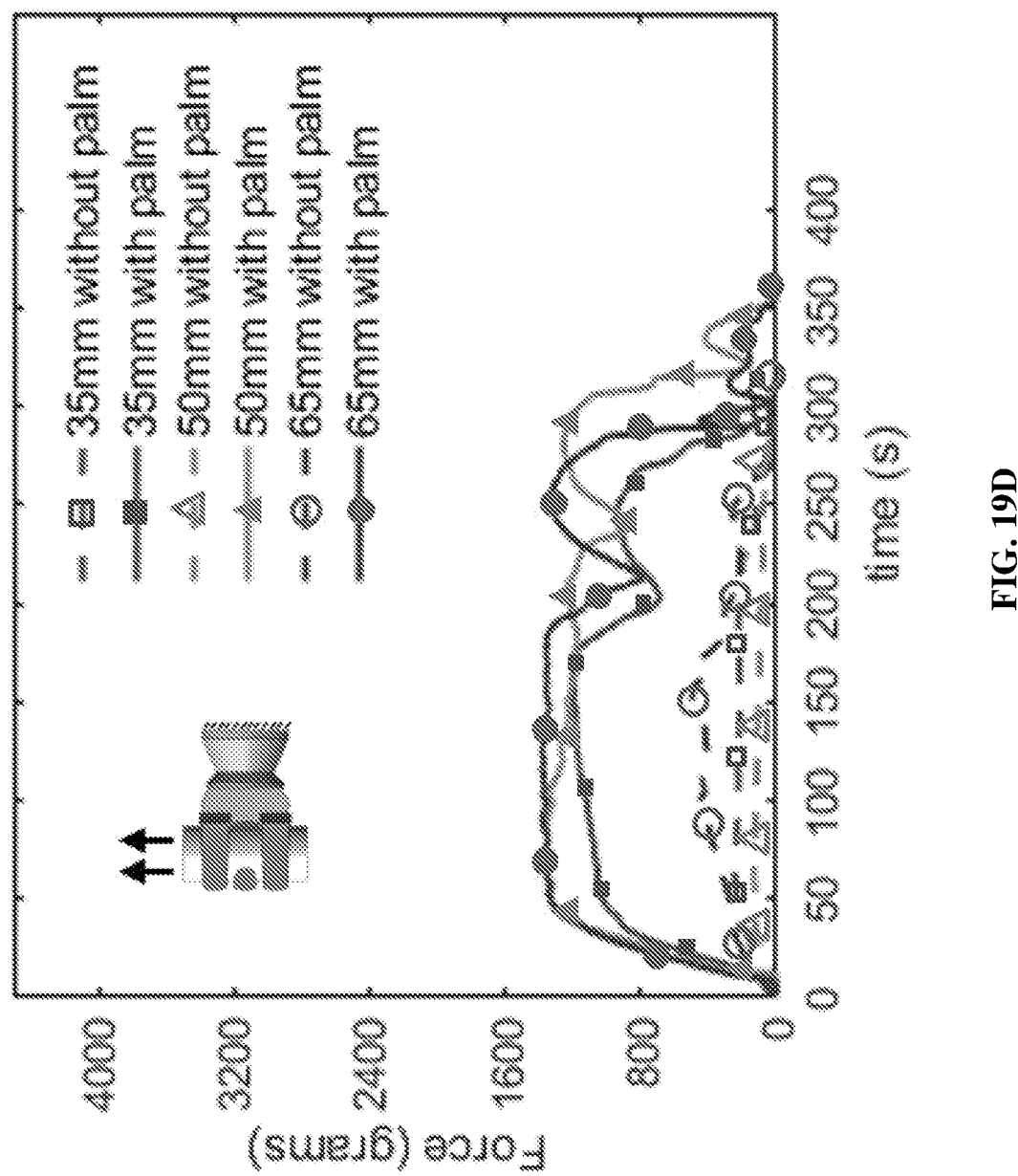

FIG. 19B illustrates the uni-axial load cell can measure forces only in the direction of motion of the gripper (shown by the arrows). The gripper is moved down at a fixed rate, until the object is released from its grip. The load cell measured forces strictly in the direction of motion of the gripper. Holding force was recorded and averaged over five runs for each set of parameters (actuation mode, test object, and gripper orientation). FIG. 19C shows the holding forces for when motion occurs along the gripper axis and FIG. 19D shows the holding forces for when motion occurs perpendicularly to the gripper axis. More particularly, FIG. 19C shows force measurements for a normal grasp pull (motion is aligned with gripper axis) for three cylinders and a sphere. Palm actuation increases load resistance by at least 200% in all cases, and FIG. 19D shows force measurements for a tangential grasp pull (motion is perpendicular to the gripper axis) for the three cylinders. Palm actuation increases load resistance by at least 400% in all cases. In both cases, it is evident that the palm actuation increases the peak grasping force generated by the gripper by at least 200% (and up to 400% in some cases) compared to a finger-only actuation. Also, in the case of the smallest test object (35 mm cylinder), the actuated palm ensured a complete wrap of the gripper around the cylinder, while a finger-only actuation mode resulted in a partial contact between the finger members and the cylinder.

Grasp Workspace

Figure 20A:
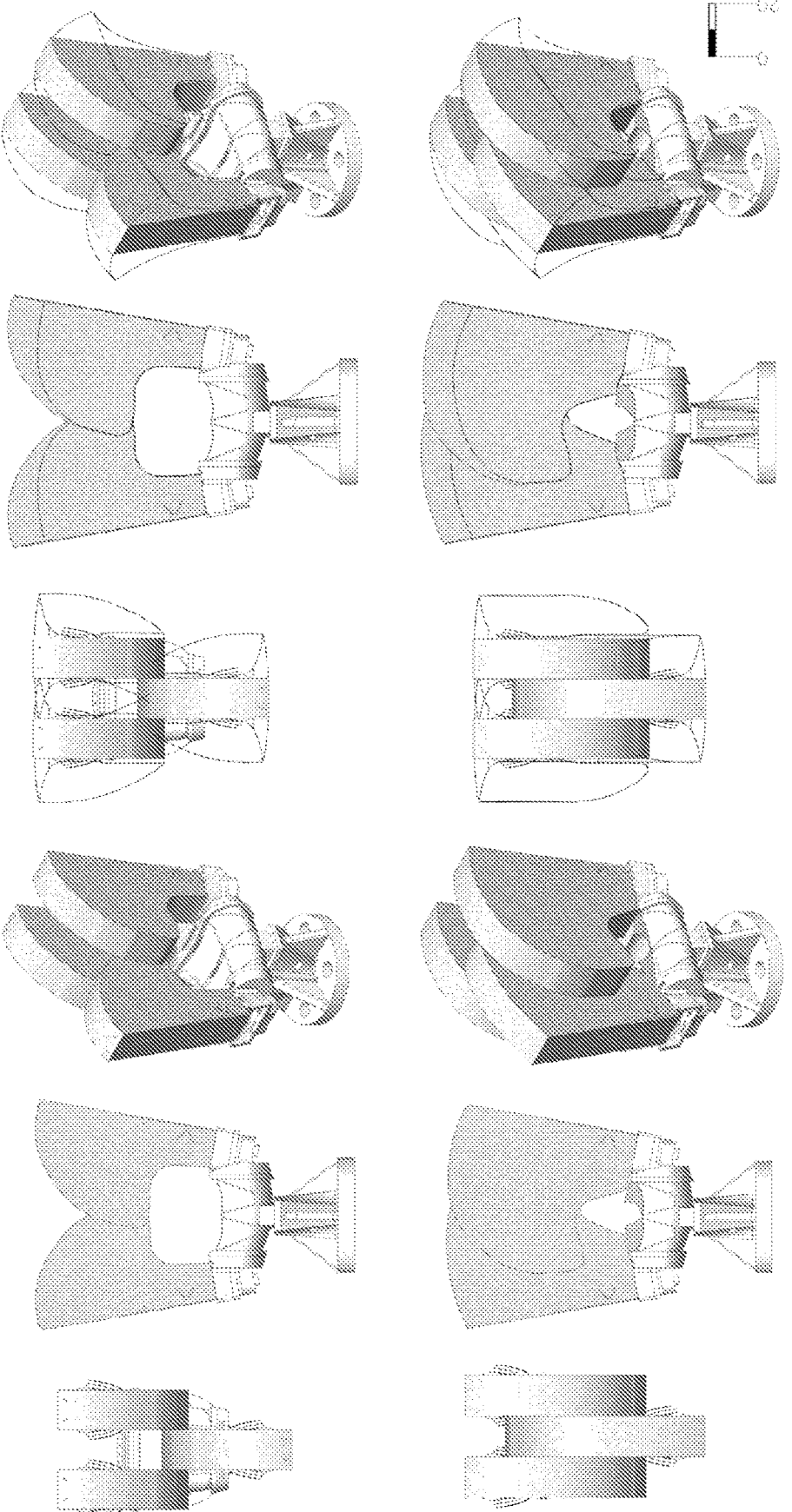
FIGS. 20A-20B show a comparison of the gripping apparatus grasp workspaces with and without the soft palm actuation according to various example embodiments.
Figure 20B:
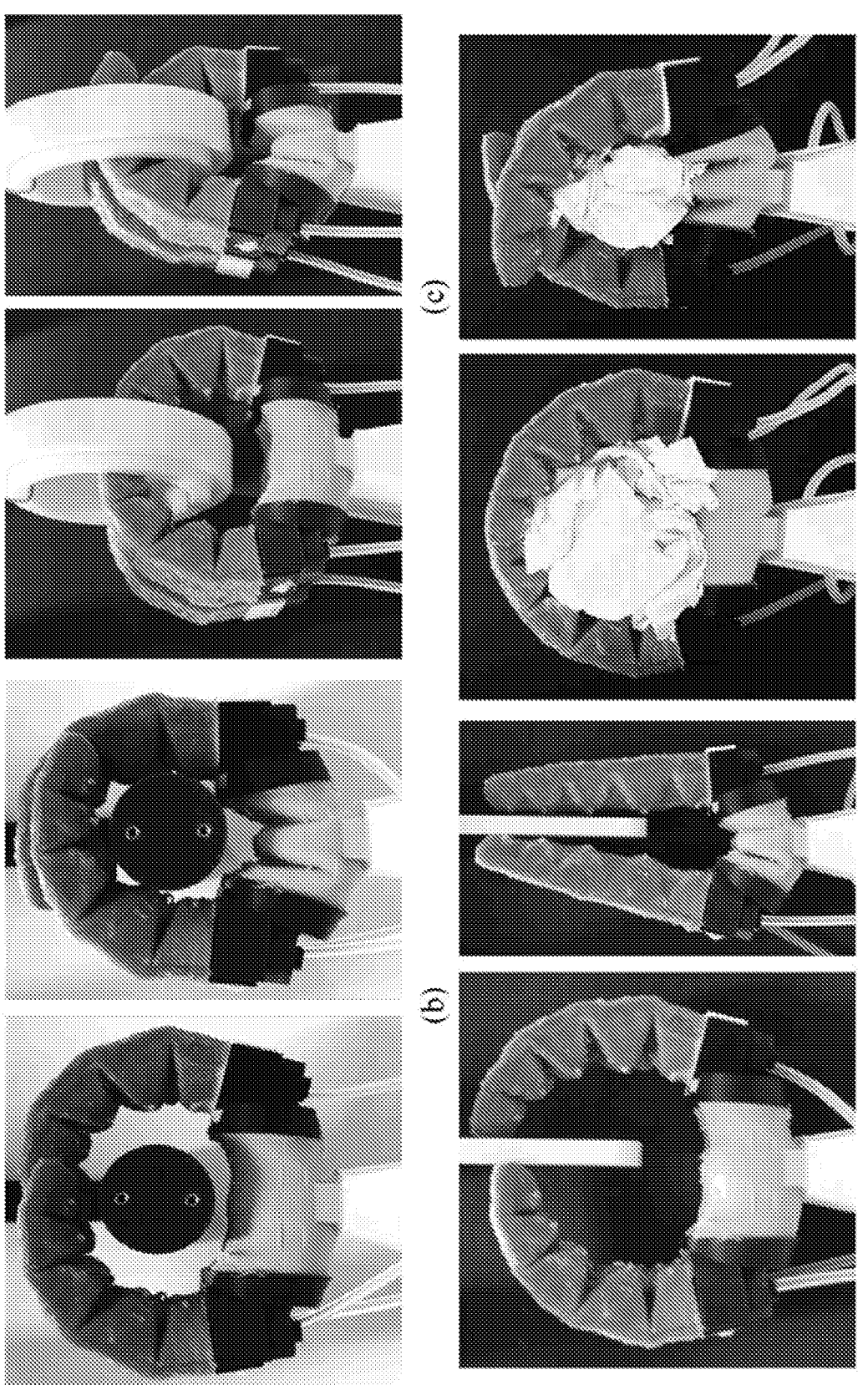

FIGS. 20A-20B show a comparison of the soft gripper grasp workspaces with and without the soft palm actuation. FIG. 20A show the actual 3D workspaces resulting from finger and palm actuation. Finger active trajectories shown in FIG. 17 were used to generate the 3D workspace boundaries. More particularly, FIG. 20A shows the active 3D grasp workspace generated from finger active trajectories and the increase in workspace due to lateral compliance of the fingers. The first row indicates orthogonal views of the 3D workspace overlaid on the gripper when the three fingers are actuated whereas the second row indicates the increased 3D workspace due to actuation of the three fingers and the palm. A 20 mm scale bar has been added at the bottom right for size reference. The finger lateral compliance enables an extension to the active workspace since objects or object features can be wedged in between the gripper fingers. In addition, the palm actuation enables larger contact areas with various object geometries, as illustrated in FIG. 20B. More particularly, FIG. 20B illustrate the impact of palm actuation on grasping of a cylinder (diameter of about 35 mm), ring (outer diameter of about 80 mm, inner diameter of about 65 mm), thin flat plate (thickness of about 6 mm) and a soft paper ball (diameter of about 60 mm).

Grasping and Manipulation Tests

In one study, the gripper was mounted to both UR10 and KUKA LBR IIWA14 robot manipulators and used to lift a wide variety of objects spanning different payloads, geometries, and surface finishes. The compliance of the gripper allows the approach to an object from multiple orientations and does not require a precise top grip. This feature enables many options for choosing a stable grip. The gripper was able to lift and manipulate delicate items such as eggs, potato chip bags, and glassware without breaking or damaging them. For heavier objects, the gripper was able to lift and securely manipulate items such as a large metallic wrench, a canister, and a 2 liter soda bottle. Grasping and manipulation of various objects in different orientations are shown in FIGS. 21A-21E. The maximum gripper aperture D (i.e., the space between the fingertips of the respective finger members across the palm member) is about 119 mm in the non-limiting example shown, and it can be reduced to 0 mm by varying the vacuum pressure applied to the palm from 0 to about −90 kPa.

Experiments were conducted to measure the gripper's repeatability in open loop pick and place tasks. Four objects of different weights and geometries were tested (details are listed in Table 3). The objects were placed on a flat surface and a robotic arm with the gripper was brought to the object for grasping. The center of the object was aligned with the center of the robot end-effector, and set as the reference position. The motion of the end-effector of the robotic arm before and after the grasping was linear and perpendicular to the flat surface. The object was shifted in the +X direction from its reference position by about 50 mm (in increments of 5 mm) and the grasping was performed 10 times for each X-increment. The same was repeated for increments in the +Y direction. The experiments were conducted at a linear acceleration of about 6 m/s$^2$ and a velocity of about 80 mm/s. For the four objects tested, the gripper provides a 100% pick and place repeatability for an offset in the object position of 0.21-0.33 times the aperture diameter along the X-axis and 0.04-0.17 times the aperture diameter along the Y-axis. Pick and place is unsuccessful for offsets above 0.33-0.42 times the aperture diameter along the X-axis and above 0.21-0.42 times the aperture diameter along the Y-axis.

Figure 22A:
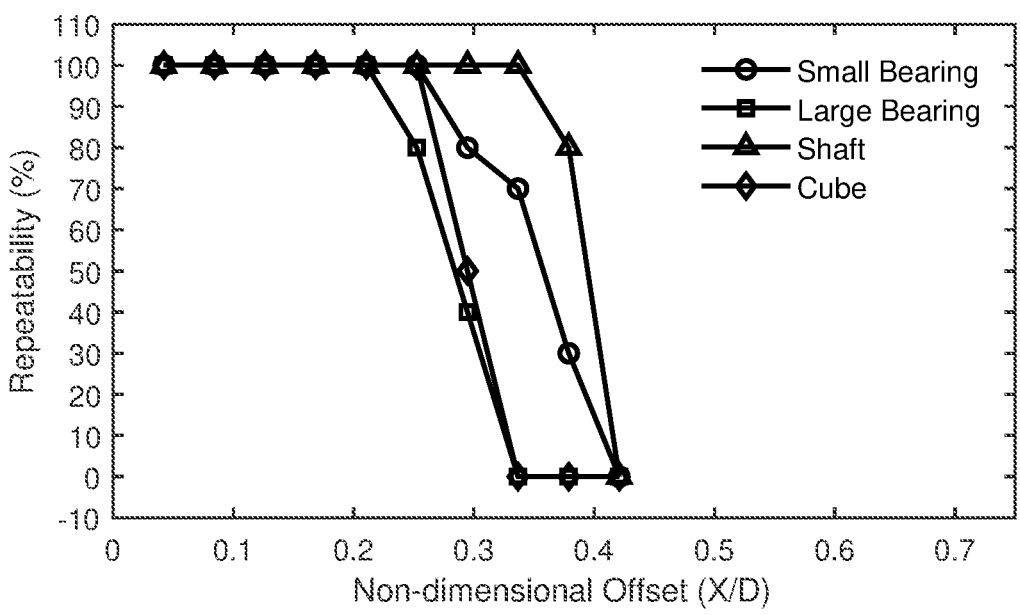
Figure 22B:
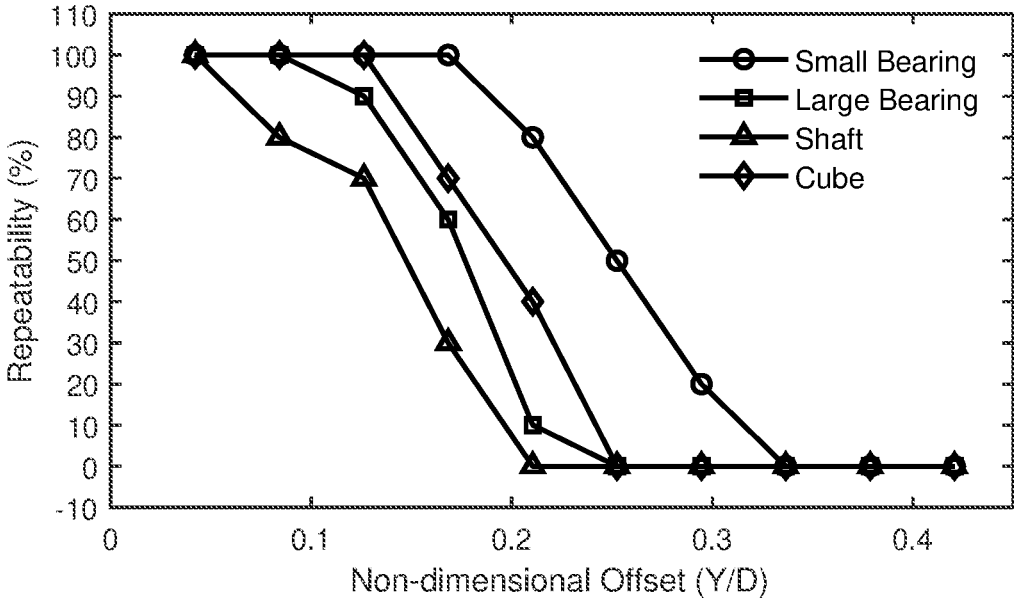

FIGS. 22A-22C illustrate repeatability measurements for pick and place of four objects of different geometries and weights. The object dimension in X-axis is defined as length (L), the dimension in Y-axis is defined as width (W) and the dimension in Z-axis is defined as thickness (T). The object translation in X and Y axes are normalized with respect to the aperture diameter (D). More particularly, FIG. 22A illustrates the pick and place repeatability for the four objects as they are offset from the reference position along their length. FIG. 22B illustrates the pick and place repeatability for the four objects as they are offset from the reference position along their width. FIG. 22C illustrates a schematic of the gripper representing the four objects and the X and Y axes.

The gripper provides a good tolerance to errors in the position of cylindrical and cube-shaped objects. For certain objects wider than the aperture of the gripper, the fingers are able to bend around the object, passively increasing the aperture for a more secure grip (see FIGS. 21A-21E for gripper compliance).

TABLE 3

Objects tested for pick and place repeatability.
The dimensions of the objects relative to
the gripper are illustrated by normalization of length
and width with respect to the aperture diameter D

| Object | Length (L) (mm) | Normal- ized Length (L/D) | Width (W) (mm) | Normal- ized Width (W/D) | Thick- ness (T) (mm) | Weight (grams) |
|---|---|---|---|---|---|---|
| Small bearing | 45 | 0.38 | 45 | 0.38 | 13 | 110 |
| Large bearing | 75 | 0.64 | 75 | 0.64 | 18 | 518 |
| Shaft | 120 | 1.01 | 18 | 0.15 | 18 | 900 |
| Cube | 60 | 0.51 | 60 | 0.51 | 60 | 240 |

In the example experiment using the UR10 robotic arm, the grasp robustness was tested using various accelerations at the maximum linear and angular speeds of the robot (1500 mm/s and 150 deg/s). The tests involved picking up an object, swinging it five times, each time with increasing acceleration and then placing the object back at the pick position. The gripper had a stable grip up until a linear acceleration of 15 m/s² and angular acceleration of 5.23rad/s² for most items.

Optimizing both payload capacities and the ability to robustly grasp a wide range of object geometries is challenging with contemporary soft gripper designs. In particular, achieving grasp robustness with soft structures for manipulation tasks at high speeds (speed being one of the advantages sought from automation) is quite difficult. Various example embodiments provide the design and characterization of a soft vacuum powered gripper that uses an actively controlled palm to increase grasping and payload ranges. The design enables secure grasping and manipulation of a wide range of geometries at high speeds and accelerations. The fabrication techniques used to achieve the multi-material gripper structure with embedded strain-limiting fabric and hard-soft interfaces for easy replacement of the fingers were described.

A finite element model using hyper-elastic constitutive relations showed good agreement with finger bending experiments and may be used to guide design iterations by predicting the impact of geometry and material selections.

The gripper internal structures determine steady state maximum grasp poses and the soft skin material determines power requirements, actuation speed, and actuation stress. Material selection and synthesis presents a huge opportunity to add functionality such as sensing and surface control (e.g., adhesion, slip feedback and control). The silicone materials used are food safe, hypoallergenic, and can tolerate high temperatures providing a solid foundation for a broad range of applications.

FIGS. 23A-23B show a table (Table 4) illustrating comparison of grasping capabilities of various objects by the gripper apparatus or gripper described according to various example embodiments (referred to as SUTD Gripper in the table) and the published capabilities of three other common soft grippers. The comparison was made under the following conditions: objects are lifted from a flat surface with the gripper brought to the object, objects cannot be deformed prior to the grasp, and open-loop control is used for the grasping. Weight of the objects (W) is in grams. The capabilities of grippers in terms of five grasp types presented in Feix et al. (2016) The grasp taxonomy of human grasp types. IEEE Transactions on Human-Machine Systems 46(1): 66-77, has been compared: S=Spherical, C=Cylindrical, P=Pinch, E=Parallel Extension, H=Hook. The data was obtained from the following sources—Origami: Li et al. (2019a) Origami robot gripper. URL https://www.youtube.com/watch?v=byqGFH6AZuk, Li et al. (2019b) A vacuum-driven origami "magic-ball" soft gripper. In: 2019, IEEE International Conference on Robotics and Automation. pp. 7401-7408; Jamming: Amend et. al (2012) A positive pressure universal gripper based on the jamming of granular material. IEEE Transactions on Robotics 28(2): 341-350, Amend et. al (2016) Soft robotics commercialization: Jamming grippers from research to product. Soft Robotics 3(4):213-222, Brown et al. (2010) Universal robotic gripper based on the jamming of granular material. Proceedings of the National Academy of Sciences 107(44): 18809-18814, Harada et al. (2016) Proposal of a shape adaptive gripper for robotic assembly tasks. Advanced Robotics 30(17-18): 1186-1198, Jaeger H and iRobot (2010) Universal robotic gripper based on the jamming of granular material. URL https://www.youtube.com/watch?v=bFW7VQpY-Ik; Bellows-style: Miron et al. (2018) Sleeved bending actuators for soft grippers: A durable solution for high force-to-weight applications. Actuators 7: 40. DOI:10.3390/act7030040, Low et al. (2017) A bidirectional soft pneumatic fabric-based actuator for grasping applications. In: 2017 IEEE/RSJ International Conference on Intelligent Robots and Systems (IROS). pp. 1180-1186, Shintake et al. (2017) Soft pneumatic gelatin actuator for edible robotics. In: 2017 IEEE/RSJ International Conference on Intelligent Robots and Systems (IROS). pp. 6221-6226, Low et al. (2016) A compliant modular robotic hand with fabric force sensor for multiple versatile grasping modes. In: 2016 6th IEEE International Conference on Biomedical Robotics and Biomechatronics (BioRob). pp. 1230-1235, Ariyanto et al. (2019) Three-fingered soft robotic gripper based on pneumatic network actuator. In: 2019 6th International Conference on Information Technology, Computer and Electrical Engineering (ICITACEE). pp. 1-5, Homberg et al. (2015) Haptic identification of objects using a modular soft robotic gripper. In: 2015 IEEE International Conference on Intelligent Robots and Systems (IROS). pp. 1698-1705, Deimel R and Brock O (2013) A compliant hand based on a novel pneumatic actuator. In: 2013 IEEE International Conference on Robotics and Automation. pp. 2047-2053. ("√"=possible, "X"=not possible, "–"=not tested or information not available, *=objects were manually held in the gripper's aperture rather than being picked from a flat table, **=objects were not kept flat on the table, instead they were tilted about a corner and raised from the table for grasping.) While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A gripping apparatus comprising:
a palm member;
a plurality of finger members configured to couple to the palm member, each of the plurality of finger members comprising:
a plurality of phalange members arranged in series along a longitudinal axis of the finger member, each phalange member being formed of an elastomer;
a multilayer finger membrane configured to encapsulate the plurality of phalange members, the multilayer finger membrane being formed of multiple material layers, comprising a strain limiting layer configured to limit the multilayer finger membrane from stretching; and
a coupling end portion configured to couple to the palm member and comprises an opening configured for fluid communication with a vacuum system,
wherein each of the plurality of finger members is configured to bend based on vacuum pressure actuation generated by the vacuum system via the opening of the coupling end portion of the finger member,
wherein the multilayer finger membrane comprises a first flexible membrane layer and a second flexible membrane layer, and the strain limiting layer is embedded between the first and second flexible membrane layers.

2. The gripping apparatus according to claim 1, wherein the strain limiting layer comprises a plurality of first cut-outs, the plurality of first cut-outs enabling a robust embedment of the strain limiting layer in the multilayer finger membrane.

3. The gripping apparatus according to claim 2, wherein the first flexible membrane layer and the second flexible membrane layer are each a soft silicone layer, and the strain limiting layer is a fiberglass fabric layer.

4. The gripping apparatus according to claim 1, wherein for each of the plurality of finger members, each of the plurality of phalange members of the finger member comprises a first side wall and a second side wall on an opposite side of the phalange member with respect to the first side wall, and a through hole configured for fluid communication with the vacuum system, wherein the through hole of the phalange member extends from the first side wall to the second side wall.

5. The gripping apparatus according to claim 4, wherein for each of the plurality of finger members, the through hole of each of the plurality of phalange members of the finger member are at least substantially aligned with the longitudinal axis of the finger member.

6. The gripping apparatus according to claim 4, wherein for each of the plurality of finger members, each of the plurality of phalange members of the finger member further comprises a first side portion and a second side portion opposite to the first side portion, and the first side portion and the second side portion are bonded to the multilayer finger membrane of the finger member.

7. The gripping apparatus according to claim 6, wherein for each of the plurality of finger members, the first side portion and the second side portion of each of the plurality of phalange members of the finger member comprises a first opening and a second opening, respectively, and
the multilayer finger membrane of the finger member comprises, for each of the plurality of phalange members of the finger member, a first opening and a second opening corresponding to the first opening and the second opening of the phalange member.

8. The gripping apparatus according to claim 7, wherein the first and second side portions are bonded to the multilayer finger membrane of the finger member at the first and second openings of the first and second side portions and the corresponding first and second openings of the multilayer finger membrane, respectively.

9. The gripping apparatus according to claim 4, wherein for each of the plurality of finger members, for each pair of immediately adjacent phalange members of the plurality of phalange members of the finger member, the second side wall of a first phalange member of the pair and the first side wall of a second phalange member of the pair are configured to define a space therebetween when the finger member is at a relaxed state so as to provide the space for the second side wall of the first phalange member and the first side wall of the second phalange member to move towards each other when the finger member is in a bending state, wherein the finger member is configured to receive vacuum pressure at the space between each pair of immediately adjacent phalange members for causing the multilayer finger membrane to deform around the plurality of phalange members of the finger member to create a net bending motion of the finger member towards an object.

10. The gripping apparatus according to claim 9, wherein the space has a substantially V-shaped cross-section when the finger member is at the relaxed state.

11. The gripping apparatus according to claim 1, wherein the palm member comprises:
a plurality of palm block members arranged in series, each palm block member being formed of an elastomer;
a multilayer palm membrane configured to encapsulate the plurality of palm block members, the multilayer palm membrane being formed of multiple material layers, comprising a strain limiting layer configured to limit the multilayer palm membrane from stretching; and
a first coupling end portion configured to couple to a robotic component and comprises an opening configured for fluid communication with the vacuum system,
wherein the palm member is configured to bend based on vacuum pressure actuation generated by the vacuum system via the opening of the first coupling end portion of the palm member.

12. The gripping apparatus according to claim 11, wherein each of the plurality of palm block members of the palm member comprises a first side wall and a second side wall on an opposite side of the palm block member with respect to the first side wall, and a through hole configured for fluid communication with the vacuum system, wherein the through hole of the palm block member extends from the first side wall to the second side wall.

13. The gripping apparatus according to claim 11, wherein each of the plurality of palm block members of the palm member further comprises a first side portion and a second side portion opposite to the first side portion, and the first side portion and the second side portion are bonded to the multilayer palm membrane of the palm member.

14. The gripping apparatus according to claim 1, wherein the plurality of finger members is coupled to a first valve, and the palm member is coupled to a second valve, wherein the first valve and the second valve are configured to independently regulate the flow of fluid to the plurality of finger members and the palm member.

15. The gripping apparatus according to claim 1, wherein for each of the plurality of finger members, each of the plurality of phalange members of the finger member further comprises a force sensor configured to detect applied force on the phalange member.

16. The gripping apparatus according to claim 1, wherein the multilayer finger membrane comprises a flex sensor configured to detect bending of the finger member in medial and lateral directions.

\* \* \* \* \*